US012792850B2

(12) United States Patent
Stansfield et al.

(10) Patent No.: US 12,792,850 B2
(45) Date of Patent: Nov. 10, 2026

(54) ANALOG MULTIPLIER CIRCUIT

(71) Applicant: Neu Edge Ltd, Oxford (GB)

(72) Inventors: Anthony Ian Stansfield, Oxford (GB); Yuhang Song, Oxford (GB); Walter Thomas Rombold Goodwin, Oxford (GB)

(73) Assignee: Neu Edge Ltd, Oxford (GB)

( * ) Notice: Subject to any disclaimer, the term of this patent is extended or adjusted under 35 U.S.C. 154(b) by 0 days.

(21) Appl. No.: 19/441,665

(22) Filed: Jan. 6, 2026

(65) Prior Publication Data

US 2026/0141192 A1 May 21, 2026

Related U.S. Application Data

(63) Continuation of application No. PCT/EP2024/068588, filed on Jul. 2, 2024.

(30) Foreign Application Priority Data

Jul. 7, 2023 (GB) ..................................... 2310497

(51) Int. Cl.
*G06G 7/16* (2006.01)
*G06F 7/544* (2006.01)

(52) U.S. Cl.
CPC ............. *G06G 7/16* (2013.01); *G06F 7/5443* (2013.01)

(58) Field of Classification Search
CPC ............ G06G 7/00–163; G06F 7/5443; G06F 7/52–5235; G06F 7/552–556; G06F 17/16; G06F 2101/00–16; G06F 2207/5521–5561; G06N 3/02
See application file for complete search history.

(56) References Cited

U.S. PATENT DOCUMENTS

| | | | | |
|---|---|---|---|---|
| 4,887,042 | A | 12/1989 | Keate et al. | |
| 5,061,866 | A | 10/1991 | El-Naggar et al. | |
| 2020/0394020 | A1 | 12/2020 | Sato et al. | |
| 2022/0113942 | A1* | 4/2022 | Yen | H03M 1/74 |
| 2022/0209788 | A1* | 6/2022 | Kraemer | G06F 7/5443 |
| 2025/0103678 | A1* | 3/2025 | Gutta | G06F 7/4983 |

FOREIGN PATENT DOCUMENTS

| | | | |
|---|---|---|---|
| FR | 2874721 | A1 | 3/2006 |
| JP | H0625940 | U | 2/1994 |
| WO | 2025012023 | A1 | 1/2025 |

OTHER PUBLICATIONS

International Searching Authority, International Search Report and Written Opinion, issued for International Application No. PCT/EP2024/068588, dated Oct. 7, 2024 (14 pages).

* cited by examiner

*Primary Examiner* — Andrew Caldwell
*Assistant Examiner* — Huy Duong
(74) *Attorney, Agent, or Firm* — Polsinelli PC; Gregory P. Durbin

(57) ABSTRACT

An analog multiplier circuit for performing multiply and scaling operations comprises a differential amplifier, at least two storage circuits, a summing circuit; and an exponentiating circuit. In response to receiving a first control signal, receiving as input an analog signal output by the differential amplifier and storing a value derived from the analog signal. In response to receiving a second control signal, outputting a storage analog signal derived from the stored value. The summing circuit receives storage analog signals from the storage circuits, and outputs an analog signal substantially proportional to a sum of the input storage analog signals.

17 Claims, 23 Drawing Sheets

ANALOG MULTIPLIER CIRCUIT

The present disclosure relates to analog multiplier circuits for multiply and scaling operations.

CROSS-REFERENCE TO RELATED APPLICATIONS

This patent application is related to and claims priority to co-pending Patent Cooperation Treaty (PCT) Application No. PCT/EP2024/068588 filed Jul. 2, 2024, titled "Analog Multiplier Circuit", which claims benefit of priority to United Kingdom Application No. 2310497.9 filed Jul. 7, 2023, titled "Analog Multiplier Circuit", both of which are incorporated by reference herein.

BACKGROUND

Existing integrated circuits often use digital multiplier circuits that are large and fast and reuse the same physical multiplier for multiple logical multiplications. If a multiplier can run ten times faster than is required by an application then it can provide equivalent performance per unit area as would a multiplier that is ten times smaller, but running ten times slower. Digital multipliers can provide high-precision results, but are large (with an area that varies approximately with the square of the number of bits in their input word), and have a high power dissipation due to high activity levels in their internal logic.

An alternative approach is to use analogue multiplication circuits. This will give lower precision than can be achieved with digital multiplication, but with reduced power. The examples described herein are not limited to examples which solve problems mentioned in this background section.

SUMMARY

Examples of preferred aspects and embodiments of the invention are as set out in the accompanying independent and dependent claims.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A first aspect of the disclosed technology is an analog multiplier circuit for performing multiply and scaling operations comprising:

- a differential amplifier arranged to receive as input a first analog signal and a second analog signal, the second analog signal an input signal to the analog multiplier circuit, and arranged to output a third analog signal substantially proportional to a difference between the first and the second analog signal;
- at least two storage circuits, each:
- in response to receiving a first control signal, receiving as input the third analog signal output by the differential amplifier and storing a value derived from the third analog signal; and
- in response to receiving a second control signal, outputting a storage analog signal derived from the stored value;
- a summing circuit arranged to receive as input storage analog signals from the at least two storage circuits respectively, and arranged to output a fourth analog signal substantially proportional to a sum of the input storage analog signals; and
- an exponentiating circuit arranged to receive as input the fourth analog signal, and arranged to output a fifth analog signal, wherein the fifth analog signal is substantially proportional to an exponential of the fourth analog signal, and is arranged to be an output of the analog multiplier circuit, wherein the first analog signal is a feedback signal associated with the fifth analog signal.

Thus the analog multiplier circuit of FIG. 1, including the feedback connection and the gain of the differential amplifier, is designed in such a way as to cancel the value of constants which are implementation dependent and therefore cancel the effects of manufacturing and design variation, for example, on the output of analog multiplier circuits. Using the feedback connection and single exponential circuit gives a compact design which is scalable to arrangements with arrays of many analog multiplier circuits.

In another aspect there is an analog multiplier circuit comprising:

- at least two storage circuits, each:
  - comprising a differential amplifier arranged to receive as input a same first analog signal and a same second analog signal, and arranged to output a differential output analog signal substantially proportional to a difference between the first and the second analog signal;
- in response to receiving a first control signal, receiving as input the differential output analog signal output by the differential amplifier of the storage circuit, and storing a value derived from the received analog signal; and
- in response to receiving a second control signal, outputting a storage analog signal derived from the stored value;
- a summing circuit arranged to receive as input the storage analog signals from the at least two storage circuits respectively, and arranged to output a fourth analog signal substantially proportional to a sum of the input storage analog signals; and
- an exponentiating circuit arranged to receive as input the fourth analog signal, and arranged to output a fifth analog signal, wherein the fifth analog signal is substantially proportional to an exponential of the fourth analog signal, and is arranged to be an output of the analog multiplier circuit, wherein the first analog signal is a feedback signal associated with the fifth analog signal.

Other examples will become apparent from the following detailed description, which, when taken in conjunction with the drawings, illustrate by way of example the principles of the disclosed technology.

Figure 1:
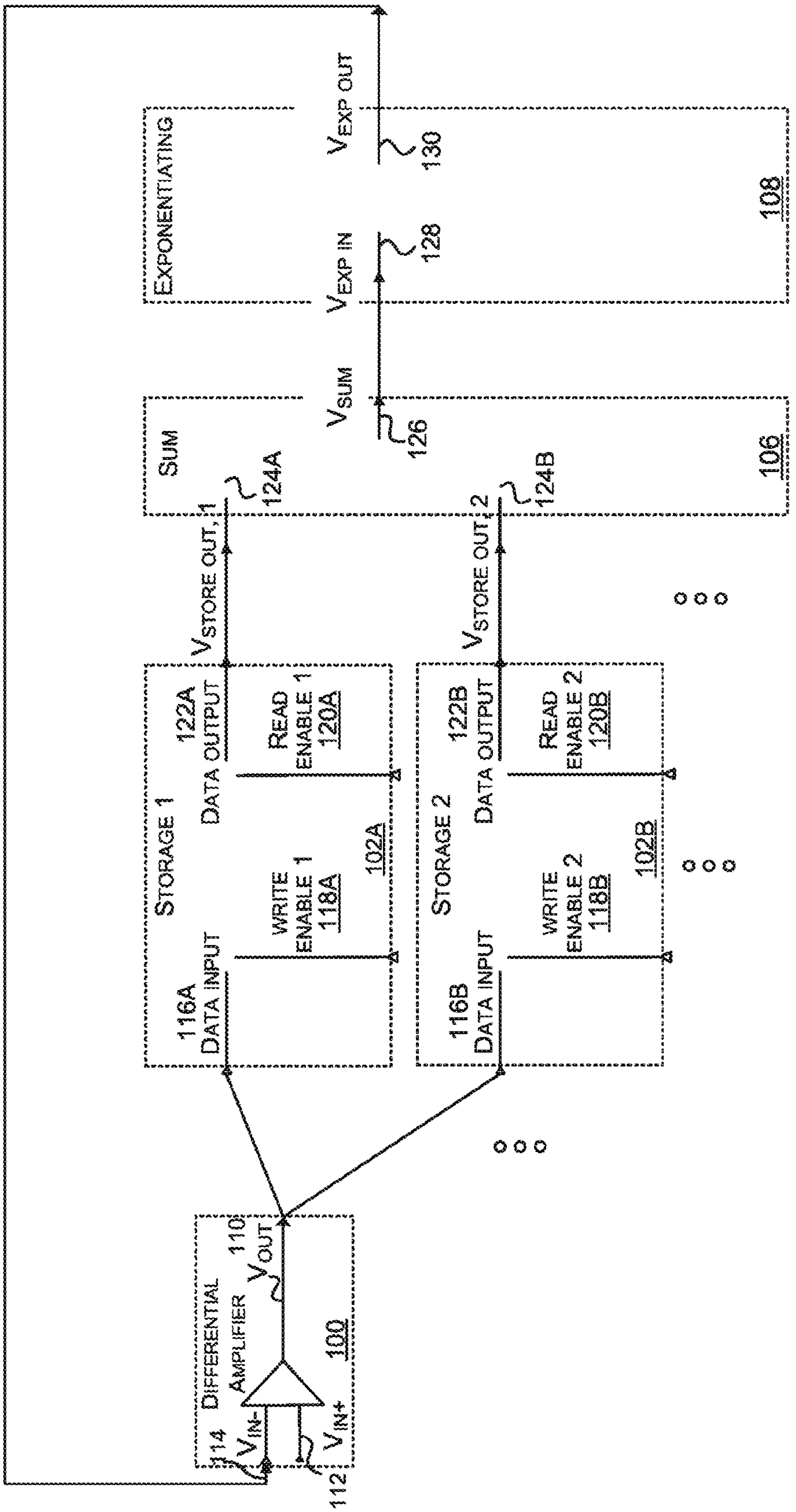
FIG. 1 is an example of an analog multiplier circuit having a single differential amplifier.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is made for the purpose of illustrating the general principles of the present technology and is not meant to limit the inventive concepts claimed herein. As will be apparent to anyone of ordinary skill in the art, one or more or all of the particular features described herein in the context of one embodiment are also present in some other embodiment(s) and/or can be used in combination with other described features in various possible combinations and permutations in some other embodiment(s).

Analog multiplier circuits are useful for a wide range of applications including but not limited to signal processing, image compression, correlation, machine learning. The inventors have recognized that many of these applications require very large numbers of individual multiplications to be performed in a short period of time, ideally with low power dissipation, but do not require high-precision results. There is consequently a need for small, low-power, and high performance multiplier circuits, suitable for use in high density integrated circuits that can implement these applications.

However, analog multipliers typically rely on matching between the properties of physically separate components. The inventors have recognized this means that they do not easily scale to small sizes on very deep submicron semiconductor processes where there can be significant variation in transistor properties between devices of the same physical dimensions, even when placed close to each other on the integrated circuit (IC). One approach to reducing the impact of such variation is to use larger transistors, but this is incompatible with the desire to have a small multiplier circuit that can be used in large numbers on a single chip. The inventors have developed an analog multiplier circuit that does not rely on matching between transistors, and which therefore can be made small even on very deep submicron processes. Therefore, it meets the goal of a small, reduced precision multiplier that can be integrated in large quantities onto a single chip for use in multiply-add intensive applications. Examples of the multiplication of two numbers that are available as analog electrical signals are described, and further the extension of this approach to array-level implementations whose effect is to multiply a matrix available as analog electrical signals with a vector of analog electrical signals is taught.

Notation for operating regions of metal-oxide semiconductor (MOS) transistors used in the examples described herein is now explained. A MOS transistor is the main electronic component used in modern highly integrated semiconductor devices. It is a 4-terminal device (drain, gate, source, body), but is often treated as a 3-terminal device (drain, gate, source), with the 4th (body) terminal connected to a constant voltage. The current that flows between the drain and source terminals ($I_{ds}$) depends on the gate-source voltage difference ($V_{gs}$) and the drain-source voltage difference ($V_{ds}$), and is usually described by dividing this dependence into 3 regions:

Subthreshold operation region: $V_{gs} \leq V_T$ (where $V_T$ is an internal property of the transistor). In this region $I_{ds}$ is exponentially dependent on $V_{gs}$.

Linear operation region: $V_{gs} > V_T$ and $V_{gs} - V_T > V_{ds}$. In this region $I_{ds}$ depends on the product of $V_{ds}$ and $(V_{gs} - V_T) - V_{ds}$. This allows the transistor to be used as a voltage-dependent resistor controlled by $V_{ds}$, as it follows that $1/R_{ds} = I_{ds}/V_{ds}$ is proportional to $(V_{gs} - V_T) - \frac{1}{2} V_{ds}$, wherein $R_{ds}$ is the drain-source resistance.

Saturated operation region: $V_{gs} > V_T$ and $V_{gs} - V_T \leq V_{ds}$. In this region $I_{ds}$ depends on the square of $(V_{gs} - V_T)$ and is (almost) independent of $V_{ds}$. This means that the transistor can be used as a voltage-controlled current source, controlled by $V_{gs}$.

The analog multiplier circuits described herein make use of the fact that the sum of logarithms of two values is equal to the logarithm of the product of the two values. As described herein, an analog multiplier circuit comprises only one exponentiating circuit which acts to convert a value into a logarithm of the value and also to convert a logarithm of a value back to the value. In contrast, log-antilog methods using separate devices for the log and exponential functions, experience error where any mismatch of the two functions (for example, log and exponential are with slightly different bases) results in the results being away from the correct results. The present disclosure uses the same device for the log and exponential functions, which avoids mismatch between log and exponential functions due to device variance.

FIG. 1 is an example of an analog multiplier circuit having a single differential amplifier 100. The analog multiplier comprises a plurality of storage elements 102A, 102B, meaning that its operation is inherently serialised. In the example of FIG. 1 the analog multiplier circuit comprises a plurality of components: a differential amplifier circuit 100, two or more storage circuits 102A, 102B, a sum circuit 106 to combine outputs of one or more of the storage circuits 102A, 102B and an exponentiating circuit 108.

This analog multiplier circuit has lower precision than a large digital multiplier because it is an analog circuit, but is capable of smaller and lower-power implementations. It is therefore suitable for use in applications that require large numbers of low-precision multiplications, with a limited area and/or power budget. As described in more detail below, only one exponentiating circuit 108 is used in the analog multiplier circuit which gives the benefit that matching is achieved. The single exponentiating circuit 108 is used when writing to one or more of the storage elements 102A, 102B and also when reading from one or more of the storage elements 102A, 102B. Because the same exponentiating circuit 108 is used for both reading and writing it is self-cancelling. By using only one exponentiating circuit 108 the circuit is compact. By using only one exponentiating circuit matching is facilitated since the same exponentiating circuit is used at different times such as for writing and reading operations at different times.

The analog multiplier circuit uses a negative feedback loop around a high gain amplifier 100, which is used to convert a small signal into a large signal. The feedback loop includes the storage elements 102A, 102B, sum circuit 106 and exponentiating circuit 108, and operates in such a way that a logarithmic value is generated and can be stored in a storage element 102A, 102B. The generated logarithmic value depends on the properties of the sum 106 and exponentiating 108 circuits, but is substantially independent of the properties of the amplifier, such as the value of the gain of the amplifier.

Notation of the form $V_{subscript}$ is used to denote intermediate values. However, this does not mean that all such values are voltages. In actual implementations they may be voltages, currents, charges or another electrical property. As such, as defined herein, analog signals are referred to, wherein an analog signal is in various examples a voltage, a current, or a charge. In various examples, any combination of analog signal types as defined (i.e. voltage, current, charge) are implemented. Where reference to a voltage, a current, or a charge is made herein, such a reference should be understood in various examples to correspond to an analog signal.

The components are connected as follows, and have the following characteristics:

The differential amplifier 100 has two inputs and one output, and generates an output voltage (or current) that is substantially proportional to the difference between the two inputs. i.e. $V_{out}=A(V_{in+}-V_{in-})$ where A is the amplifier gain and the inputs $V_{in+}$ 112 and $V_{in-}$ 114 are referred to as the non-inverting and inverting inputs respectively.

The storage circuits 102A, 102B each have a data input 116A, 116B, 2 control inputs 118A, 118B, 120A, 120B, and a data output 122A, 122B. The data input is connected to the storage circuits 102A, 102B, and is connected to the output 110 of the differential amplifier 100. The control inputs 118A, 118B, 120A, 120B and data output are separate for each storage circuit 102A, 102B. For each storage circuit:

When the first control input (the 'write enable' input) 118A, 118B is activated, the storage circuit 102A, 102B inputs and stores a value derived from the data input 116A, 116B. When this control input is deactivated the storage circuit 102A, 102B retains the value that was stored during the last activation period.

When the second control input (the 'read enable' input) 120A, 120B is activated, the storage circuit 102A, 102B outputs a value (i.e. a current or voltage) on the data output 122A, 122B that is derived from the stored value. When the second control input 120A, 120B is deactivated then there is no output (or rather, an output that is interpreted as '0').

To activate a control input, a control signal is applied to the control input. Control signals as defined herein in various examples refer to analog signals that indicate an element should be enabled and/or analog signals that indicate an element should be disabled. In various examples, the functionality of the control signal is achieved by defining a 'high' and 'low' signal, which define enabling/disabling an element or any combination thereof. As such, in various examples, a control signal is received only when a state of an element should change, and in alternative examples a control signal is always received but the state of the control signal defines the state of an associated element. In various examples, absence of a control signal is used to determine the state of an associated element, such as to disable an element when a control signal is not received. The storage circuits can be operated independently by means of the control signals. A control signal can trigger a response of storage circuit 102A whilst not triggering a response of storage 102B. The control signals are generated and managed by a controller. The controller is any one or more of: a fixed function state machine, instructions stored in memory, a processor running an application specific program. In some examples the controller is a control circuit that generates the control signals according to a sequence such as those defined below. In some examples the controller generates a fixed unchanging sequence of control signals. In some cases the controller dynamically generates the control signals.

Note that read activation and write activation are not mutually exclusive. When both are activated at the same time the data input 116A, 116B is both sent to the data output 122A, 122B and also updates the stored value. The sum circuit 106 takes its inputs 124A, 124B from the data outputs 122A, 122B of the storage circuits 102A, 102B and generates an output current 126 $V_{sum}$ or voltage derived from the sum of the inputs as follows:

$$V_{sum} = K_1 \sum_i V_{store\,out,i} = K_1(V_{store\,out,1} + V_{store\,out,2} + \ldots)$$

Where $K_1$ is a constant which is a property of both the design and the manufacturing process, which is implementation dependent and is subject to manufacturing variation. Implementation dependent refers to herein in relation to a constant as a value that depends on the design of an element to which the constant relates and/or the manufacturing process of the element, which is affected by its design. As defined herein, manufacturing variation corresponds to a value that may vary depending on the specific conditions and/or operations of manufacture, such as from chip-to-chip or device-to-device within a single chip. In various examples, as described below, the analog multiplier circuit of FIG. 1 is designed in such a way as to cancel the value of $K_1$ and other constants which are implementation dependent and therefore cancel the effects of manufacturing and design variation, for example, on the output of analog multiplier circuits.

The exponentiating circuit 108 takes its input 128 from the output of the sum circuit 106, and generates an output 130 that is substantially proportional to the exponential of the input:

$$V_{exp\,out} = K_2\, e^{V_{exp\,in}/V'}$$

Where $K_2$ and V' are implementation-dependent constants which in various examples are affected by properties of a manufacturing process and are therefore subject to manufacturing variation. Since the input of the exponentiating circuit connects to the output of the sum circuit it follows that:

$$V_{exp\,out} = K_2\, e^{V_{exp\,in}/V'} = K_2\, e^{V_{sum}/V'} = K_2\, e^{K_1 \Sigma_i V_{store\,out,i}/V'}$$

$$V_{exp\,out} = K_2\left(e^{(K_1/V')V_{store\,out,1}}\right)\left(e^{(K_1/V')V_{store\,out,2}}\right)\ldots$$

Such that the output 130 of the exponentiating circuit is a product of terms relating to the stored voltages.

The output 130 of the exponentiating circuit 108 is used as the output of the overall analog multiplier circuit, and is also, in various examples, connected to the inverting input $V_{in-}$ 114 of the differential amplifier 100, where the inverting input of the differential amplifier 100 receives a feedback signal, in various examples directly from the exponentiating circuit 108, associated with the output of the exponentiating circuit 108.

Operation of the analog multiplier circuit of FIG. 1 as a multiplier of two numbers is now explained.

The circuit operates as follows:

When the read enable 120A, 120B and write enable 118A, 118B inputs of the same storage circuit 102A, 102B are both activated, the storage circuit 102A, 102B, sum circuit 106, and exponentiating circuit 108 form a feedback loop around the amplifier 100, connecting the amplifier output 110 to the inverting input 114. The use of feedback networks around amplifiers is a known design technique for analog signal processing, and (provided A, the amplifier gain, is large enough) causes the amplifier output voltage $V_{out}$ 110 to settle at a level that minimises the difference between $V_{in+}$ and $V_{in-}$. i.e. $(V_{in+}-V_{in-})\approx 0$ or $V_{in+}=V_{in-}$. Since $V_{in-}$ is connected to the output of the exponentiating circuit, then:

$$V_{in+} = V_{in-} = V_{exp\,out} = K_2\left(e^{(K_1/V')V_{store\,out}}\right)$$

$$(K_1/V')V_{store\,out} = \log\left(V_{in+}/K_2\right),\ \text{so}$$

$$V_{store\,out} = (V'/K_1)\log\left(V_{in+}/K_2\right)$$

i.e. the selected storage circuit is in various examples set to store a value that depends on the log of the input voltage.

If the write enable 118A, 118B input of the storage circuit 102A, 102B is then deactivated but the read enable 120A, 120B is still activated then the storage circuit 102A, 102B will continue to output its stored value, and the overall output will continue to be the exponent of this value—i.e. will be equal to the original input value.

The above operation can be repeated (using different input voltages) to store the log of another input voltage in another storage circuit Then if two storage circuits 102A, 102B are selected for read at the same time (i.e. have their read enables 120A, 120B activated, and their write enables 118A, 118B deactivated), the sum circuit 106 will output the sum of these two stored values, and the output of the exponentiating circuit will be:

$$V_{exp\,out} = K_2\left(e^{(K_1/V')V_{store\,out,1}}\right)\left(e^{(K_1/V')V_{store\,out,2}}\right)$$

Assuming $V_{store\,out,1}$ and $V_{store\,out,2}$ are two stored values when writing two values $V_{in,1}$ and $V_{in,2}$ (i.e., the values applied to $V_{in+}$ of the differential amplifier 100 when both write enable 118A, 118B and read enable 120A, 120B are activated for the corresponding storage circuit 102A, 102B)

$$V_{exp\,out} = K_2\left(e^{\log(V_{in,1}/K_2)}\right)\left(e^{\log(V_{in,2}/K_2)}\right)$$

$$V_{exp\,out} = K_2\left(V_{in,1}/K_2\right)\left(V_{in,2}/K_2\right)$$

$$V_{exp\,out} = (V_{in,1}V_{in,2})/K_2$$

i.e. the output is proportional to the product of the two stored voltages. Here, as can be seen $V_{exp\,out}=V_{in,1}V_{in,2}$ is a result that in various examples is desired to be output, but what is obtained in practice is the result with a scale factor $K_2$. The following section describes a way of scaling the output so as to remove this scale factor $K_2$, thereby removing implementation dependent effects, such as from manufacturing variation of the analog multiplier circuit.

Operation of the analog multiplier circuit of FIG. 1 to scale the output is now explained.

In various examples, the output is scaled by extending the sequence of operations to write to and read from the multiplier circuit.

Start with storing a value $V_{store\,out,1}$ in a first storage circuit 102A while writing $V_{in,1}$, i.e., the value $V_{in,1}$ is applied to $V_{in+}$112 of the differential amplifier 100 when both write enable 118A and read enable 120A are activated for this storage circuit 102A that stores $V_{store,1}$. As described above, the stored voltage is given by $$(K_1/V')V_{store\,out,1} = \log\left(V_{in,1}/K_2\right)$$

Then select a second storage circuit 102B, with its read enable 118B and write enable 120B both activated, while at the same time activate the read enable 120A of the first storage circuit 102A. The output of the multiplier circuit 130 will then be:

$$V_{exp\,out} = K_2\left(e^{(K_1/V')V_{store\,out,1}}\right)\left(e^{(K_1/V')V_{store\,out,2}}\right),\ \text{or}$$

$$V_{exp\,out} = K_2\left(V_{in,1}/K_2\right)\left(e^{(K_1/V')V_{store\,out,2}}\right)$$

Because of the feedback connection and the large gain of the differential amplifier 100, this must be equal to the new input voltage $V_{in,2}$:

$$V_{in,2} = V_{exp\,out} = K_2(V_{in,1}/K_2)\left(e^{(K_1/V')V_{store\,out,2}}\right)$$

$$(V_{in,2}/K_2) = (V_{in,1}/K_2)\left(e^{(K_1/V')V_{store\,out,2}}\right)$$

$$(K_1/V')V_{store\,out,2} = \log(V_{in,2}/K_2) - \log(V_{in,1}/K_2) = \log(V_{in,2}/V_{in,1})$$

A third value is in various examples then stored in a third storage circuit (with both the first and second storage circuits 102A and 102B disabled during the writing process) so that:

$$(K_1/V')V_{store\,out,3} = \log(V_{in,3}/K_2)$$

Finally, read from the second 102B and third storage circuits simultaneously:

$$V_{exp\,out} = K_2\left(e^{(K_1/V')V_{store\,out,2}}\right)\left(e^{(K_1/V')V_{store\,out,3}}\right)$$

$$V_{exp\,out} = K_2(V_{in,2}/V_{in,1})(V_{in,3}/K_2) = V_{in,2}V_{in,3}/V_{in,1}$$

In this way, the output voltage is derived from the 3 input voltages. The constant $K_2$ (that depends on the properties of the underlying circuit) no longer appears in the result. This use of the external voltage $V_{in,1}$ means that:

The voltage range of the output can be scaled, e.g. to ensure that it is in the appropriate range to drive a subsequent circuit.

The dependence on the properties of the components in the circuit (i.e. the constants $K_1$, $K_2$, and V' that relate to the properties of the sum circuit and the exponentiating circuit, which are implementation dependent, in various examples subject to manufacturing variation) is removed.

Note that in the above example of the scaled multiplication, the use of the first and third stored values do not overlap in time. Therefore in various examples they use the same physical storage element.

A alternative method of operating the circuit that has better performance when using large scaling factor method is now given.

Start with storing a value $V_{store\ out,1}$ in a first storage circuit 102A while writing $V_{in,1}$, i.e., the value $V_{in,1}$ is applied to $V_{in+}$112 of the differential amplifier 100 when both write enable 118A and read enable 120A are activated for this storage circuit 102A that stores $V_{store,1}$. As described above, the stored voltage is given by $$(K_1/V')V_{store\,out,1} = \log(V_{in,1}/K_2)$$

Then select a second storage circuit 102B, with its read enable 118B and write enable 120B both activated, while at the same time activate the read enable 120A of the first storage circuit 102A. The output of the multiplier circuit 130 will then be:

$$V_{exp\,out} = K_2\left(e^{(K_1/V')V_{store\,out,1}}\right)\left(e^{(K_1/V')V_{store\,out,2}}\right), \text{ or}$$

$$V_{exp\,out} = K_2(V_{in,1}/K_2)\left(e^{(K_1/V')V_{store\,out,2}}\right)$$

Because of the feedback connection and the large gain of the differential amplifier 100, this must be equal to the new input voltage $V_{in,2}$:

$$V_{in,2} = V_{exp\,out} = K_2(V_{in,1}/K_2)\left(e^{(K_1/V')V_{store\,out,2}}\right)$$

$$(V_{in,2}/K_2) = (V_{in,1}/K_2)\left(e^{(K_1/V')V_{store\,out,2}}\right)$$

$$(K_1/V')V_{store\,out,2} = \log(V_{in,2}/K_2) - \log(V_{in,1}/K_2) = \log(V_{in,2}/V_{in,1}$$

A third value is in various examples then stored in a third storage circuit (with the first storage circuit 120A disabled for both reading and writing, and the second storage circuit 102B disabled for writing and enabled for reading during the writing process for the third storage circuit) so that:

$$V_{exp\,out} = K_2\left(e^{(K_1/V')V_{store\,out,2}}\right)\left(e^{(K_1/V')V_{store\,out,3}}\right), \text{ or}$$

$$V_{in,3} = V_{exp\,out} = K_2(V_{in,2}/V_{in,1})\left(e^{(K_1/V')V_{store\,out,3}}\right)$$

$$(V_{in,3}/K_2)(V_{in,1}/V_{in,2}) = e^{(K_1/V')V_{store\,out,3}}$$

$$(K_1/V')V_{store\,out,3} = \log((V_{in,3}/K_2)(V_{in,1}/V_{in,2}))$$

Finally, read from the third storage circuit:

$$V_{exp\,out} = K_2\left(e^{(K_1/V')V_{store\,out,3}}\right)$$

$$V_{exp\,out} = K_2(V_{in,3}/K_2)(V_{in,1}/V_{in,2}) = V_{in,1}V_{in,3}/V_{in,2}$$

Again, the output voltage is simply derived from the 3 inputs, and not the constants $K_1$, $K_2$, and V' that relate to the properties of the sum circuit and the exponentiating circuit.

In some implementations there is a constraint that the output of the sum stage must be positive, or will be clipped to be 0. The two approaches to computing the product of two inputs divided by a third have different constraints on the relative values of the inputs when constrained in this way. In the first version, the following constraints apply at each step:

$$V_{in,1} \text{ is positive}$$

$$\log(V_{in,2}/K_2) - \log(V_{in,1}/K_2) \text{ is positive, or } V_{in,2} \geq V_{in,1}$$

$$V_{in,3} \text{ is positive}$$

In this first version, $V_{in,1}$ is used as the multiplication scaling factor (i.e. the divisor), and is constrained to be smaller than at least one of the other inputs. i.e. this approach is preferred when it is appropriate to scale up the output relative to the inputs.

In the second version the constraints are:

$$V_{in,1} \text{ is positive}$$

$$\log(V_{in,2}/K_2) - \log(V_{in,1}/K_2) \text{ is positive, or } V_{in,2} \geq V_{in,1}$$

$$\log(V_{in,3}/K_2) - (\log(V_{in,2}/K_2) - \log(V_{in,1}/K_2)) \text{ is positive, or}$$

$$V_{in,1}V_{in,3} \geq V_{in,2}$$

In this version, $V_{in,2}$ is used as the multiplication scaling factor (i.e. the divisor) and is constrained to be greater than at least one of the inputs. i.e. this approach is to be preferred when it is appropriate to scale down the output relative to the inputs. Furthermore, if the third constraint is violated (i.e. if $V_{in,1}V_{in,3}$ is less than $V_{in,2}$) then the output of the sum is clipped, and the multiplier output will also be clipped to a small value. Therefore the multiplier will be accurate when multiplying large numbers, and any errors caused by failures of these constraints will only affect small values. When the multiplier is used as part of a multiply-add circuit this behaviour means that any such errors will not affect the large multiplication results that are the principal contributors to the overall multiply-add result.

Operation of the analog multiplier circuit of FIG. 1 to square an input is now explained.

An input is in various examples squared simply by multiplying by itself. i.e. store the same input value in two separate storage circuits, then read from them both in parallel. The scaling technique is also in various examples used in this case.

Operation of the analog multiplier circuit of FIG. 1 to calculate square roots is now explained.

The described circuit is also in various examples used to calculate square roots. If two storage circuits are written to in parallel, but then only one is read from then the result will be a square root function. In more detail:

Write to two storage circuits 102A, 102B simultaneously: as described before, write enables 118A, 118B for both storage circuits 102A, 102B are activated, read enables 120A, 120B for both storage circuits 102A, 102B are activated, $V_{in}$ is applied to the $V_{in+}$ 112 of the differential amplifier 100, the values stored in the two storage circuits 102A, 102B are $V_{store\ out,1}$ and $V_{store\ out,2}$ respectively. In this case:

$$V_{in} = K_2\left(e^{(K_1/V')V_{store\,out,1}}\right)\left(e^{(K_1/V')V_{store\,out,2}}\right)$$

On the assumption that the two storage circuits 102A, 102B are identical, they will have the same values of $K_1$ and V', and also the same stored voltage, i.e., $V_{store\ out,1}=V_{store\ out,2}=V_{store\ out}$, and so:

$$V_{in} = K_2\left(e^{(K_1/V')V_{store\,out}}\right)^2$$

$$sqrt\left(V_{in}/K_2\right) = e^{(K_1/V')V_{store\,out}}$$

$$(K_1/V')V_{store\,out} = \log\left(sqrt\left(V_{in}/K_2\right)\right) = 1/2\log\left(V_{in}/K_2\right)$$

Then read from only one of this pair of storage circuits 102A, 102B:

$$V_{exp\,out} = K_2\left(e^{(K_1/V')V_{store\,out}}\right)$$

$$V_{exp\,out} = K_2\left(V_{in}/K_2\right)^{1/2} = (V_{in}K_2)^{1/2}$$

The scaling technique is in various examples also applied in this case in order to remove the dependency on $K_2$, specifically:

Start by storing a value in a first storage circuit 102A:

$$(K_1/V')V_{store\,out,1} = \log\left(V_{in,1}/K_2\right)$$

Then write to two other storage circuits (the second 102B and third ones) in parallel (as above), while also simultaneously reading from the first storage circuit 102A:

$$V_{in} = V_{exp\,out} = K_2\left(e^{(K_1/V')V_{store\,out,1}}\right)\left(e^{(K_1/V')V_{store\,out,2}}\right)\left(e^{(K_1/V')V_{store\,out,3}}\right)$$

$$V_{in} = V_{exp\,out} = K_2\left(V_{in,1}/K_2\right)\left(e^{(K_1/V')V_{store\,out,2}}\right)\left(e^{(K_1/V')V_{store\,out,3}}\right)$$

As described above, the way of writing and reading in second 102B and third storage circuit in parallel and using the assumption that the two storage circuits are identical results in $$V_{store\,out,2} = V_{store\,out,3} = V_{store\,out}, \text{ thus}$$

$$V_{in} = K_2\left(V_{in,1}/K_2\right)\left(e^{(K_1/V')V_{store\,out}}\right)\left(e^{(K_1/V')V_{store\,out}}\right)$$

$$\left(V_{in}/K_2\right) = \left(V_{in,1}/K_2\right)\left(e^{(K_1/V')V_{store\,out}}\right)^2$$

$$(K_1/V')V_{store\,out} = 1/2\left(\log\left(V_{in}/K_2\right) - \log\left(V_{in,1}/K_2\right)\right) = 1/2\log\left(V_{in}/V_{in,1}\right)$$

Finally, read from the first and second storage circuits 102A, 102B, while the third one is deselected (read enable of it is deactivated):

$$V_{exp\,out} = K_2\left(e^{(K_1/V')V_{store\,out,1}}\right)\left(e^{(K_1/V')V_{store\,out,2}}\right)$$

$$V_{exp\,out} = K_2\left(e^{(K_1/V')V_{store\,out,1}}\right)\left(e^{(K_1/V')V_{store\,out}}\right)$$

$$V_{exp\,out} = K_2\left(V_{in,1}/K_2\right)\left(V_{in}/V_{in,1}\right)^{1/2} = (V_{in}V_{in,1})^{1/2}$$

This method is in various examples extended to compute nth roots (for integer n):

Store a value in a first storage circuit 102A:

$$(K_1/V')V_{store\,out,1} = \log\left(V_{in,1}/K_2\right)$$

Then write to n other storage circuits in parallel (as above), while also simultaneously reading from the first storage circuit 102A:

$$V_{in} = V_{exp\ out} = K_2\left(e^{(K_1/V')V_{store\ out,1}}\right)\left(e^{(K_1/V')V_{store\ out,2}}\right)\left(e^{(K_1/V')V_{store\ out,3}}\right)\ldots\left(e^{(K_1/V')V_{store\ out,n+1}}\right)$$

$$V_{in} = V_{exp\ out} = K_2(V_{in,1}/K_2)\left(e^{(K_1/V')V_{store\ out,2}}\right)\left(e^{(K_1/V')V_{store\ out,3}}\right)\ldots\left(e^{(K_1/V')V_{store\ out,n+1}}\right)$$

Again, using the assumption that the storage circuits are identical, as described above, the way of writing and reading in second 102B and third storage circuits in parallel and using the assumption that the two storage circuits are identical results in:

$$V_{store\ out,2} = V_{store\ out,3} = V_{store\ out},\ \text{etc. thus}$$

$$V_{in} = K_2(V_{in,1}/K_2)\left(e^{(K_1/V')V_{store\ out}}\right)\left(e^{(K_1/V')V_{store\ out}}\right)$$

$$(V_{in}/K_2) = (V_{in,1}/K_2)\left(e^{(K_1/V')V_{store\ out}}\right)^n$$

$$(K_1/V')V_{store\ out} = (1/n)(\log(V_{in}/K_2) - \log(V_{in,1}/K_2)) = (1/n)\log(V_{in}/V_{in,1})$$

Finally, read from the first 102A and second 102B storage circuits, while the others are deselected (read enable 120A, 120B deactivated):

$$V_{exp\ out} = K_2\left(e^{(K_1/V')V_{store\ out,1}}\right)\left(e^{(K_1/V')V_{store\ out,2}}\right)$$

$$V_{exp\ out} = K_2\left(e^{(K_1/V')V_{store\ out,1}}\right)\left(e^{(K_1/V')V_{store\ out}}\right)$$

$$V_{exp\ out} = K_2(V_{in,1}/K_2)(V_{in}/V_{in,1})^{1/n} = (V_{in})^{1/n}(V_{in,1})^{(n-1)/n}$$

I.e. in various examples the nth root of one voltage ($V_{in}$) scaled by a constant derived from another voltage is computed.

Furthermore fractional powers in various examples are computed-writing to n storage circuits and then reading from m of them (with m≤n) will result in computing $(V_{in})^{m/n}(V_{in,1})^{(n-m)/n}$.

In various examples, the analog multiplier circuit as described herein performs the operations described herein, such as multiply, divide, scaling and squaring operations. In various examples, the output of an exponentiating circuit is arranged to be, and in various examples is, provided as an output of the analog multiplier circuit. In various examples, a non-inverting input of a differential amplifier is arranged to receive, and in various examples receives, an input analog signal of the analog multiplier circuit.

In alternative approaches, translinear circuits, four-quadrant multipliers, or Gilbert cell multipliers are used in an analog multiplier circuit to compute the product of two analog signals.

In one alternative approach, using an analog circuit involves using logarithmic and exponential circuits, where input signals are converted to their logarithmic equivalents, added together, and then converted back to their original form using an exponential circuit. This process results in the multiplication of the original signals because the logarithm of a product is equal to the sum of the logarithms. Separate devices are however used for the logarithmic and exponential functions, where any mismatch of the two functions (for example, logarithmic and exponential are with slightly different bases) results in less accurate results. The present invention uses the same device for logarithmic and exponential functions, which avoids mismatch issues between logarithmic and exponential functions due to device variance.

Another alternative approach utilises the voltage-current characteristics of certain types of Field-Effect Transistors (FETs) that can be exploited to perform analog multiplication. For example, the drain current of a junction FET (JFET) can be proportional to the square of the difference between the gate and source voltages, i.e., one can calculate $(V_1+V_2)$^2, which can be used as a simple form of two-quadrant multiplier. For example, in the instance that the product of two dynamic signals $V_1$ and $V_2$ is desired, one can separately calculate $(V_1+V_2)^2=V_1^2+V_2^2-2V_1V_2$, $(V_1+0)^2=V_1^2$ and $(V_2+0)^2=V_2^2$, then subtract the latter two results from the first one to obtain $2V_1V_2$, thus $V_1V_2$. However, this requires careful matching between three separate transistor stages (for the later two squares and for the first square-of-difference), which is in practice difficult to accomplish. Therefore, this approach often has problems scaling to large numbers of small multipliers for a dense process.

A further alternative approach uses digital multipliers which allow for high precision operation—they can multiply digital values with no loss of precision (e.g. the product of two 16-bit numbers can be calculated with full 32-bit precision). However, this is achieved at high area cost (the number of circuit elements required to multiply two n-bit numbers varies as $n^2$) and high active power (which is related to the large number of components required).

Although the preceding description refers to the reading of one storage circuit while writing to another technique as a way of scaling the output, it is actually a generic way of computing $V_{in,2}V_{in,3}/V_{in,1}$, and in various examples is also used as a way of performing division.

Though FIG. 1 illustrates two storage circuits 102A, 102B, it should be noted that this is in no way limiting, and that three, four, five, ten, twenty or any other number of storage circuits 102A, 102B are in various examples implemented, each of them connected so as to receive input from the output 110 of the differential amplifier 100, each of them connected so as to receive write/read enable control signals 118A, 118B/120A, 120B, and each of them connected so as to provide an output 122A, 122B to a sum circuit 106.

Figure 2:
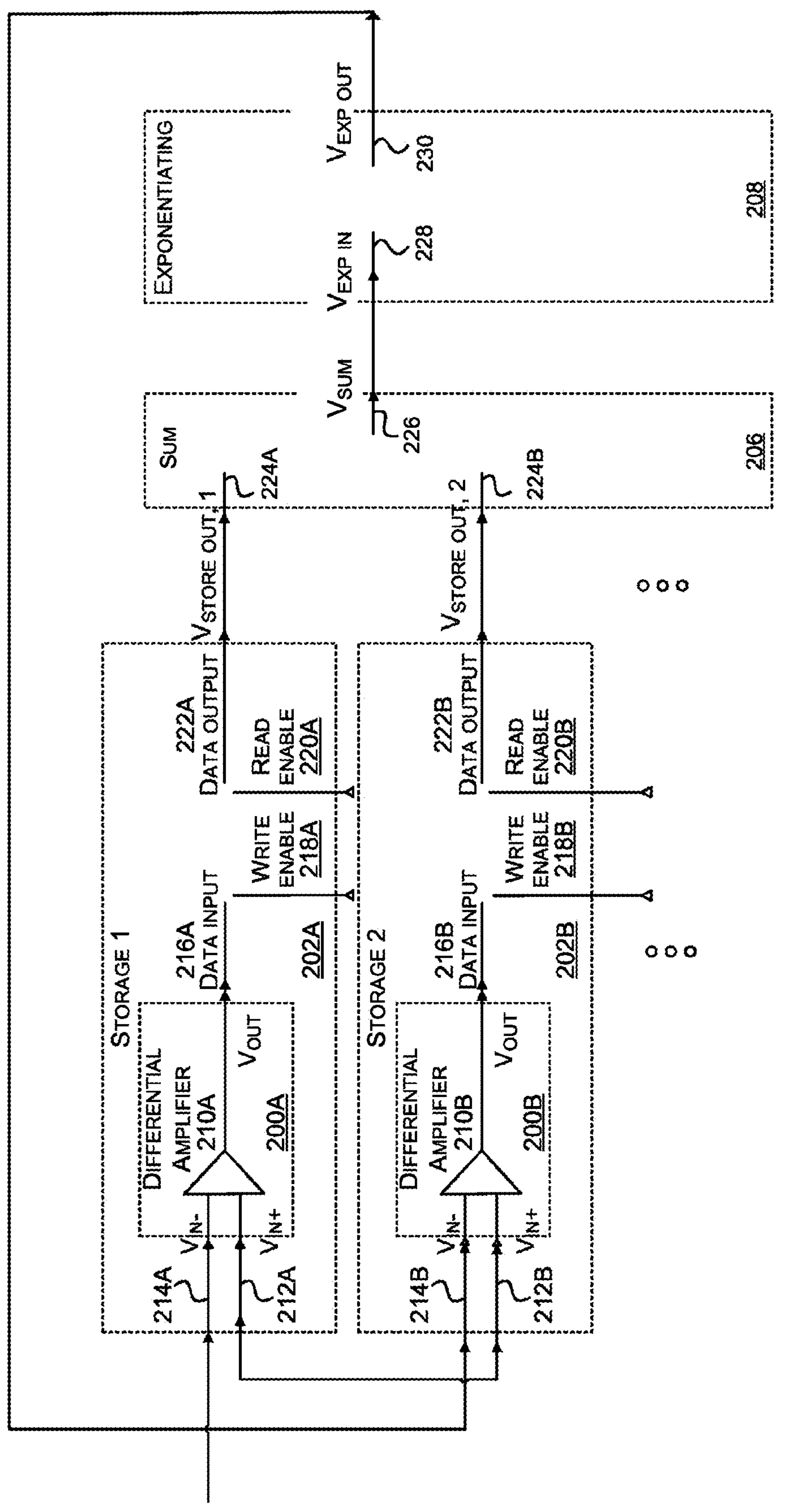
FIG. 2 is a schematic diagram of an analog multiplier circuit having two differential amplifiers.

FIG. 2 is a schematic diagram of an analog multiplier circuit having two differential amplifiers. Such a circuit provides an alternative implementation with the same functionality to perform multiplication operations as the circuit of FIG. 1. The analog multiplier circuit of FIG. 2 comprises a plurality of storage circuits 202A, 202B, meaning that its operation is inherently serialised, where each storage circuit 202A, 202B comprises a differential amplifier, 200A, 200B respectively. The analog multiplier circuit comprises a sum circuit 206 and an exponentiating circuit 208, corresponding respectively to the circuits 106 and 108 of FIG. 1 in that they have the same functionality.

The components of the analog multiplier circuit of FIG. 2 are connected as follows, and have the following characteristics:

The differential amplifier 200A, 200B of each storage circuit 202A, 202B has two inputs and one output, and generates an output voltage (or current) that is substantially proportional to the difference between the two inputs. As defined herein, a substantially proportional relationship in relation to a transistor is one in which the output of the transistor is proportional to an input of the transistor when fringe or non-dominant effects beyond the desired behaviour can be, or are ignored. The differential amplifier 200A, 200B of each storage circuit internally functions in a similar way to the differential amplifier 100 of FIG. 1. The inputs to the differential amplifiers 200A, 200B correspond to $V_{in+}$ 212A, 212B and $V_{in-}$ 214A, 214B and are referred to as the non-inverting and inverting inputs respectively. $V_{in+}$ 212A, 212B and $V_{in-}$ 214A, 214B are equivalent across the differential amplifiers 200A, 200B of the storage circuits 202A, 202B, as they are both connected to the same input connections. $V_{in+}$ 212A, 212B are connected to a same input of the analog multiplier circuit, thereby enabling the input of an analog signal corresponding to a value which is operated on by the analog multiplier circuit. $V_{in-}$ 214A, 214B are connected to a same output of the analog multiplier circuit, i.e. the output of the exponentiating circuit 208, so as to provide a feedback loop.

The storage circuits 202A, 202B each have a data input 216A, 216B, 2 control inputs 218A, 218B, 220A, 220B, and a data output 222A, 222B. The control inputs 218A, 218B, 220A, 220B and data output are separate for each storage circuit 202A, 202B such that a control signal for storage 202A can trigger a response of storage 202A whilst not triggering a response of storage 202B. In various examples, the control inputs corresponding to a same functionality 218A, 218B are connected to a same control line or control connection. In various examples, the control inputs corresponding to a same functionality 220A, 220B are connected to a same control line or control connection. In various examples, all control inputs 218A, 218B, 220A, 220B are connected to a same control line or control connection. For each storage circuit:

When the first control input (the 'write enable' input) 218A, 218B is activated, the storage circuit 202A, 202B inputs and stores a value derived from the data input 216A, 216B, where the data input 216A, 216B is received from the output of the differential amplifier 200A, 200B of the respective storage circuit 202A, 292B. When this control input is deactivated the storage circuit 202A, 202B retains the value that was stored during the last activation period.

When the second control input (the 'read enable' input) 220A, 220B is activated, the storage circuit 202A, 202B outputs a value (i.e. a current or voltage) on the data output 222A, 222B that is derived from the stored value. When the second control input 220A, 220B is deactivated then there is no output (or rather, an output that is interpreted as '0').

Note that read activation and write activation are not mutually exclusive. When both are activated at the same time the data output 222A, 222B is derived from the data input 216A, 216B as well as the data input value being stored.

The sum circuit 206 and the exponentiating circuit 208 function in the same way as the respective circuits of FIG. 1.

The output 230 of the exponentiating circuit 208 is used as the output of the overall analog multiplier circuit, and is also connected to the inverting input $V_{in-}$ 214A, 214 of the differential amplifiers 200A, 200B.

Whilst the analog multiplier circuit of FIG. 2 functions to perform multiplication operations in a similar way to the analog multiplier circuit of FIG. 1, the circuit of FIG. 2 is less efficient and less compact when implemented.

Figure 3A:
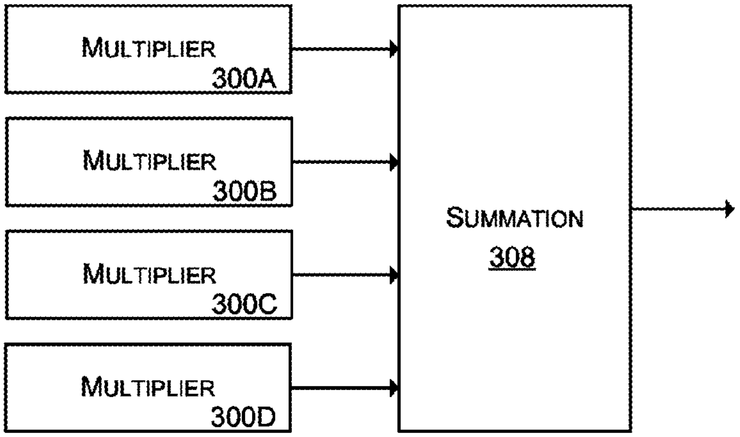
FIG. 3A is a schematic diagram of several analog multipliers with outputs connected to an adder.

FIG. 3A is a schematic diagram of several analog multipliers with outputs connected to an adder. The structure of the analog multiplier circuits of FIG. 1 and FIG. 2 enable deployment of large numbers of such analog multiplier circuits on a single chip. An adder comprising connections with at least two analog multiplier circuits and a summation circuit can be implemented, for example, in order to enable a sum-of-products function, i.e. an implementation of the function $F(\underline{A},\underline{B})=\Sigma A_i \cdot B_i$ (where $\underline{A}$, $\underline{B}$ are vectors of elements—$\underline{A}=(A_0, A_1, A_2 \ldots)$ and similar for $\underline{B}$).

A simple adder is implemented by connecting a plurality of analog multiplier circuits 300A, 300B, 300C, 300D to a same summing circuit 308. Such a summing circuit is, in various examples, a summing circuit functioning internally in the same way as the summing circuits 206 and 106 of FIG. 2 and FIG. 1 respectively. Summing circuit 308 receives as input the outputs of each analog multiplier circuit 300A, 300B, 300C, 300D, and outputs an analog signal which corresponds to the sum of the inputs to the summing circuit 308.

Figure 3B:
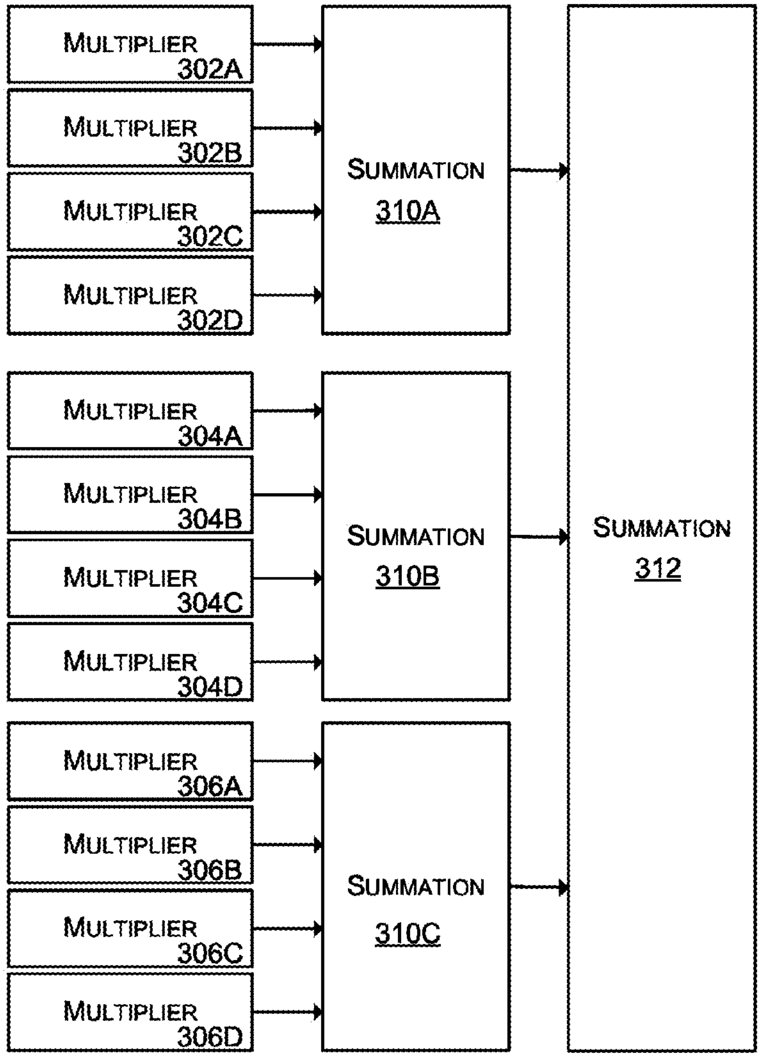
FIG. 3B is a schematic diagram of several analog multipliers with outputs combined using a hierarchical adder.

FIG. 3B is a schematic diagram of several analog multipliers with outputs combined using a hierarchical adder. This adder is similar in function to the adder of FIG. 3A, but comprises two summing circuits in addition to connections a plurality of analog multiplier circuits, in order to provide, overall, a sum-of-products or 'multiply-add' operation/function. At least two analog multiplier circuits 302A, 302B, 302C, 302D are connected to a same summing circuit 310A, corresponding in functionality to the summing circuit 308 of FIG. 3A. Additionally, at least two other multiplier circuits 304A, 304B, 304C, 304D are connected to a same other summing circuit 310B, corresponding in functionality to the summing circuit 308 of FIG. 3A. In various examples, at least two further multiplier circuits 306A, 306B, 306C, 306D are connected to a same further summing circuit 310C. Each of the summing circuits 310A, 310B, 310C are, in various examples, referred to as a 'first layer summing circuit'. Each of the summing circuits 310A, 310B, 310C are connected to a summing circuit 312 which takes as input the outputs of each summing circuit 310A, 310B, 310C and computes a sum of the inputs, which is output by the summing circuit 312. In various examples, summing circuit 312 is referred to as a 'second layer summing circuit'. In various examples, each of the summing circuits 310A, 310B, 310C, 312 functions internally in the same way as summing circuits 206 and 106 of FIG. 2 and FIG. 1 respectively. In various examples, the circuits referred to herein with elements or connections receiving signals instead have one or more of their elements and connections arranged to receive such signals.

Figure 4A:
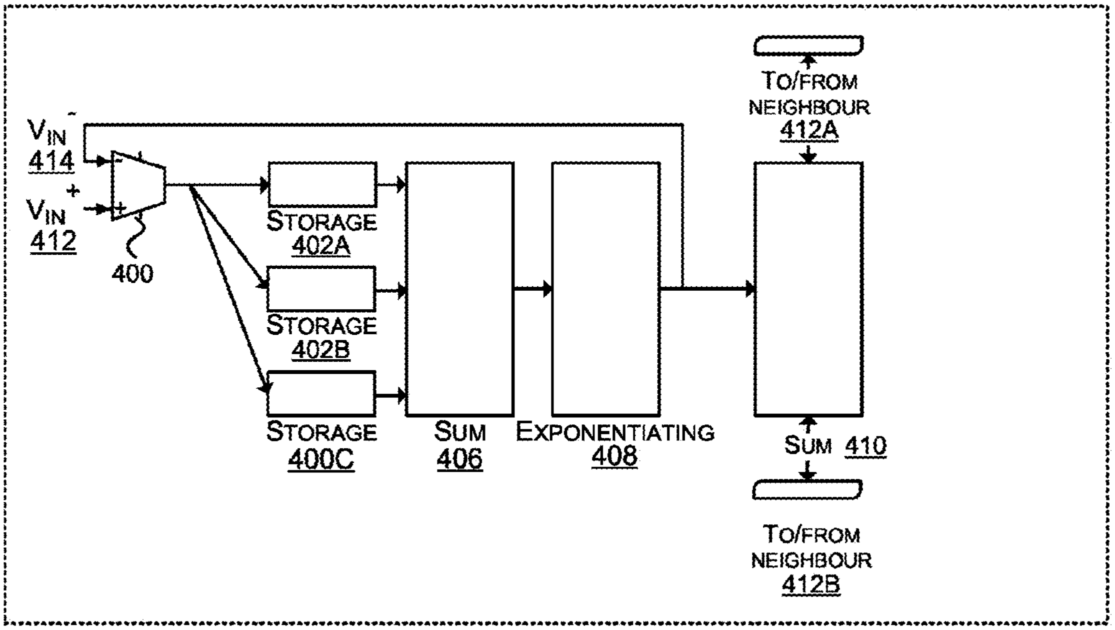
FIG. 4A is an example of an analog multiplier circuit with summation.

FIG. 4A is an example of an analog multiplier circuit comprising two summation circuits. In addition to the adder structure as described in FIG. 3A and FIG. 3B, a summation of the outputs of multiple analog multiplier circuits is in various examples implemented by including a portion of the adder structure within each analog multiplier circuit. This structure enables the loading of analog multiplier circuits in parallel, with for example the sequence of operations: load scale voltage, load $A_i$, load $B_i$, compute $A_i*B_i$/scale, which are required to perform a multiplication of $A_i$ and $B_i$ scaled (as described above) by the scale voltage using the analog multiplier circuit, running in parallel, in all analog multiplier circuits of an adder connected to or comprised in an array comprising analog multiplier circuits, simultaneously. The analog multiplier circuit of FIG. 4A comprises a differential amplifier 400, storage circuits 402A, 402B, 402C, sum circuit 306 and exponentiating circuit 408, where each of these components function respectively in the same way and are connected in the same way as the corresponding components of the analog multiplier circuit of FIG. 1. The analog multiplier circuit of FIG. 4A additionally comprises a summing circuit 410 connected to receive an input as the output of the exponentiating circuit 408 (which is also connected to the inverting input 414 of the differential amplifier 400), and which is connected to neighbouring summing circuits of neighbouring analog multiplier circuits in an array comprising a plurality of analog multiplier circuits, such that the output of the summing circuit 410 is summed with the neighbouring 412A, 412B summing circuits, and such that a sum across all analog multiplier circuits is enabled to be processed in parallel. The summing circuit 410 takes as input an analog signal from the exponentiating circuit 408, and receives analog signals from neighbouring analog multiplier circuits 412A, 412B, computing a sum of all inputs. In various examples, the summation circuit 410 is implemented as described with respect to FIG. 9A or FIG. 9B below, in that the summing circuit 410 enables the sharing of charge and/or voltage across neighbouring summing circuits as illustrated 412A, 412B. In various examples, a directional implementation of the summing circuit 410 is used, wherein the summing circuits 410 of each analog multiplier circuit are implemented such that a first summing circuit receives the output from the exponentiating circuit 408 and outputs the value to a second summing circuit 410 of a neighbouring analog multiplier circuit. The second summing circuit 410 receives the input from the first summing circuit, and adds the output of the exponentiating circuit 408 associated with the second summing circuit 410 to the input, propagating the output to a third summing circuit 410 of a neighbouring analog multiplier circuit, which performs similar operations to the second summing circuit. This repeats (and is performed using only two summing circuits, in various examples), until the sum is complete. As such, the sum over analog multiplier circuit outputs is performed directionally, where a final summing circuit 410 provides an output of the overall sum. In various examples, a neighbouring analog multiplier circuit is a physically neighbouring circuit, or a circuit connected directly. In various examples, this sum is provided as an output of the analog multiplier circuit.

Figure 4B:
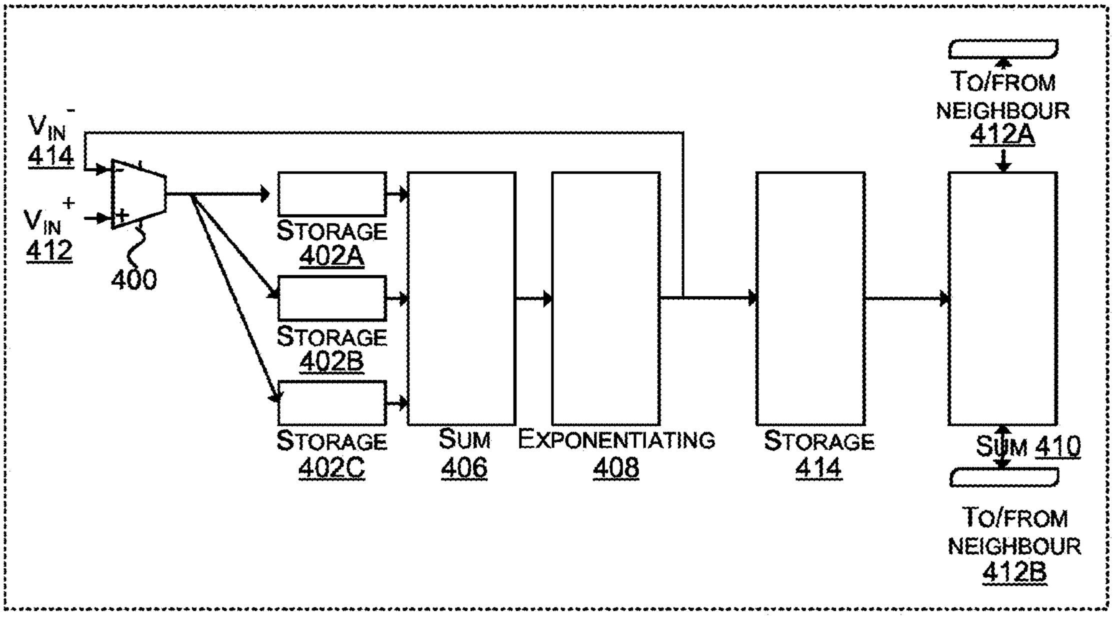
FIG. 4B shows the arrangement of FIG. 4A with a storage element included between multiply and sum stages.

FIG. 4B shows the arrangement of FIG. 4A with a storage element included between multiply and sum stages. The analog multiplier circuit of FIG. 4B comprises a differential amplifier 400, storage circuits 402A, 402B, 402C, sum circuit 406, and exponentiating circuit 408, corresponding to those elements of FIG. 4A. FIG. 4B comprises an additional storage circuit 414 receiving as input the output of the exponentiating circuit 408, and connected to summing circuit 410, which has the same functionality as the summing circuit 410 of FIG. 4A, but that receives input from the storage circuit 414 as opposed to the output of the exponentiating circuit 408. The storage circuit 414 functions, in various examples, in the same internal way as the storage circuits 402A, 402B, 402C which correspond to the storage circuits of FIG. 1. As such, FIG. 4B enables the storing of the output of the exponentiating circuit 408 whilst the summing circuit 410 is performing its respective calculations, which enables the overlapping of computing the sum of one set of analog multiplier circuit operations (i.e. the computing the sum of a first output of the exponentiating circuit 408) with the performing of the next multiplication (i.e. the computing of a second output of the exponentiating circuit 408). In various examples, this overlapping is enabled by providing a first control signal to enable the input into the summing circuit 410 of an analog signal from the storage circuit 414 at a first moment whilst providing a control signal to disable the storing of a first output of the exponentiating circuit 408 and causing the analog multiplier circuit to begin computing a second exponentiating circuit 408 output for a new input analog signal 412, and subsequently disabling the first control signal and providing a second control signal to enable the storing of the second output of the exponentiating circuit 408, once the summing 410 has received the necessary input from the storage circuit 414 in order to compute the sum of the summing circuit 410.

Figure 5:
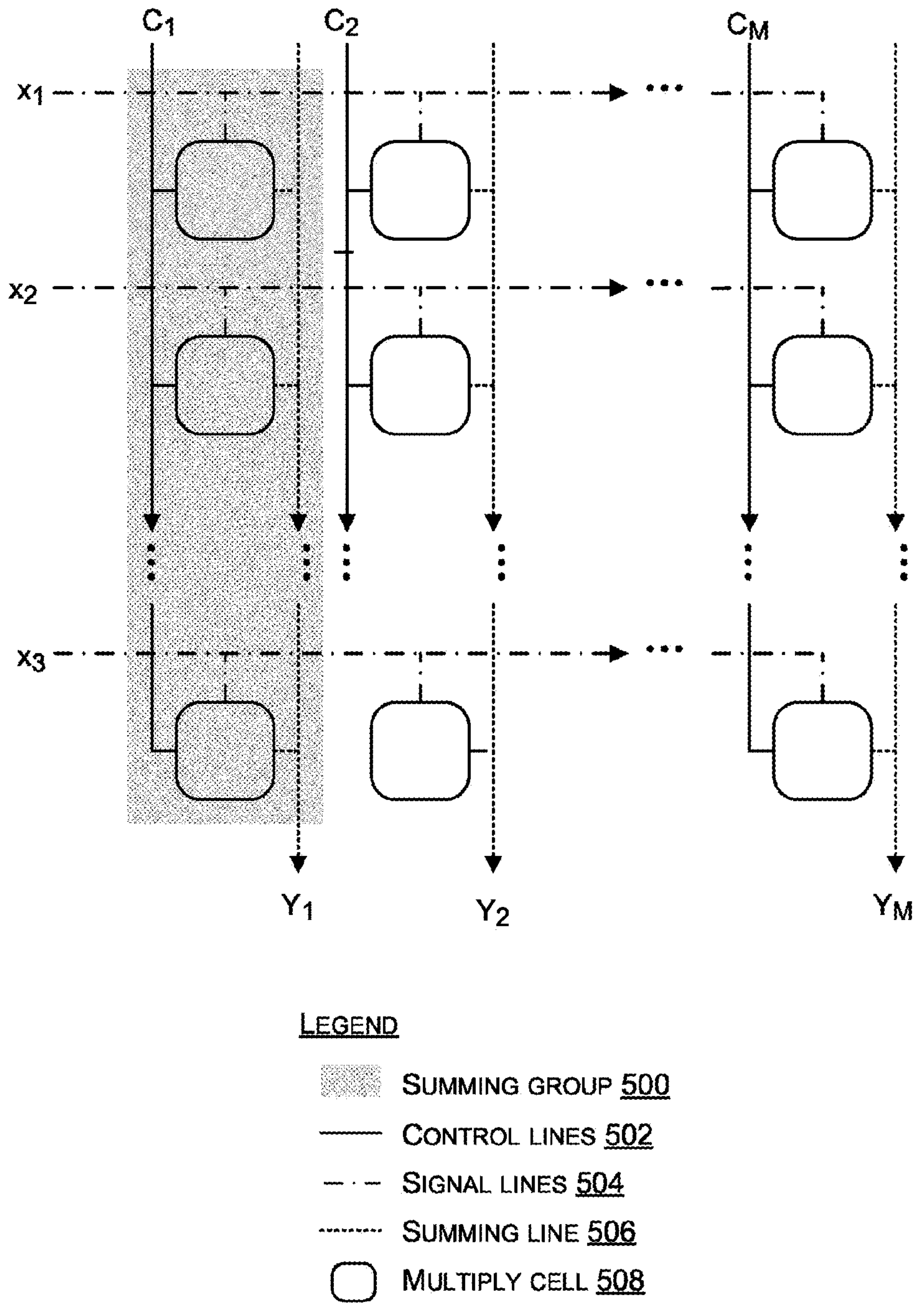
FIG. 5 is a schematic diagram of an array of multiply circuits in a non-hierarchical arrangement.

FIG. 5 is a schematic diagram of an array of multiply circuits in a non-hierarchical arrangement. As described above, the analog multiplier circuit of FIG. 1 can be implemented in an array comprising a plurality of analog multiplier circuits, for the purpose of, in various examples, performing aspects of vector or matrix multiplication. As also described above, such analog multiplier circuits can be combined in an adding circuit which computes the sum of outputs of a plurality of analog multiplier circuits, in various examples the analog multiplier circuits combined in such a way as to enable parallel operations. FIG. 5 illustrates an example implementation of an array of multiply cells 508 corresponding in various examples to analog multiplier circuits as described herein, such as an array that is in various examples positioned on a computing chip. Each multiply cell 508 positioned along a first dimension of the array is connected to a same control line 502 for providing control inputs such as, but not limited to, to enable or disable aspects of the storage circuits of each multiply cell 508. In various examples, a control signal is provided to a multiply cell 508 via a control line 502. Each multiplier cell 508 along the first dimension of the array is further connected to a same summing line, which receives an output of each multiplier cell, such that a sum is computed (indicated by the summing group 500) of the outputs across each multiplier cell 508 as enabled via the control line 502, along the first dimension. Each multiplier cell 508 along a second dimension of the array is connected to a same signal line 504, which is used to provide an input analog signal to the multiply cells 508. In various examples, an input analog signal is provided to the multiply cells 508 via a signal line 504.

Values $x_i$ (i.e. $x_1$, $x_2$, $x_3$) of FIG. 5 are input values to the analog multiplier circuits of the array connected to the same signal line 504, the input values represented by an analog signal sent along the respective signal line 504. Values $C_i$ (i.e. $C_1$, $C_2$, $C_M$) are control values input to the analog multiplier circuits of the array connected to the same control line 502, the control values represented by a signal, in various examples an analog signal, sent along the respective control line 502. Values $Y_i$ (i.e. $Y_1$, $Y_2$, $Y_M$) are summation values associated with output signals from analog multiplier circuits of the array connected to the same summing line 506, the summation values represented by an analog signal present in the summing line 506.

As referred to herein, a line corresponds to a connection, in various examples a wire. In various examples, a multiply cell 508 corresponds to a plurality of analog multiplier circuits comprised in a larger analog multiplier circuit, where the values defined above are input into the multiply cell 508 and corresponding output values are obtain from the multiply cells 508.

As such, in various examples, the analog multiplier circuit as described thus far further comprises an array of multiplier circuits arranged such that each column of the array comprises at least two multiplier circuits arranged to provide their fifth analog signal to the same first layer summing circuit via a same summing connection, each of the at least two multiplier circuits further connected via a same control connection for receiving control signals; the array of multiplier circuits further arranged such that each row of the array comprises at least two multiplier circuits connected via a same input connection for receiving input analog signals; wherein the array is arranged to compute at least a portion of the product of a matrix and a vector by: receiving, along each row via the same input connection, an analog signal corresponding to a respective element of the vector, wherein the respective element of the vector is stored in a first storage circuit of every multiplier circuit of the row; receiving, along each row via the same input connection, analog signals corresponding to respective elements of a row of the matrix, wherein the respective elements of the row of the matrix are stored in a second storage circuit of different multiplier circuits of the row; causing the multiplier circuits of each column to perform a multiply operation on the stored elements of the matrix and the vector, and output the fifth analog signal of each multiplier circuit of the column to the summing connection; and causing each first layer summing circuit to sum the analog signals of the summing connection to which the first layer summing circuit is connected.

This implementation is particularly advantageous when performing matrix-vector multiplication: $\underline{C}=(\underline{A}*\underline{B})$ where each element of the vector $\underline{C}$ is computed from the matrix $\underline{A}$ and vector $\underline{B}$ according to the equation $C_i=\Sigma_j A_{i,j} B_j$.

Figure 6:
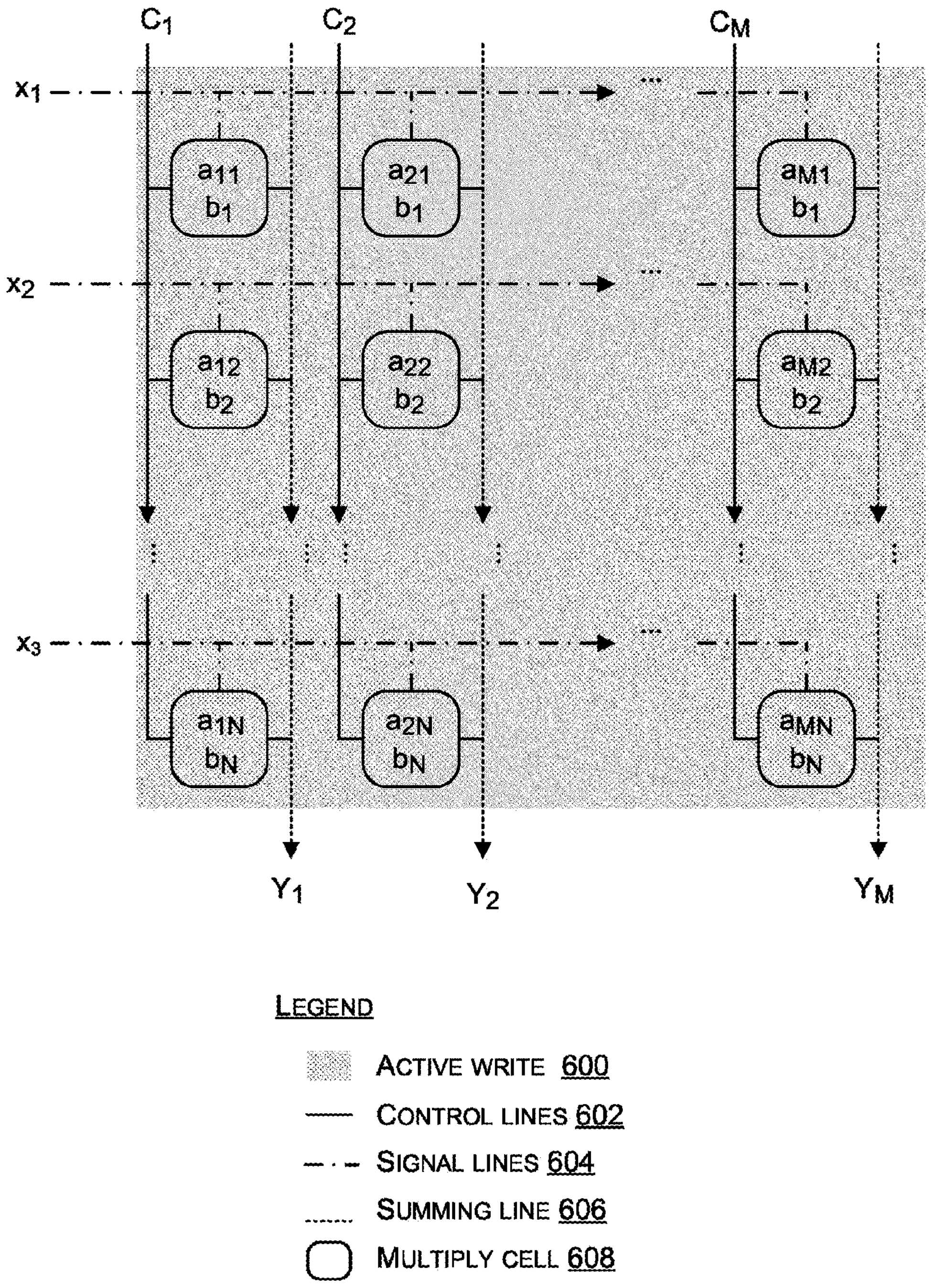
FIG. 6 shows the arrangement of FIG. 5 and writing vector $\underline{B}$ to a plurality of columns in parallel.

FIG. 6 shows the arrangement of FIG. 5 whilst storing vector $\underline{B}$, and with elements for processing the matrix-vector multiplication $\underline{C}=(\underline{A}*\underline{B})$ stored on each multiply cell.

In the array implementation of FIG. 6, i is a column index (i.e. along the first dimension of the array) and j a row index (i.e. along the second dimension of the array). Summation of partial results is along columns, as indicated by the summing group 500 of FIG. 5. Of particular interest is that all columns of the matrix $\underline{A}$ are combined with the same vector $\underline{B}$. In the array implementation this means that the elements of $\underline{B}$ can be broadcast to all multiplier cells 608 in the same row simultaneously, making for a fast load of $\underline{B}$ into the multiplier array—it takes a single write cycle to load all elements of $\underline{B}$ into the array using data input wires (signal lines 604) that are shared across a row of the array.

Figure 7:
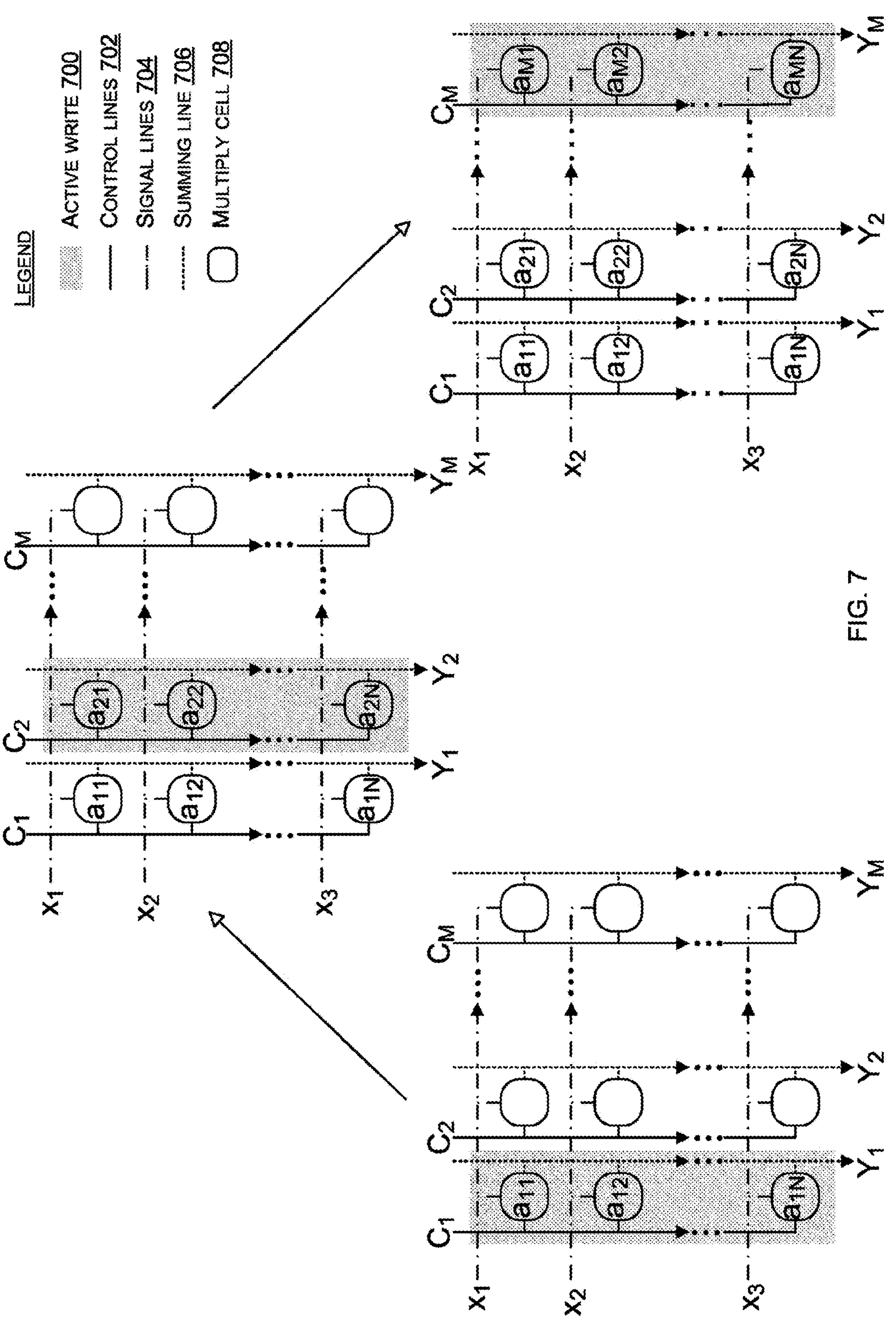
FIG. 7 shows the arrangement of FIG. 5 and writing a matrix $\underline{A}$ to the array column by column.

FIG. 7 shows the arrangement of FIG. 5 and writing a matrix $\underline{A}$ to the array column by column. Loading of $\underline{A}$ in the multiplication $\underline{C}=(\underline{A}*\underline{B})$ is a slower process, as the individual elements of $\underline{A}$ are potentially all different. In the example of FIG. 7, the elements $a_{ij}$ correspond to elements of matrix $\underline{A}$. In various examples, the same row-spanning data input wires (signal lines 704) are used as for $\underline{B}$ to write a column in a single cycle, but the separate columns are then written sequentially, as illustrated by the progression of the active write 700 region of FIG. 7. In this context and as defined herein, writing refers to providing and storing in a storage circuit of a multiply cell 708. This means that the control signals provided by the control lines 702 are in various examples shared within columns, so that all multiply cells 708 in a column may be read from (and/or written to) simultaneously, but with different input data in each row.

In various examples, depending on the source of the data that makes up the matrix $\underline{A}$, the elements of $\underline{A}$ are loaded into the multiplier array in a row-by-row rather than column-by-column order (i.e. in the orthogonal direction to the vector $\underline{B}$). If this is the case then, in various examples, an input multiplexer is added, to choose between horizontal and vertical data inputs, and to route some read enables and write enables horizontally rather than vertically. In various examples, the storage cells are separated into 'horizontally-selected' and 'vertically-selected' subgroups, so that it is not necessary to duplicate the control signals for all storage cells in both directions.

In various examples, an implementation of a multiplexer in order to enable the operations described above but with vertical inputs comprises the analog multiplier circuit described thus far with respect to an array, further comprising a multiplexer at each analog multiplier circuit, the multiplexer comprising a first and a second multiplexer input connection, a select connection, and a multiplexer output connection, the first multiplexer input connection arranged to receive as input an analog signal from the control connection of a column of the array in which an associated analog multiplier circuit is located, the second multiplexer input connection arranged to receive as input an analog signal from the input connection of a row of the array in which an associated analog multiplier circuit is located, wherein the output connection is arranged to output an analog signal of the input analog signals to the analog multiplier circuit with which the multiplexer is associated, wherein the select connection is configured to receive as input a control signal which is used to choose which input analog signal to output, wherein the multiplexer associated with an analog multiplier circuit is arranged to receive a control signal via one of: the control connection of the column of the array of the analog multiplier circuit, the input connection of the row of the array of the analog multiplier circuit, and provide the control signal to the analog multiplier circuit, and wherein the array is arranged to compute at least a portion of the product of a matrix and a vector by: providing as input the corresponding analog signal of a respective element of the vector to each analog multiplier circuit of the array using the multiplexer associated with the analog multiplier circuit, wherein the corresponding analog signal is received by the multiplexer via one of: the control connection of the column of the array of the analog multiplier circuit, the input connection of the row of the array of the analog multiplier circuit; providing as input the corresponding analog signal of a respective element of the matrix to each analog multiplier circuit of the array using the multiplexer associated with the analog multiplier circuit, wherein the corresponding analog signal is received by the multiplexer via one of: the control connection of the column of the array of the analog multiplier circuit, the input connection of the row of the array of the analog multiplier circuit; causing the multiplier circuits of each column to perform a multiply operation on the stored elements of the matrix and the vector, and output the fifth analog signal of each multiplier circuit of the column to the summing connection; and causing each first layer summing circuit to sum the analog signals of the summing connection to which the first layer summing circuit is connected.

The differential amplifier as defined herein is the largest single component of the analog multiplier circuits described herein, such as in FIG. 1. In various examples a differential amplifier is shared between two or more multiplier cells. This results in a more compact physical implementation, but requires that the writes to the pair of multipliers are done in series rather than in parallel—i.e. there is a size vs. speed tradeoff.

The pairing of multipliers can be horizontal or vertical in the array implementation such as described in FIG. 5, i.e. having outputs that go to separate adder columns, or to the same one. In both cases, in various examples, a multiplexer is included in the feedback path from exponentiation circuits to the amplifier in order to select which feedback path including a single exponentiation circuit is in use, as only a single path comprising a storage circuit, summing circuit and exponentiating circuit can be part of a feedback loop at one time. In various examples, a multiplexer is used on an input analog signal in order to preserve separate 'per-row' vector inputs (in various examples this is implemented only in a version of the circuit wherein an amplifier is shared per column). If this multiplexer is included then, in various examples, it uses the same control signal as the feedback multiplexer, as there is correlation between the input source and the feedback source. More detail is given below with reference to FIGS. 17A and 17B.

These shared amplifier circuits in various examples have separate storage enable control signals (for example signals received via 218A, 218B of FIG. 2) for the sets of storage circuits.

However they in various examples have common read enable control signals (for example signals received via 220A, 220B of FIG. 2). This is because the storage enable control signals are therefore able to route the differential amplifier output only to those circuits that are to be included in the feedback path of the differential amplifier. If storage circuits in the unselected portion of a combined (i.e. sharing one or more components) circuit are also connected to their exponentiation circuit then there is no way for them to affect the active feedback path. However, in various examples it is beneficial to be able to separately deselect storage circuits in order to save active power.

In applications of the present invention to operations involving, for example, hundreds of thousands or millions of matrix or vector entries, such as for matrix-vector multiplication in artificial intelligence contexts, the impact of constructing a hundreds of thousands or millions multiply cell array based on the present invention is considered. In various examples, long wires that connect to every multiplier in a row or column across the entire array have relatively high total capacitance and/or total resistance, leading to significant delays in signals that propagate across the array. For such wires, both resistance and capacitance are proportional to length, and so the intrinsic wire delay (the RC delay) increases superlinearly with length. In various examples, Current flows in power supply wires cause voltage drops (known as 'IR drop'), so that supply voltages for multipliers in the centre of the array are lower than those at the edge. In turn this can impact operating speed and other aspects of circuit performance.

When constructing large arrays of repeating elements, in various examples, the single large array is partitioned into multiple identical sub-arrays, which allows the insertion of features to mitigate the effects described above.

Namely, in various examples, additional power supply routing is enabled to reduce IR drop, buffering of long input wires to partition long resistance/capacitance delays into multiple shorter (and therefore fast segments) is implemented by adding buffers between sub-arrays, and long wires are replaced with hierarchical wiring, for instance a 'global' wire that crosses the complete array but only connects to buffers at the edges of sub-arrays, where those buffers then connect to 'local' wires within their respective sub-arrays. The 'global' wires in various examples have a reduced capacitive load compared to a single wire connecting to every element in a row or column of an array implementation as described herein, and are therefore faster, where the same is true of individual local wires.

Additionally, control signals are in various examples skewed in either buffers between sub-arrays or going to buffers between global and local wires, so that the activity in the different sub-arrays is skewed in time, which means that peak currents, and therefore peak IR drops, are reduced.

Figure 8:
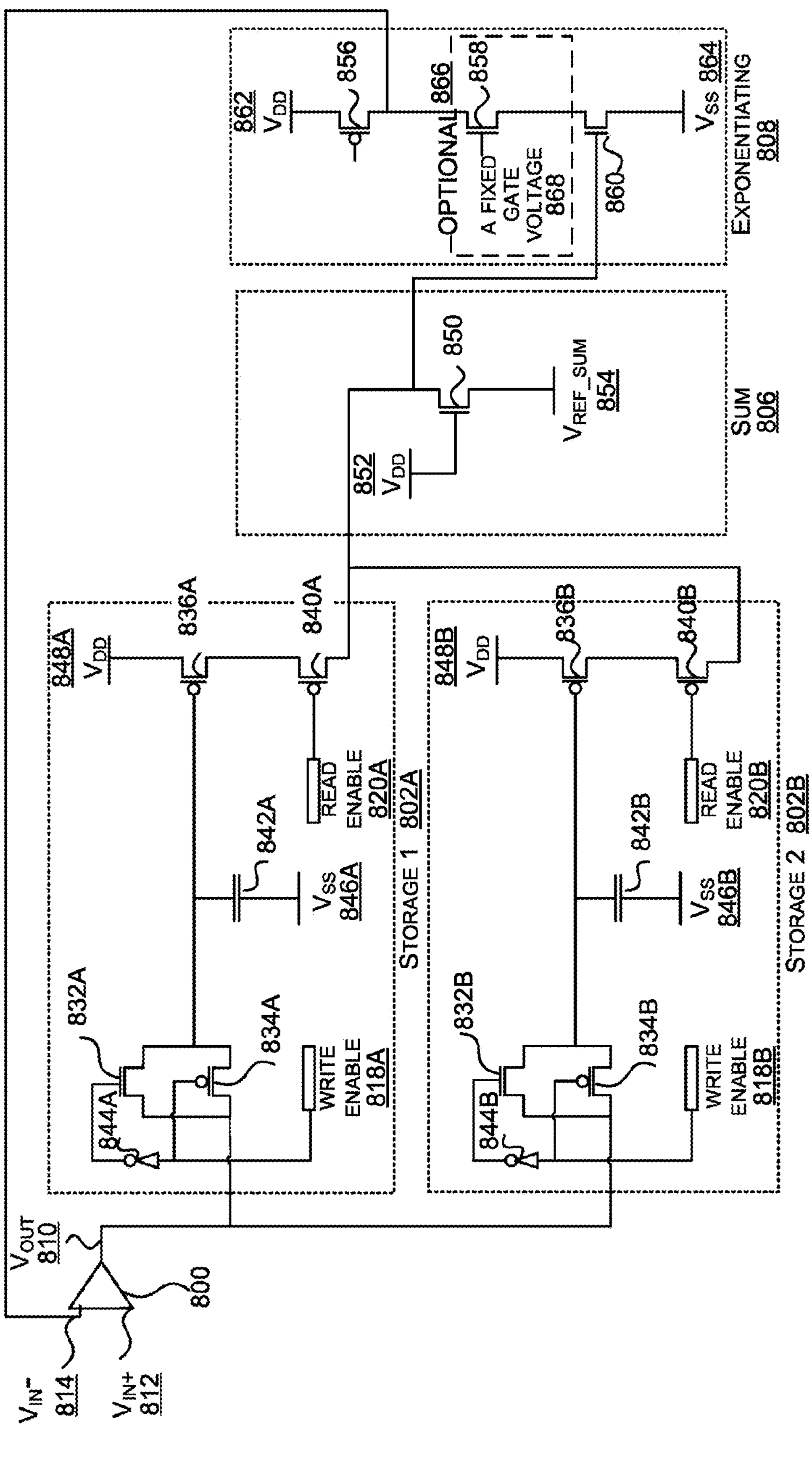
FIG. 8 is an example implementation of an analog multiplier circuit.

FIG. 8 is an example implementation of an analog multiplier circuit as described herein, wherein the interior workings of the component circuits are illustrated.

The exponentiating circuit 808, which corresponds to the exponentiating circuit of FIG. 1 and the exponentiating circuits as described herein, consists of two transistors, in various examples MOS transistors; one n-channel transistor 860 and one p-channel transistor 856. The n-channel transistor 860 is operating in its subthreshold region (i.e. $V_{gs}<V_T$), where the drain current, $I_d$ is exponentially dependent on $V_{gs}$ (the gate-to-source voltage). The p-channel transistor 856 operates in its linear region, and is used as a load resistor, so that the source-drain voltage drop is proportional to current, and therefore to the exponential of the gate voltage of the n-channel transistor.

The gate voltage of the n-channel transistor 860 is, in various examples, limited to less than the threshold voltage ($V_T$) of the transistor in order to achieve the exponential behaviour. Therefore if implemented in a process that includes transistor variants with different threshold voltages then there is an advantage to using a high-threshold transistor for this element.

Optionally, in various examples an additional n-channel transistor 858 between the subthreshold transistor 860 and the p-channel transistor 856 is included. This extra transistor 858 has a fixed gate voltage 868, so creates a cascode circuit to improve isolation between the other two transistors 856 and 860. This reduces the variation in $V_{ds}$ for the subthreshold transistor 860 and improves the accuracy of the exponential dependence of current on voltage.

Each transistor as described herein, including transistors 860, 858, 856, comprises a gate connection, a source connection, and a drain connection, as defined conventionally. The source connection of the transistor 860 is connected so as to receive a constant analog signal corresponding to a negative supply analog signal, in various examples a ground voltage, or 0V. In various examples, the source voltage corresponds to a negative voltage. In various examples, the negative supply analog signal corresponds to a signal of a negative supply line. In various examples, a first negative supply analog signal is different to a second negative supply analog signal, and in various alternative examples, all negative supply analog signals are substantially equivalent.

Reference to a negative supply analog signal as described herein should be interpreted to refer to the same negative supply analog signal across elements receiving the signal, or a different negative supply analog signal across the elements. The same concept, in various examples, applies also to a positive supply analog signal as described herein.

The drain connection of the transistor 860 is connected to the drain connection of the transistor 856 and, via the same connection, the inverting input 814 of the differential amplifier 800. The source connection of the transistor 856 is connected so as to receive a constant analog signal corresponding to a positive supply analog signal, in various examples a positive voltage. The gate connection of the transistor 856 is connected so as to receive a constant analog signal.

The gate connection on transistor 860 is connected to receive the output of the summing circuit 806.

It should be noted that the examples described above and below with respect to transistor-specific implementations in various examples are flipped, such that n-type transistors and p-type transistors are changed to p-type transistors and n-type transistors respectively, and such that positive supply analog signals are changed to negative supply analog signals, and vice versa. As referred to herein, p-type and n-type correspond to n-channel and p-channel transistors respectively.

As such, more generally, the exponentiating circuit (i.e. exponential circuit) comprises: a type-one transistor comprising a gate connection, a source connection, and a drain connection, the type-one transistor operating in a sub-threshold region such that an output analog signal via the drain connection is exponentially dependent upon a change between an input analog signal received at a gate connection of the type-one transistor and a first constant analog signal received via the source connection; and a type-two transistor comprising a gate connection, a source connection, and a drain connection, the type-two transistor operating in a linear region such that an analog signal change between analog signals received via the source and the drain connection is proportional to an analog signal output via the drain connection. Herein, the gate connection of the type-one transistor is arranged to receive the fourth analog signal and the source connection of the type-one transistor is arranged to receive the first constant analog signal, the source connection of the type-two transistor is arranged to receive a second constant analog signal and the drain connection of the type-two transistor is arranged to receive an analog signal associated with the analog signal output by the type-one transistor which is exponentially dependent upon the analog signal change between the analog signals received at the gate connection and the source connection of the type-one transistor, and the drain connection of the type-two transistor is further arranged to output the fifth analog signal which is exponentially dependent upon the analog signal change between the analog signals received at the gate connection and the source connection of the type-one transistor. Additionally, the gate connection of the type-two transistor is arranged to receive a third constant analog signal. In various examples, the first constant analog signal is a negative supply analog signal and the second constant analog signal is a positive supply analog signal, and the type-one transistors are are n-channel transistors and the type-two transistors are p-channel transistors.

In various examples, the type-one transistors are p-channel transistors and the type-two transistors are n-channel transistors; and the first constant analog signal is an analog signal associated with a positive supply signal, and the second constant analog signal is an analog signal associated with a negative supply signal. These definitions and examples apply to the examples outlined below in addition to those above, and to the type-one and type-two transistors as described herein.

The sum circuit 806 comprises an n-channel transistor 850, in various examples a MOS transistor, operating in the linear region, so that its drain voltage (which is in various examples, limited to be less than the threshold voltage of the n-channel transistor in the exponentiating circuit 860) is substantially proportional to the sum of the currents into it from the storage circuits 802A, 802B. The gate connection of the transistor 850 is connected to a constant positive supply analog signal. The source connection of the transistor 850 is connected to receive a constant negative supply analog signal, which in various examples corresponds to a positive analog signal. In an example transistor 850 is connected to Vsum ref 854.

The drain connection of the transistor 850 is connected to the outputs of the storage circuits 802A, 802B along a same connection so as to receive as input the outputs of, in various examples all, storage circuits 802A, 802B.

More generally, the summing circuit (i.e. sum circuit) comprises a type-one transistor comprising a gate connection, a source connection, and a drain connection, the drain connection of the type-one transistor arranged to receive the storage analog signals from the at least two storage circuits respectively, the type-one transistor operating in a linear region such that an output analog signal via its drain connection is proportional to a sum of the storage analog signals, the source connection of the type-one transistor arranged to receive a first constant analog signal and the gate connection of the type-one transistor arranged to receive a second constant analog signal, and the drain connection of the type-one transistor further arranged to output to the exponentiating circuit such that the summing circuit outputs the fourth analog signal proportional to the sum of the storage analog signals.

Each storage circuit 802A, 802B comprises a write enable pass gate comprising a p-channel transistor 834A, 834B, an n-channel transistor 832A, 832B, and an inverter 844A, 844B. In various examples, the transistors described herein are MOS transistors. Each storage circuit 802A, 802B further comprises a capacitor 842A, 842B for storage, a p-channel transistor 836A, 836B for, in various examples, converting voltage to current, and a p-channel transistor 840A, 840B for enabling output.

The n-channel transistor 832A, 832B and the p-channel transistor 834A, 834B of each pass gate are connected in parallel, wherein a source connection of the n-channel transistor 832A, 832B and a drain connection of the p-channel transistor 834A, 834B are arranged with a common connection, wherein a drain connection of the n-channel transistor 832A, 832B and a source connection of the p-channel transistor 834A, 834B are arranged with a common connection and with complementary gate connections derived from a write enable control signal 818A, 818B, where the gate connection of transistor 832A, 832B is connected to the output of inverter 844A, 844B, and the gate connection of the transistor 834A, 834B is connected to the input of the inverter 844A, 844B and connected so as to receive, via the same connection, a write enable control signal 818A, 818B. In various examples, the inverter 844A, 844B is alternatively connected to output to the gate connection of the transistor 834A, 834B, and the gate connection transistor 832A, 832B is connected to the input of the inverter 844A, 844B and along the same connection to receive the write enable control signal 818A, 818B.

As defined herein, a control signal is an input to the analog multiplier circuit used to control its operation. One common connection of the transistors of each pass gate are connected to the same differential amplifier 800, the other common connection to a same first connection of the capacitor for storage 842A, 842B of the respective storage circuit 802A, 802B. A second connection of the capacitor on the opposite side of the capacitor to the first connection (i.e. on a second plate, where the first plate is connected to the first connection), is connected so as to receive a constant analog signal such as a negative supply.

The transistor 836A, 836B has its gate connected to the capacitor 842A, 842B, so that its gate voltage is determined by the voltage on the capacitor 842A, 842B. The source connection of the transistor 836A, 836B is connected to a constant positive supply analog signal. As described herein, the constant positive supply analog signal is in various examples a constant positive voltage. In various examples, a constant negative supply analog signal is a ground voltage or a negative voltage, such as a voltage associated with a negative supply rail. The drain connection of the transistor 836A, 836B is connected to the source connection of transistor 840A. The transistor 840 has its gate connected so as to receive a control signal, in various examples an active-low read enable control signal. In various examples, an active-low read enable control signal corresponds to a read control signal as described above, where the signal enables the reading of a stored value. In various examples, as defined herein, reading corresponds to outputting an analog signal corresponding to a stored value. In various examples, an active low signal means that the signal is low to turn an element on and/or enable the element, and high to turn it off and/or disable it. As described herein, a connection so as to receive (i.e. arranged to receive) a control signal in various examples receives the control signal. The transistor 836A, 836B operates in saturation so that it is acting as a current source with drain current dependent on gate-source voltage but not on drain-source voltage (i.e., convert the gate voltage attached to the storage capacitor to a current on the drain terminal). The transistor 840A, 840B allows this current to pass when, in various examples, its gate voltage is low, but blocks it when the gate voltage is high—i.e. it acts as a switch to enable or disable the flow of the current, and therefore to enable or disable the contents of the storage cell to be included in the input currents to the sum circuit 806, i.e., it is a read enable control gate. The gate connection of the transistor 840A, 840B is connected so as to receive a read enable control signal 820A, 820B, which enables or disables the input of the storage circuit 802A, 802B to the sum circuit 806. The drain connection of the transistor 840A, 840B is connected via a same connection with respect to the other transistor 840B, 840A of other, in various examples all other, storage circuits 802A, 802B, to the drain connection of the transistor 850 of the sum circuit 806.

More generally, the at least two storage circuits each comprise a write-enable pass gate comprising a first type-two transistor comprising a gate connection, a source connection, and a drain connection; a first type-one transistor comprising a gate connection, a source connection, and a drain connection; and an inverter comprising an input and an output connection, wherein the first type-two transistor and the first type-one transistor are connected in parallel, wherein the source connection of the first type-one transistor and the drain connection of the first type-two transistor are arranged with a common connection, and wherein the drain connection of the first type-one transistor and the source connection of the first type-two transistor are arrange with a common connection, wherein a first connection of the common connections of the first type-one transistor and the first type-two transistor is arranged to receive the third analog signal from the differential amplifier, wherein the input connection of the inverter is arranged to receive the first control signal, wherein the output connection of the inverter is arranged to output an analog signal which is received by a gate connection so as to enable complimentary analog signals to be received at the gate connection of the first type-one transistor and the gate connection of the first type-two transistor.

Additionally, the at least two storage circuits each comprise a capacitor comprising two plates, a first connection on a first plate of the capacitor and a second connection on a second plate of the capacitor, the capacitor for storing a value derived from the third analog signal, the first connection of the capacitor arranged to receive an analog signal from a second connection of the common connections of the first type-one transistor and the first type-two transistor, and the second connection of the capacitor arranged to receive a first constant analog signal; a second type-two transistor comprising a gate connection, a source connection and a drain connection, the second type-two transistor operating in saturation such that an output analog signal via its drain connection is substantially proportional to an analog signal change between analog signals received via its gate connection and its source connection, the gate connection of the second type-two transistor arranged to receive an analog signal from the first connection of the capacitor, and the source connection of the second type-two transistor arranged to receive a second constant analog signal; and a third type-two transistor comprising a gate connection, a source connection, and a drain connection, the gate connection of the third type-two transistor arranged to receive the second control signal, the drain connection of the third type-two transistor arranged to receive an analog signal from the drain connection of the second type-two transistor, and the source connection of the third type-two transistor arranged to output an analog signal to the summing circuit such that the storage circuit outputs a storage analog signal derived from the stored value.

As defined herein, a differential amplifier is a well-known circuit element, which in various examples uses standard design practices. For use in the present application, the differential amplifier in various examples has the following properties:

Operation with high gain with input voltages close to the positive supply rail (this follows from the output voltage from the exponentiating circuit being defined relative to the positive supply rail).

Low input offset voltage, especially when operating with voltages close to the positive supply rail (this is to stop small input signals being swamped by the input offset voltage).

High gain, so that the approximation that $V_{in+}-V_{in-}=0$ in the presence of feedback is valid.

Figure 9A:
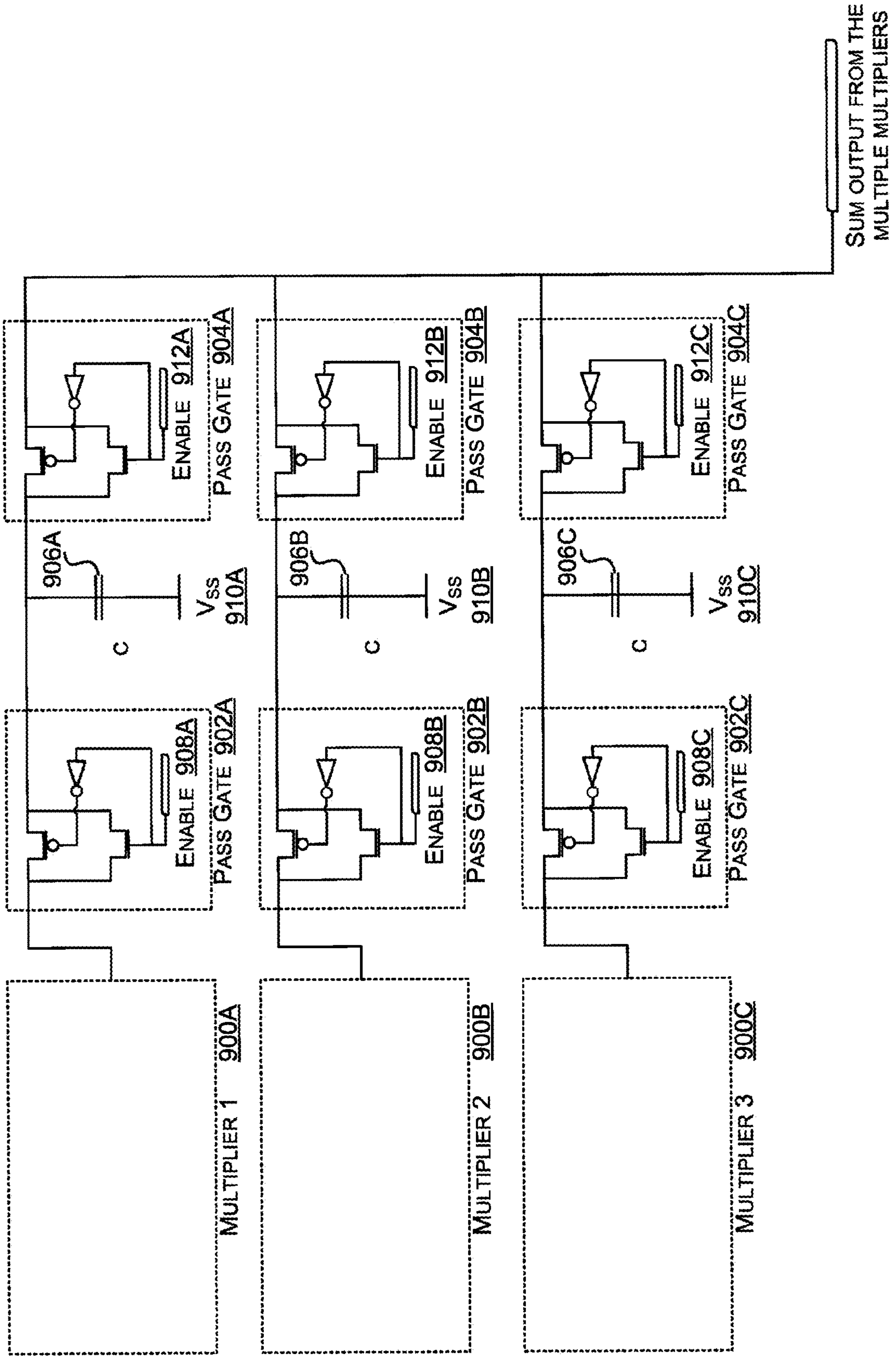
FIG. 9A is an example summation stage circuit for use at an output of an analog multiplier circuit, such as in an adder.
Figure 9B:
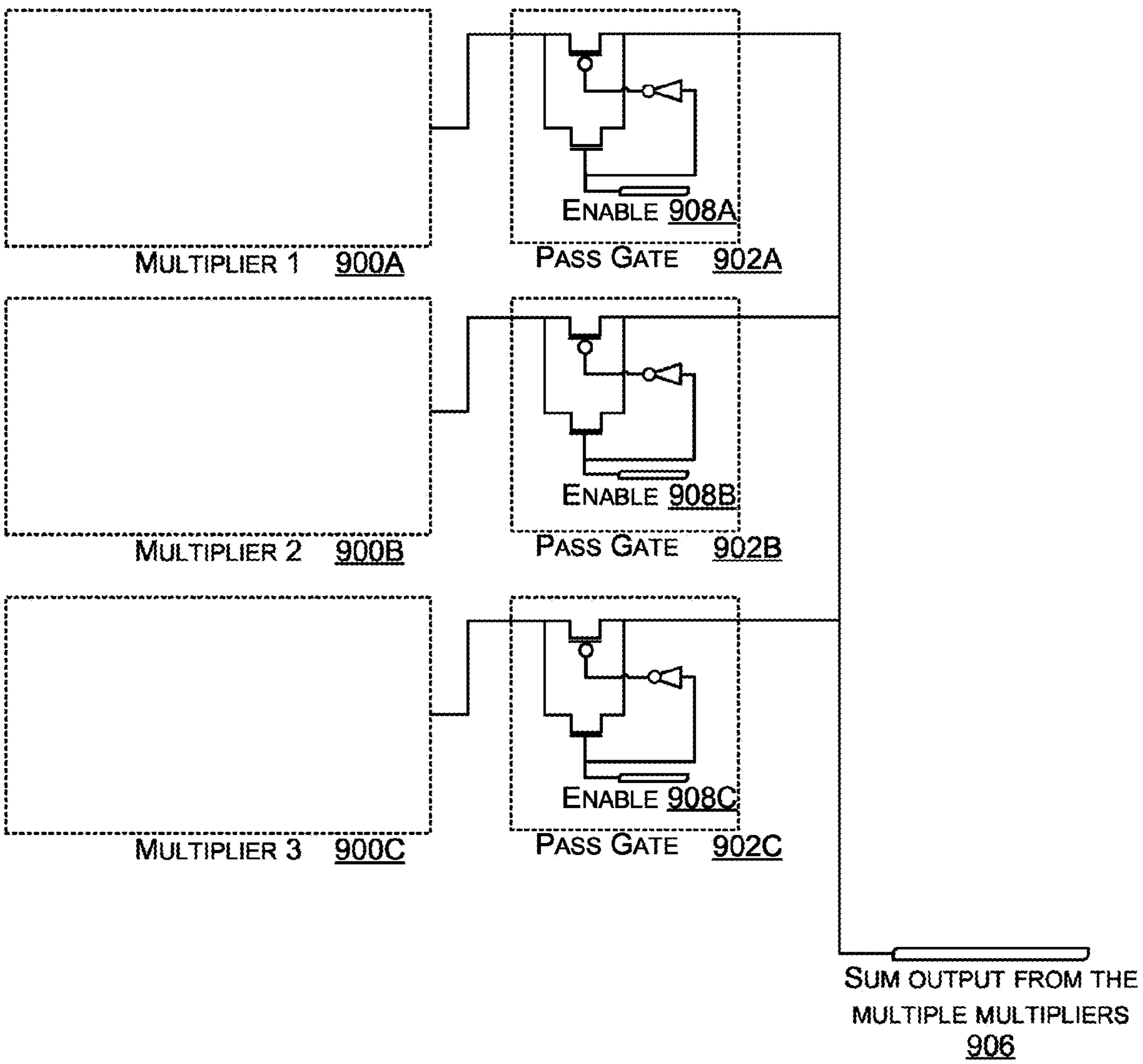
FIG. 9B is another example summation stage circuit.

FIG. 9A is an example summation stage circuit for use at an output of an analog multiplier circuit, such as in an adder, such as the adders of FIGS. 3A and 3B. FIG. 9A comprises a plurality of analog multiplier circuits 900A, 900B, 900C, corresponding to analog multiplier circuits as described herein, that have their outputs connected to a summation stage of an adder, such as stages 308 or 310A, 310B, 310C of FIG. 3A and FIG. 3B respectively. FIG. 9A and FIG. 9B provide implementations, in various examples, of the summing circuit 410 of FIG. 4. The summation stage comprises, for each analog multiplier providing its output to the summation stage, 2 pass gates 902A, 902B, 902C and 904A, 904B, 904C respectively, and a capacitor 906A, 906B, 906C, with one pass gate 902A, 902B, 902C having an input connected to the output of the analog multiplier circuit and the other pass gate having an output connected to a shared connection that links the output of all other pass gates (and acts as the sum output from the input plurality of multipliers). In various examples, as defined herein, a connection corresponds to a wire arranged such that an analog signal is transferable between connected elements. The structure of the pass gates corresponds to the structure of the pass gate of FIG. 8, but with a different control signal per pass gate being received by the inverter and the gate of the p-channel transistor 834A, 834B in FIG. 8. When the first pass gate 902A, 902B, 902C is closed and the second pass gate 904A, 904B, 904C is open, the capacitor 906A, 906B, 906C is charged by the output of the respective analog multiplier circuit 900A, 900B, 900C providing its output to the first pass gate 902A, 902B, 902C. As in FIG. 8, the capacitor 906A, 906B, 906C is connected via a first connection to the output of the first pass gate 902A, 902B, 902C and the input of the second pass gate 904A, 904B, 904C. The capacitor 906A, 906B, 906C is further connected, via a second connection opposite to the first connection (i.e. on a second plate of the capacitor where a first plate is connected to a first connection), to a constant analog source signal 910A, 910B, 910C. When the second pass gate 904A, 904B, 904C is closed and the first pass gate 902A, 902B, 902C is open, charge is shared between the capacitors 910A, 910B, 910C across capacitors of the summing stage associated with closed second pass gates, and reaches a point when the voltage on the same output connection of the summing stage is the average of the initial voltages on the individual capacitors i.e. the result is a weighted sum (with equal weights) of the outputs of the analog multiplier circuits. A summation stage of an adder is defined herein as a first layer summation stage if the summation stage takes as input analog signals from analog multiplier circuits. A summation stage of an adder is defined herein as a second layer summation stage if the summation stage takes as input analog signals from first layer summation stages.

Closed pass gates are defined herein to refer to enabled pass gates that allow an analog signal to flow, and open pass gates are defined herein as disabled pass gates that block an analog signal from flowing. Pass gates are enabled and/or disabled, as defined herein, by the receiving or not of a control signal.

As such, in various examples, the analog multiplier circuit as described thus far comprises at least one additional analog multiplier circuit, wherein the fifth analog signal of each analog multiplier circuit is arranged to be provided to a first layer summing circuit arranged to receive as input the fifth analog signals and arranged to output a summed analog signal proportional to a sum of the input fifth analog signals. In various examples, one or more connections and elements defined herein to be arranged to receive a signal, do receive a signal. In various examples, the inverse is true, in that one or more connections and elements defined herein to receive a signal, are arranged to receive a signal.

In various examples, the same summing connection that acts as the output of the summing stage is provided to a further summing stage which adds inputs from a plurality of summing stages, such as summing circuit 312 of FIG. 3B, which adds inputs corresponding to outputs from summing stages 310A, 310B, 310C, which implement the summing stage as defined in FIG. 9A. In various examples, summing circuit 312 implements the summing stage as defined in FIG. 9A but with the inputs being the outputs of the first layer summing circuit instead of outputs of analog multiplier circuits, and with the single output connection of the summing stage providing an overall output rather than being provided to a second layer summing circuit. It should be noted, as mentioned above, that the n-channel and p-channel transistors are in various examples flipped, and in various examples correspond to the transistors of the summing circuit 312, or in other examples correspond to flipped transistors (i.e. n-channel becomes p-channel and vice versa).

Generally, a first layer summing circuit (i.e. a first layer summation stage) comprises: for each analog multiplier circuit providing its fifth analog signal to the first layer summing circuit: a first pass gate comprising: a first type-two transistor comprising a gate connection, a source connection, and a drain connection; a first type-one transistor comprising a gate connection, a source connection, and a drain connection; and an inverter comprising an input and an output connection, wherein the first type-two transistor and the first type-one transistor are connected in parallel, wherein the source connection of the type-one transistor and the drain connection of the type-two transistor are arranged to receive the fifth analog signal of the analog multiplier circuit, wherein the input connection of the inverter is arranged to receive a first enable control signal, wherein the output connection of the inverter is arranged to output an analog signal which is received by the gate connection of the of the first n-channel transistor, and wherein the gate connection of the first type-two transistor is arranged to receive the first enable control signal.

Additionally, the first layer summing circuit comprises a capacitor comprising two plates, a first connection on a first plate of the capacitor and a second connection on a second plate of the capacitor, the capacitor for storing a value derived from the fifth analog signal, the first connection of the capacitor arranged to receive an analog signal from both the source connection of the first type-two transistor and the drain connection of the first type-one transistor, and the second connection of the capacitor arranged to receive a first constant analog signal; and a second pass gate comprising: a first type-two transistor comprising a gate connection, a source connection, and a drain connection; a first type-one transistor comprising a gate connection, a source connection, and a drain connection; and an inverter comprising an input and an output connection, wherein the first type-two transistor and the first type-one transistor are connected in parallel, wherein the source connection of the first type-one transistor and the drain connection of the first type-two transistor are arranged to commonly receive an analog signal derived from the stored value of the capacitor and output by the first connection of the capacitor, wherein the input connection of the inverter is arranged to receive a second enable control signal, wherein the output connection of the inverter is arranged to output an analog signal which is received by the gate connection of the of the first type-one transistor, and wherein the gate connection of the first type-two transistor is arranged to receive the second enable control signal, wherein the source connection of the first type-two transistor and the drain connection of the first type-one transistor are arranged to output an analog signal to the summing connection, wherein, in response to receiving the first enable control signal, charging of the capacitor by the output analog signal of the analog multiplier circuit is enabled, and wherein, in response to receiving the second enable control signal, an analog signal associated with the charge of the capacitor is provided to the summing connection, and wherein the summing connection is arranged to receive analog signals from each analog multiplier circuit with a second pass gate in which a second enable control signal is received, such that the analog signal in the summing connection is an average of the analog signals output by the capacitors across each analog multiplier circuit associated with an enabled second pass gate.

As referred to herein, a ‘stage’ is equivalent to a ‘circuit’ and a ‘cell’.

As such, in various examples, the analog multiplier circuit as described thus far comprises at least one additional analog multiplier circuit, wherein the fifth analog signal of each analog multiplier circuit is arranged to be provided to a first layer summing circuit arranged to receive as input the fifth analog signals and arranged to output a summed analog signal proportional to a sum of the input fifth analog signals, wherein the analog multiplier circuits arranged to provide their fifth analog signal to the first layer summing circuit are a first group of multiplier circuits, the analog multiplier circuit further comprising: at least one additional first layer summing circuit arranged to receive as input at least two analog signals and arranged to output a summed analog signal proportional to a sum of the input analog signals; at least one additional group of multiplier circuits, wherein each additional group of multiplier circuits comprises at least two analog multiplier circuits each arranged to provide the fifth analog signal of the analog multiplier circuit to the same first layer summing circuit of the at least one additional first layer summing circuit; and a second layer summing circuit arranged to receive as input the summed analog signals of at least two first layer summing circuits and arranged to output an analog signal proportional to a sum of the input analog signals.

FIG. 9B is another example summation stage circuit comprising a single pass gate. In various examples, the summation stage circuit of FIG. 9B is alternatively implemented using only a single pass gate 902A, 902B, 902C per analog multiplier circuit 900A, 900B, 900C, wherein each pass gate 902A, 902B, 902C is connected to a same output connection. In these examples, for each analog multiplier circuit, when its respective pass gate is closed, the outputs of the analog multiplier circuits with enabled pass gates are connected together in the same output connection and so in various examples the currents from the exponentiating transistor of each of the analog multiplier circuits with enabled pass gates are combined and converted to an overall output voltage by the resistance of all output load transistors (resistance of the pass gate and of load transistors of the analog multiplier circuit) in parallel. In various examples, the resistance of the output load transistors of the analog multiplier circuit are significantly greater than the resistance of the pass gate, such that the resistance of the output load transistors dominates. This produces an output analog signal that is the average of the individual outputs of the analog multiplier circuits. In examples comprising a single pass gate such as FIG. 9B, exponentiating transistors and load transistors between the multiplying circuits are in various examples matched in order to achieve an averaging and enable the output of the summing stage.

In this way, a first layer summing circuit in various examples comprises, for each analog multiplier circuit providing its first analog signal to the first layer summing circuit: a pass gate comprising: a first type-two transistor comprising a gate connection, a source connection, and a drain connection; a first type-one transistor comprising a gate connection, a source connection, and a drain connection; and an inverter comprising an input and an output connection, wherein the first type-two transistor and the first type-one transistor are connected in parallel, wherein the source connection of the type-one transistor and the drain connection of the type-two transistor are arranged to receive the fifth analog signal of the analog multiplier circuit; wherein the input connection of the inverter is arranged to receive a summing control signal, wherein the source connection of the first type-two transistor and the drain connection of the first type-one transistor are arranged to output an analog signal to a same summing connection as the first type-two and type-one transistors of the first pass gate of each other analog multiplier circuit, and wherein the output connection of the inverter is arranged to output an analog signal which is received by the gate connection of the first type-two transistor, wherein the gate connection of the first type-two transistor is arranged to receive the summing control signal, wherein, in response to receiving the summing control signal, an analog signal associated with the output of the analog multiplier circuit is provided to the summing connection, wherein the summing connection is arranged to receive analog signals from each analog multiplier circuit with a pass gate in which a summing control signal is received, such that the analog signal in the summing connection is an average of the analog signals output across each analog multiplier circuit associated with an enabled pass gate.

In examples comprising two pass gates such as FIG. 9A, capacitors are in various examples matched, in various examples such that their capacitance values match by in various examples matching their form via construction, in order to enable the averaging for the output of the summation stage. In various examples, the choice between the implementations of FIG. 9A or FIG. 9B is determined by considering the requirements of the process and the ease with which the respective required components are matchable.

Though two possible implementations of the summation stage have been outlined above in FIG. 9A and FIG. 9B, an alternative implementation in various examples uses a similar circuit to that used for the storage circuit and performs the summation from within the analog multiplier circuit i.e. the analog multiplier circuits generate a current output which is then converted into a voltage using a resistor, in various examples at a sub-array level. This implementation corresponds to using the sum circuit of FIG. 8 (i.e. wherein each output generating a current using a transistor e.g. 836 that is then combined and passed through a resistance device e.g. 850, in the sum circuit 410 of FIG. 4.

The implementations of FIG. 9A and FIG. 9B address a size-related problem where, if a requirement is to sum the results of a large number of multiplications, the total dynamic range of the output signal needs to be considered. For example, if the output signal has to be in the range 0V to 1V and is summing the results of 10 multipliers then each must be in the range 0V to 100 mV, but if summing the results of 1000 multipliers then each must only be in the range 0V to 1 mV in order to avoid the risk of overflows. This means that the required properties of the multiplier are potentially affected by the size of the array that they are part of. The averaging approach of FIG. 9A and FIG. 9B does not suffer this problem—the multiplier does not have to restrict the output range based on the size of the array, as the averaging automatically adjusts the overall output range to be similar to that of the individual multipliers.

Figure 10:
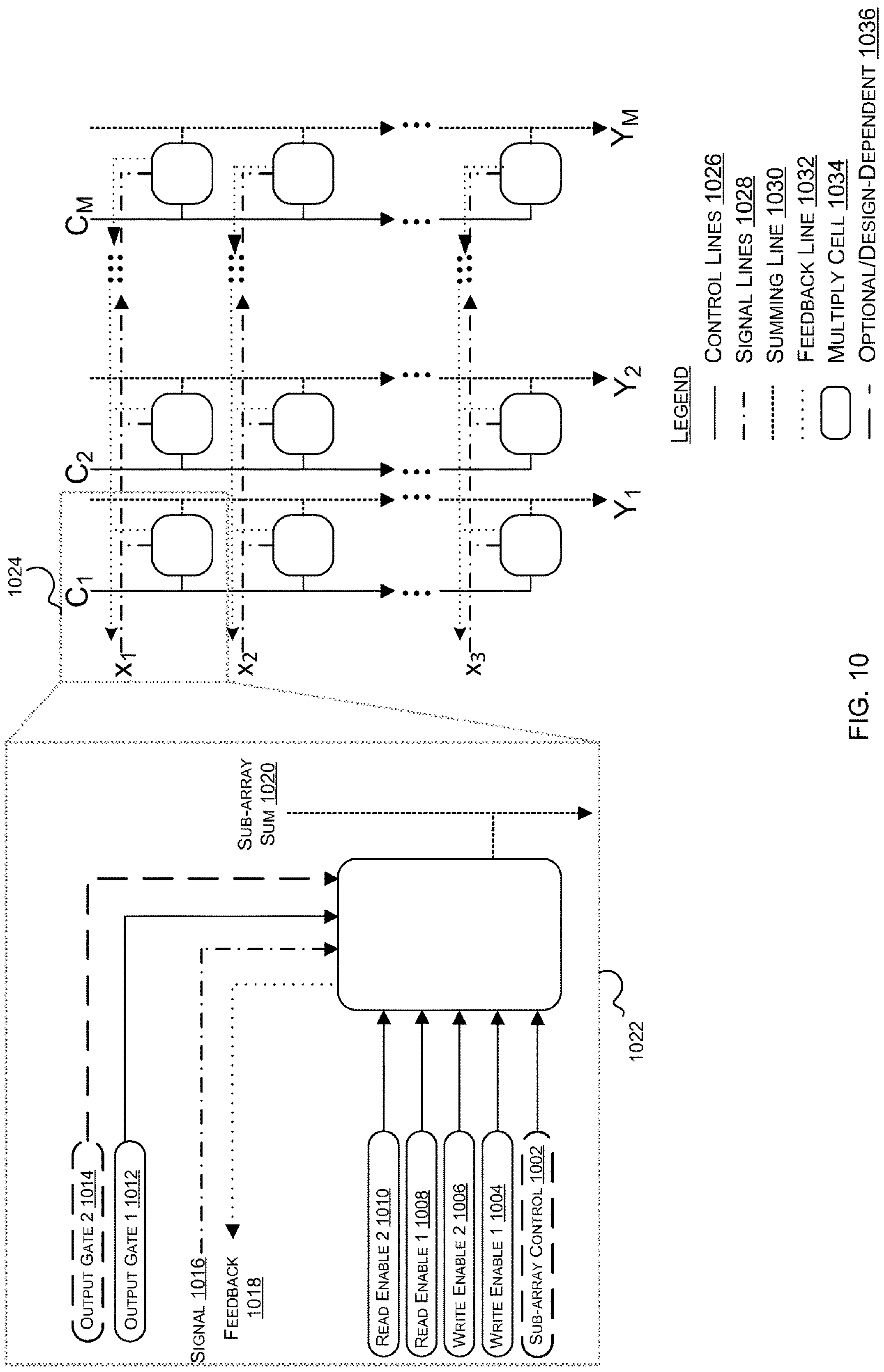
FIG. 10 is an expanded view of part of the array of FIG. 5 showing signals input to a multiply circuit.

FIG. 10 is an expanded view of part of the array of FIG. 5 showing signals input to an analog multiplier circuit (i.e. a multiply cell 1034). In various examples, an array of multiply cells 1034 is partitioned into at least two sub-arrays comprising at least one multiply cell 1034. In various examples, each sub-array (as illustrated, a sub-array comprising the connections to facilitate the signals depicted in 1022) has at least one of: buffers to drive local control signals for storage circuits 1004, 1006, 1008, 1010, from global equivalents 1026; buffers to drive control signals for pass gates 1012, 1014 in output summation circuits (such as those of FIGS. 9A and 9B) from global equivalents 1026, where the output summation circuits are per sub-array; buffers to connect local sum output connections 1020 to global equivalents 1030; precharge circuits to clear the result of a previous summation from local sum wires 1020.

In various examples, the buffers to drive local signals from global ones also include a sub-array select signal 1002, which enables different sub-arrays to be activated at different times, to allow: some sub-arrays to be disabled, allowing a single multiplier array to be used to process matrix calculations of different sizes; and/or the relative timing of operations in different sub-arrays to be skewed, so that peak currents in the array power supplies are reduced.

In various examples, a local feedback signal 1018 is also provided to a global equivalent 1032, which is used for example wherein a single differential amplifier is shared between multiple sub-arrays, or wherein additional processes are implemented that require response signals from analog multiplier circuits across sub-arrays.

Figure 11:
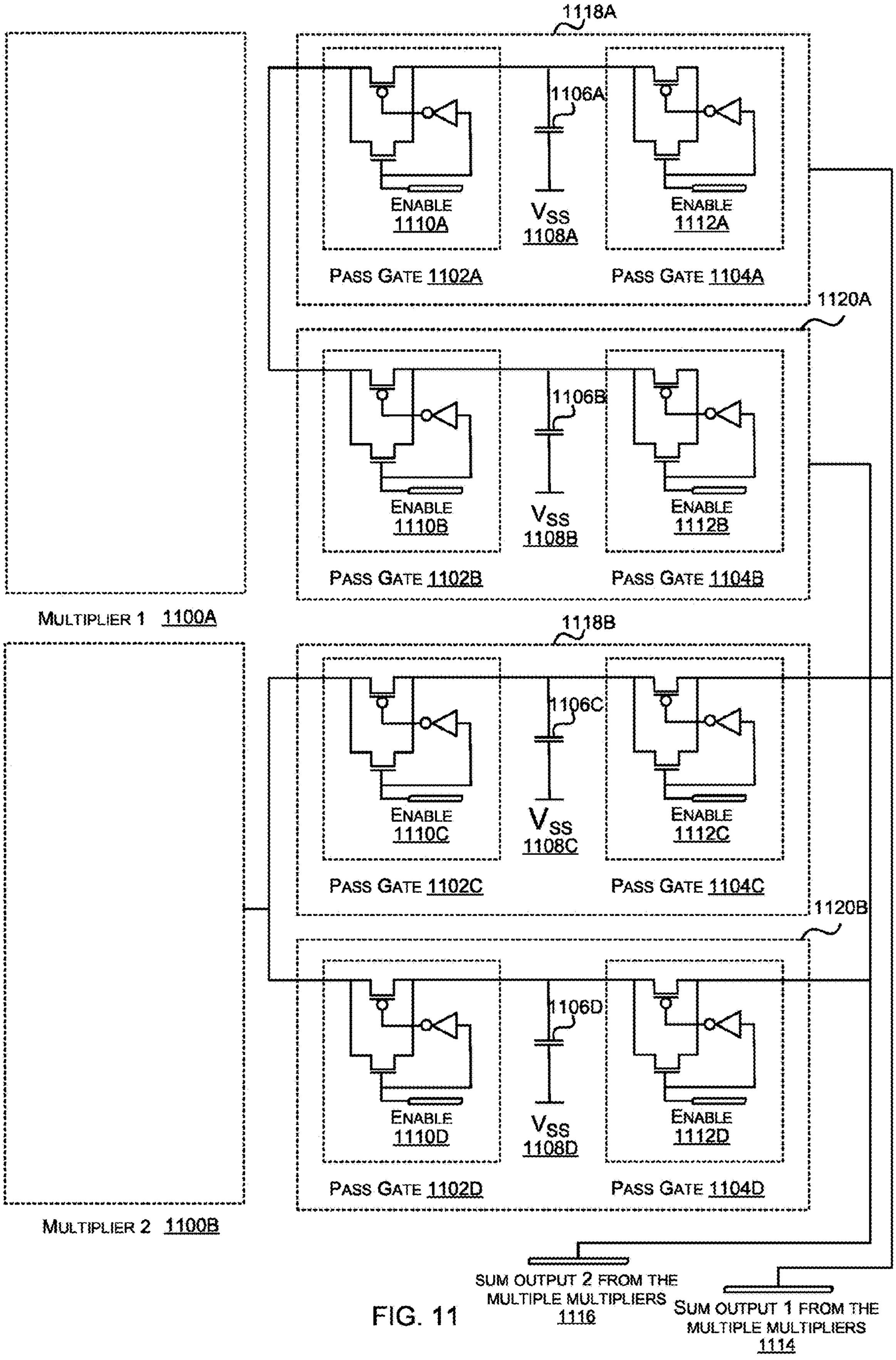
FIG. 11 is an example of a plurality of multiplier circuits driving a plurality of summation circuits.

FIG. 11 is an example of a plurality of multiplier circuits driving a plurality of summation circuits. In various examples, each analog multiplier circuit 1100A, 1100B providing its input to a summation stage has its output connected to two summation stage circuits 1118A, 1118B and 1120A, 1120B respectively, which function and are connected internally in the same way as the summation stage circuits of FIG. 9A. In various examples they function and are connected alternatively in the same way as the summation stage circuits of FIG. 9B. Each analog multiplier circuit has an associated choice of which of its two (in various examples, three, four, five or any other number) associated summation stage circuits to send its output analog signal to, as determined by the pass gate control signals 1110A, 1110C and 1110B, 1110D respectively, where in various examples only one of 1110A and 1110B and/or only one of 1110C and 1110D are causing activation of their pass gates at any moment. The outputs of each possible summation circuit of a single analog multiplier circuit 1100A, 1100B are connected to a same output connection as a corresponding possible summation circuit of the other analog multiplier circuit 1100B, 1100A, i.e. 1118A and 1118B are connected to a first same output connection but 1120A and 1120B are connected to a second same output connection that is different to the first.

In various examples, one sum result (for example, of multipliers 1100A and 1100B using summation stage 1118A and 1118B respectively) is retained using one output (for example 1114) while generating a second sum result (for example of multipliers 1100A and 1100B using summation stage 1120A and 1120B respectively).

In various examples, two independent calculations are performed in the same multiplier array—i.e. one array is split to create two half-size multiplier arrays. In various examples, this is extended to allow n independent calculations if there are n output summation circuits available per analog multiplier circuit providing its output to a summation stage comprising the n output summation circuits.

In various examples, complex arithmetic is performed, with different summation stage circuits per analog multiplier circuit and therefore summation stage outputs used for real and imaginary components of an operation respectively.

The decision of which output to use is in various examples made in a data-dependent manner, for example positive multiplication results going to one output summation, and negative ones to another, or larger magnitude results to one and smaller magnitude to another.

Figure 12:
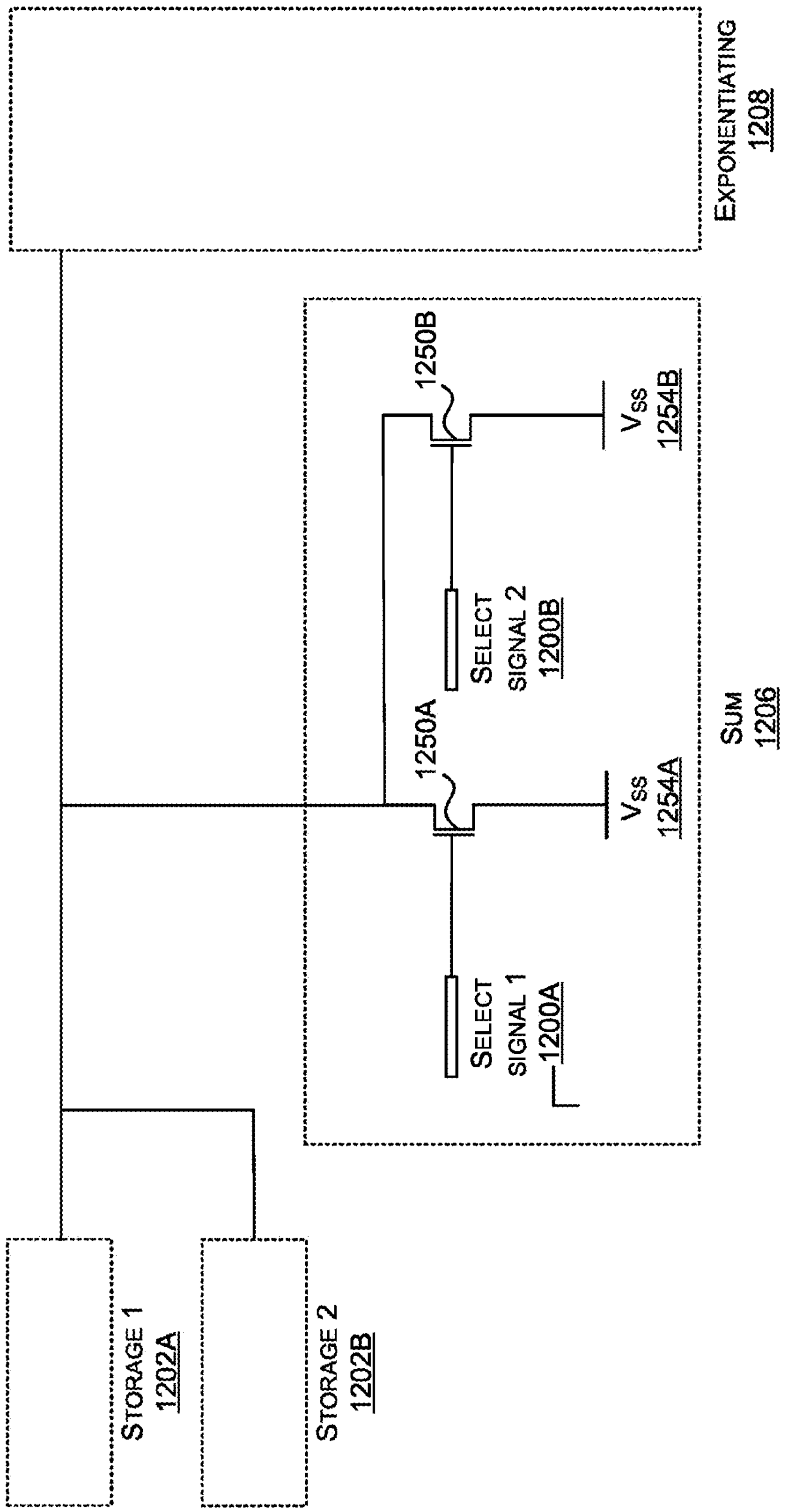
FIG. 12 is another example of a summation circuit.

FIG. 12 is another example of a summation circuit of an analog multiplier circuit, implementing selectable load resistances. In various examples, the linear-region transistor of the summing circuit of the analog multiplier circuits described herein, such as transistor 850 of FIG. 8, is alternatively implemented as two sections, with two of the same type of transistor as the linear-region transistor commonly connected via their drain connections to receive an output of the storage circuits 1202A, 1202B of the analog multiplier circuit, and connected via the same drain connections to provide an input to the exponentiating circuit 1208 of the analog multiplier circuit. Each transistor 1250A, 1250B is connected via its source connection to a constant analog source signal, and connected via its gate connection to an analog select control signal 1200A, 1200B, in contrast with connection to a constant analog drain signal via the gate connection as described in relation to FIG. 8. In various examples, voltages associated with a gate connection of transistors 1250A and 1250B are different, such that an overall resistance is changeable by changing the voltage of a control signal. In various examples, the analog select control signal 1200A, 1200B, and the control signals described herein, are one of: a high control signal, a low control signal. In various examples, a high control signal corresponds to a drain analog signal. In various examples, a low control signal corresponds to an analog signal higher than ground and lower than the high control signal. In various examples, the value of a high analog signal and/or a low analog signal are selected at run-time. In various examples, a control signal as defined herein is one of: a state of a signal; the absence of a signal; the presence of a signal. As such, an interpretation of a control signal should be understood in its broadest form to correspond to an indication that an element should in some way change its state or perform an action.

This structure enables the magnitude of the summing resistance to be varied, as, for example, if the two transistors are the same size (so of the same 'on' resistance), then if both are selected then the resistance is half of the resistance if only one is selected. This has the following uses:

Increasing the resistance increases the output voltage for a given input current, and reducing the resistance reduces the output voltage. Adjusting the resistance therefore makes it possible to adjust the output voltage range, which helps to match the characteristics of the sum resistor to the characteristics of the exponentiating transistor. This kind of adjustment is also in various examples used to adapt to low input signals.

The resistance can be changed dynamically, while a calculation is taking place. The load resistance affects the constant $K_1$, which is proportional to the resistance. If $K_1$ is halved between storing a value and reading it out, then the effect is to square root the input value, and if $K_1$ is doubled then the effect is to square the input value.

In various examples, one, two, three, five, seven and any other number of transistors are connected in the same way as those described in FIG. 12, so as to allow fine grain control over resistance, with finer grain control associated with increased numbers of transistors connected as described.

Figure 13:
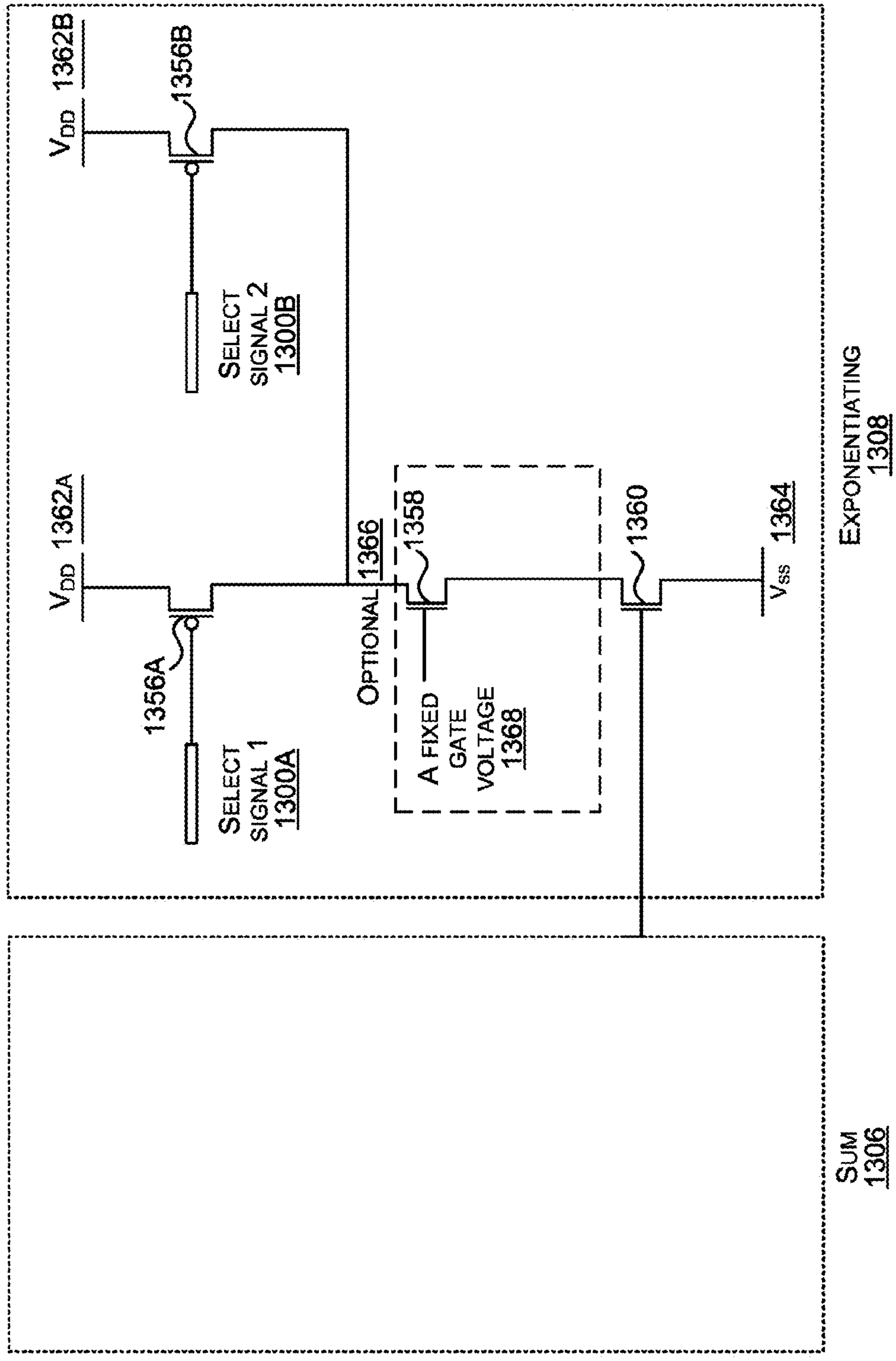
FIG. 13 is another example of an exponentiating circuit.

FIG. 13 is another example of an exponentiating circuit, implementing selectable load resistances. In a similar way as described with respect to FIG. 12, the linear-region load transistor of the exponentiating circuit of an analog multiplier circuit (i.e. transistor 856 of FIG. 8) is replaced in various examples by two, three, four, seven or any other number of the same type of transistor, such as transistor 856, each of the replacement transistors 1356A, 1356B connected via their gate connection to a respective analog select control signal 1300A, 1300B, connected via their drain connection to a constant analog drain signal 1362A, 1362B, and connected via a common source connection to a same connection which the source connection of the previous transistor, such as 856, was connected to.

This set up allows the load resistance to be adjusted and therefore the output voltage range for a given current range to be adjusted, which allows the output analog signal from an analog multiplier circuit to be adjusted with varying granularity of control dependent upon the number of transistors included in the circuit, as outlined above with respect to FIG. 12.

Figure 14:
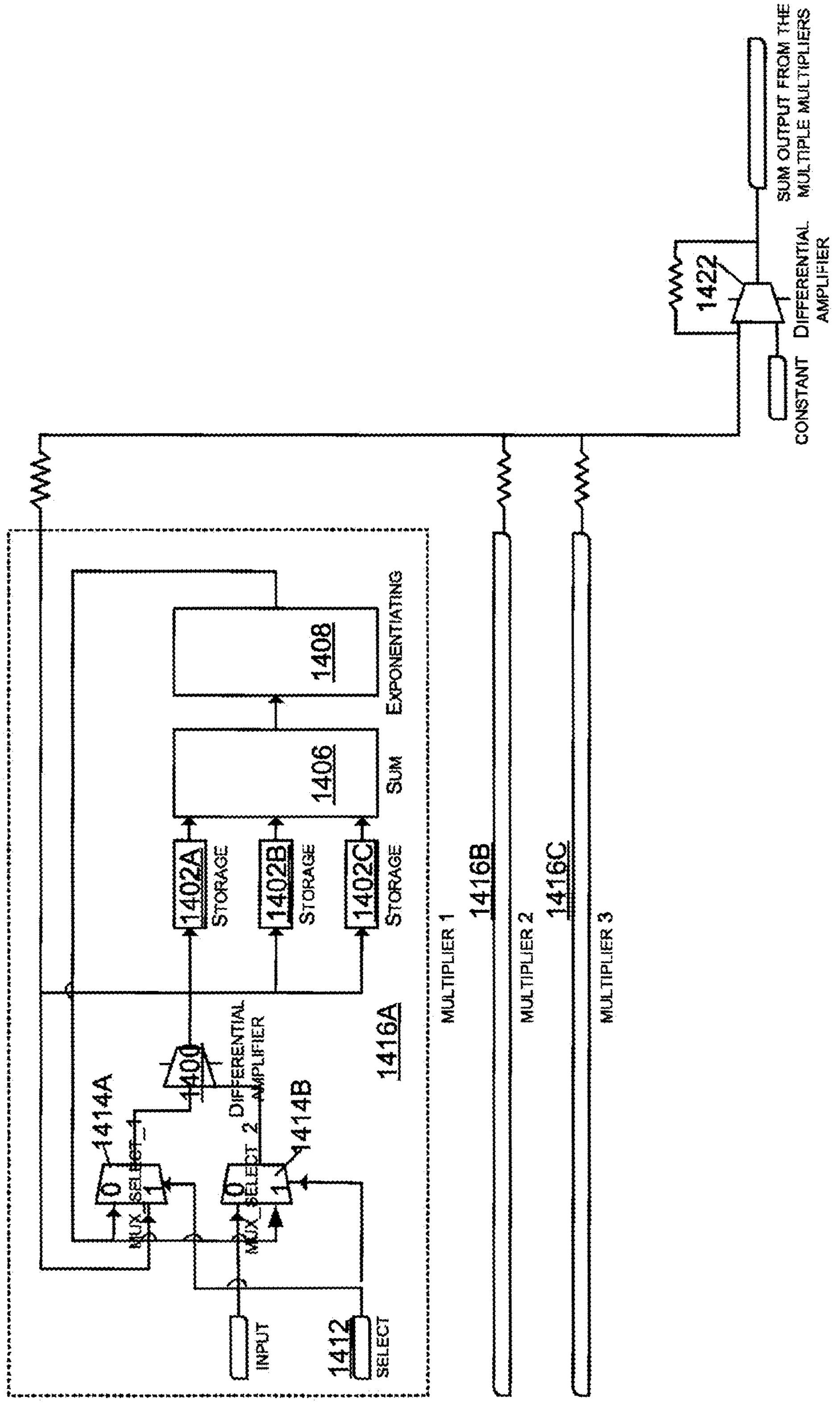
FIG. 14 shows a modification to the multiplier circuit of FIG. 1 that enables an amplifier to be used as an output buffer.

FIG. 14 shows a modification to the analog multiplier circuit of FIG. 1 that enables an amplifier to be used as an output buffer. In various examples, the analog multiplier circuit as described herein is modified to allow a differential amplifier 1422 to be used as an output buffer, in various examples shared between a plurality of analog multiplier circuits 1416A, 1416B, 1416C, as well as a feedback amplifier 1400 for writing into storage circuits 1402A, 1402B, 1402C of the analog multiplier circuit comprising additionally a sum circuit 1406 and an exponentiating circuit 1408. Though not depicted, in various examples analog multiplier circuits 1416B and/or 1416C comprise the same structure as that depicted for analog multiplier circuit 1416A. Two multiplexers 1414A, 1414B, each comprising two input connections, a control connection and an output connection, are added to the analog multiplier circuit, with outputs connected respectively to the inputs of the differential amplifier 1400, a first multiplexer 1414A having its output connected to the inverting input of the differential amplifier 1400, and a second multiplexer 1414B having its output connected to the non-inverting input of the differential amplifier 1400. Both multiplexers 1414A and 1414B are connected to the same control input connection which receives an analog select control signal 1412.

The first and the second multiplexers 1414A and 1414B both connect to the exponentiating circuit 1408 output. First multiplexer 1414A connects to the amplifier output. Second multiplexer 1414B connects to an input signal 1424.

In various examples, in response to the select signal 1412 being low the external input 1410 is connected to the non-inverting input of the amplifier 1400 and the output of the exponentiating circuit 1408 is connected to the inverting input. This is the connection pattern for use when loading the storage circuits 1402A, 1402B, 1402C, wherein loading corresponds to storing a value in the storage circuits. In various examples, in response to the select signal 1412 being high the output of the exponentiating circuit 1408 connects to the non-inverting input of the amplifier 1400, and the inverting input is connected to the amplifier output. This connection pattern means that the amplifier 1400 acts as a voltage follower driven by the exponentiating circuit 1408 output.

It should be appreciated that high and low with reference to the select control signal are merely illustrative, and that the control signal can take any form such that it indicates to a multiplexer when to use one connection pattern, and when to use another.

This modified analog multiplier circuit provides a low output resistance version of the exponentiating circuit output voltage, that is then suitable to use as an input to a summing amplifier circuit—i.e. the resistor 1420 and amplifier 1422 network, which can sum the outputs of several multipliers. The amplifier 1422 is connected via its inverting input connection as defined above, to resistors 1418A, 1418B, 1418C respectively in series which are connected to the outputs of each analog multiplier circuit 1416A, 1416B, 1416C. The non inverting input of the differential amplifier 1422 is connected to a constant analog signal. The output of the differential amplifier 1422 is connected via a same connection to provide, in various examples, a sum output of the sum of analog signals across the analog multiplier circuits 1416A, 1416B, 1416C, such as when implementing hardware for matrix multiplication operations as described above, and connected to a resistor 1420 which is connected to the inverting input of the amplifier 1422.

Figure 15:
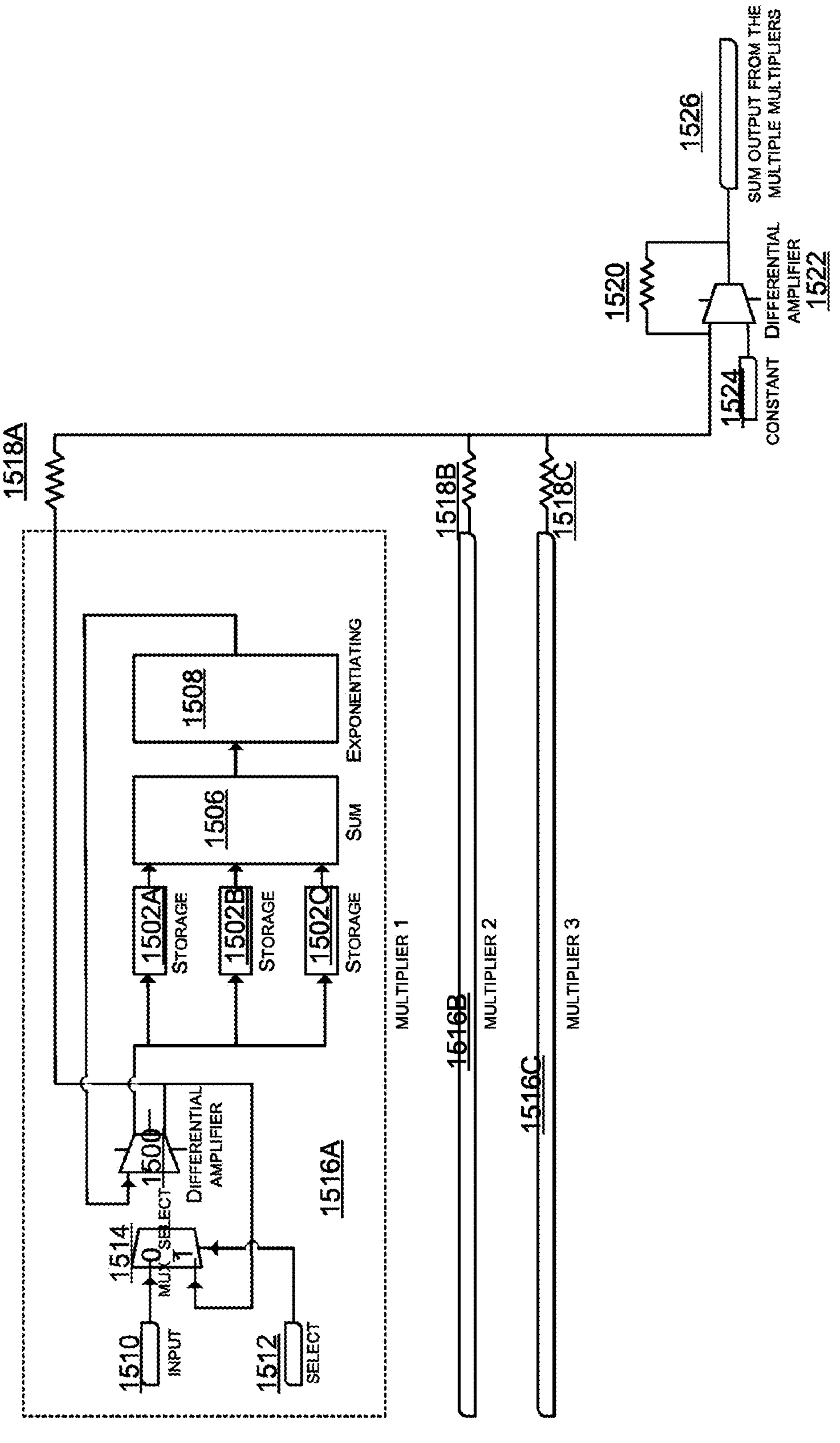
FIG. 15 shows an example of a multiplier circuit where an amplifier with a complementary output is used.

FIG. 15 shows an example of a multiplier circuit with a low-resistance output buffer and where an amplifier with a complementary output is used. In various examples, an alternative implementation of a low-resistance output buffer is implemented by replacing the circuitry around the differential amplifier of the analog multiplier circuit. As in FIG. 14, the connections from resistor 1518A, 1518B and 1518C, the in various examples duplication of the circuitry of analog multiplier circuit 1516A in analog multiplier circuits 1516B and/or 1516C, and the summing amplifier circuit comprising constant analog signal 1524, differential amplifier 1522, and resistor 1520, alongside the sum output 1526, are equivalent to those corresponding components and connection as described in relation to FIG. 14.

In the implementation of FIG. 15, only a single multiplexer 1514 is used, which is connected via its output connection to the non-inverting input of differential amplifier 1500, connected via its control input to receive an analog select control signal 1512, and connected via one of its input connections to an analog input signal 1510 corresponding to the analog input signal of the analog multiplier circuit as described herein. The multiplexer 1514 is further connected, via its other input connection, to an inverting output of the differential amplifier 1500 and to provide an output of the analog multiplier circuit 1516A, which is in various examples connected in series to a resistor 1518A which is in various examples connected to the summing amplifier circuit as described above and with respect to FIG. 14.

In contrast to the differential amplifier 1400 of FIG. 14, the differential amplifier 1500 of FIG. 15 has a complementary output, meaning that as well as inverting and non-inverting inputs there are inverted and non-inverted outputs:

$$V_{out+} = A(V_{in+} - V_{in-})$$

$$V_{out-} = A'(V_{in-} - V_{in+})$$

The two gain factors A and A' are in various examples the same, and in various examples are not the same. The non-inverting output of the differential amplifier 1500 is connected to the storage circuits 1502A, 1502B, and 1502C via a same connection.

In this version of the circuit only one multiplexer 1514 is required, and feedback is adjusted by changing which output is used as the source of feedback to an input.

If the select control signal is low, the external input 1510 connects to the non-inverting input of the amplifier 1500, the non-inverting output is passed via the storage circuits 1502A, 1502B, 1502C and the sum circuit 1506 to the exponentiating circuit 1508 input, and the exponentiating circuit 1508 output is connected to the inverting input of the amplifier 1500. This is the connection pattern used when writing into the storage cells.

If the selected control signal is high, the inverting output of the amplifier 1500 is connected to the non-inverting input, and the exponentiating circuit 1508 output is connected to the inverting input. With this connection pattern the amplifier 1500 acts as a voltage follower for the inverting input (i.e. for the exponentiating circuit 1508 output), with the output appearing at the inverting output of the amplifier. In various examples, a voltage follower is an amplifier with feedback connections such that $V_{out}$ is approximately equal to $V_{in}$, which acts as a buffer for the input voltage.

Again, the low output resistance signal from the amplifier 1500 is suitable for use as an input to a summing amplifier circuit that combines the outputs of a group of multipliers, as described above.

It should be noted that throughout the illustrations, any number of storage circuits and analog multiplier circuits depicted is non-limiting, and, as explained above, in various examples different numbers of such circuits are used whilst still enabling the present invention. Moreover, each diagram of FIG. 16 to FIG. 19A, B, C illustrates the same components, where multiply cells are illustrated in the same way and referred to with respect to the cells 1600 of FIG. 16.

Figure 16:
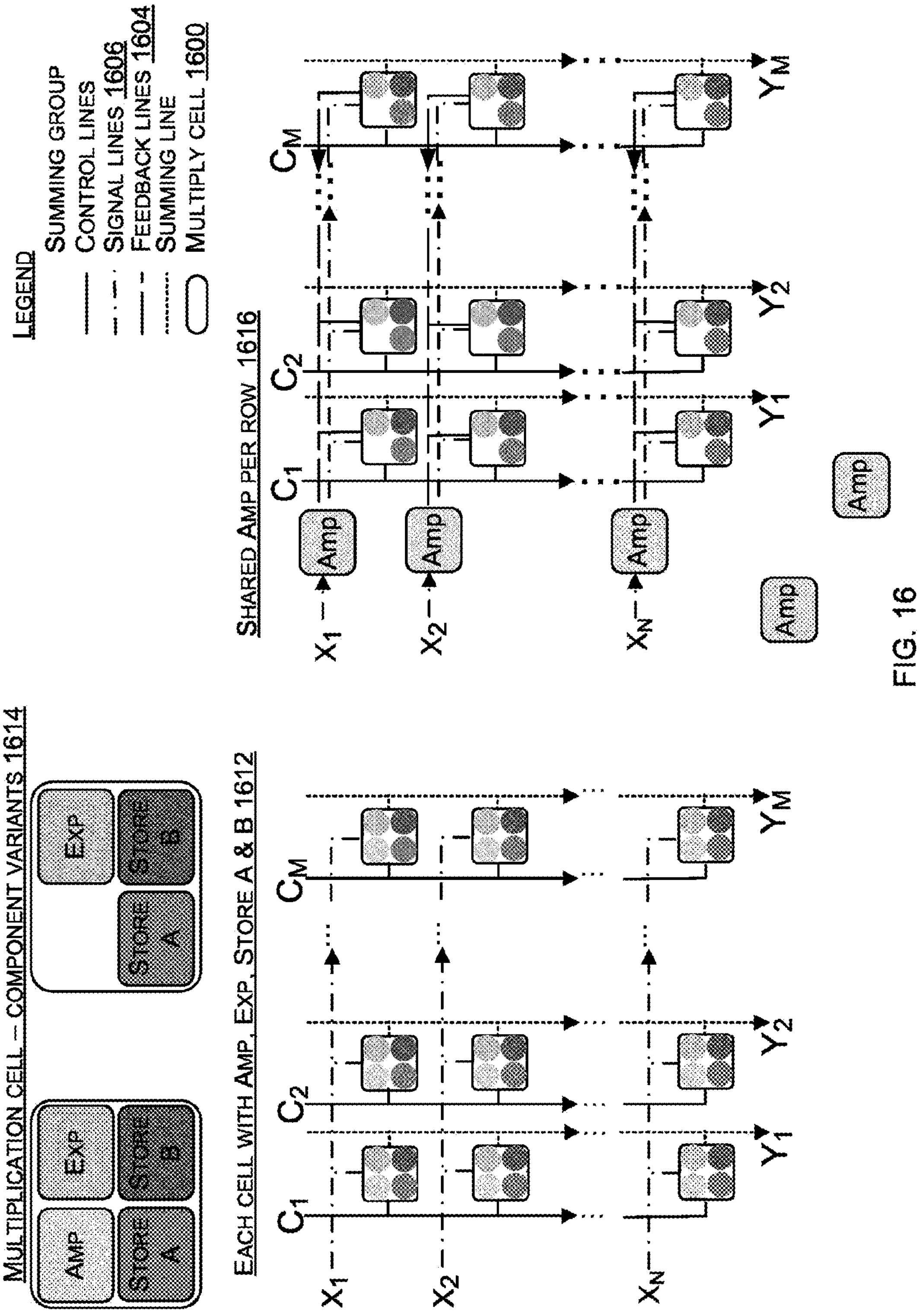
FIG. 16 shows two example array-level architectures, one where a differential amplifier is shared across rows.

FIG. 16 shows two example array-level architectures, one where a differential amplifier is shared across rows. A multiply cell 1600, corresponding to those described herein so far with respect to the other figures illustrated, in various examples comprises at least two storage circuits, an exponentiation circuit, a sum circuit and a differential amplifier. As discussed above, the present invention is in various examples applied to perform at least a portion of the operations required to perform matrix-vector multiplication, in which a vector $\underline{C}=(\underline{A}*\underline{B})$ is produced, where each element of the vector $\underline{C}$ is computed from the matrix $\underline{A}$ and vector $\underline{B}$ according to the equation $C_i=\Sigma_j A_{i,j} B_j$. and wherein elements of the multiplication are stored in multiply cells 1600 of the array according to the examples described above.

The array of multiply cells 1600 described in various examples thus far is illustrated in diagram 1612, where the lines, inputs and outputs are as described with respect to the previous figures, including FIG. 5, FIG. 6, and FIG. 7. The components of each multiply cell 1600 in the examples described thus far are illustrated 1614.

In various examples, different array-level architectures are used for this purpose, where an array comprises a plurality of multiply cells 1600. In these examples, elements of the multiply cell 1600 corresponding to those described so far are shared between multiplication cells, to produce modified multiply cells 1600, in various examples on a per-row basis, for example where partial sums involved in matrix-vector multiplication are performed down columns of an array of multiply cells 1600.

In various examples, enabled by introducing a feedback line 1604 alongside a signal line 1606 of an array of multiply cells 1600, a differential amplifier is shared across all cells 1600 of a row in an array or sub-array, removing the need for an amp in each cell. Such a situation is illustrated in diagram 1616, with the components present in each multiply cell 1600 illustrated in 1616. In this example, though, it is not possible to write to multiple columns of the array at once. The cycle times for writing matrix $\underline{A}$ and vector $\underline{B}$, as mentioned above, are normally $O(\overline{N}_{columns})$ and $\overline{O}(1)$ respectively. While the matrix $\underline{A}$ is in various examples, written column by column, and thus writing would not be slowed by a shared differential amplifier circuit, the vector $\underline{B}$ is in various examples broadcast to all columns of the array for a matrix-vector multiplication—with $\underline{A}$ columns (which an M×N matrix $\underline{A}$ would need) this would take O(A) time rather than O(1).

Figure 17:
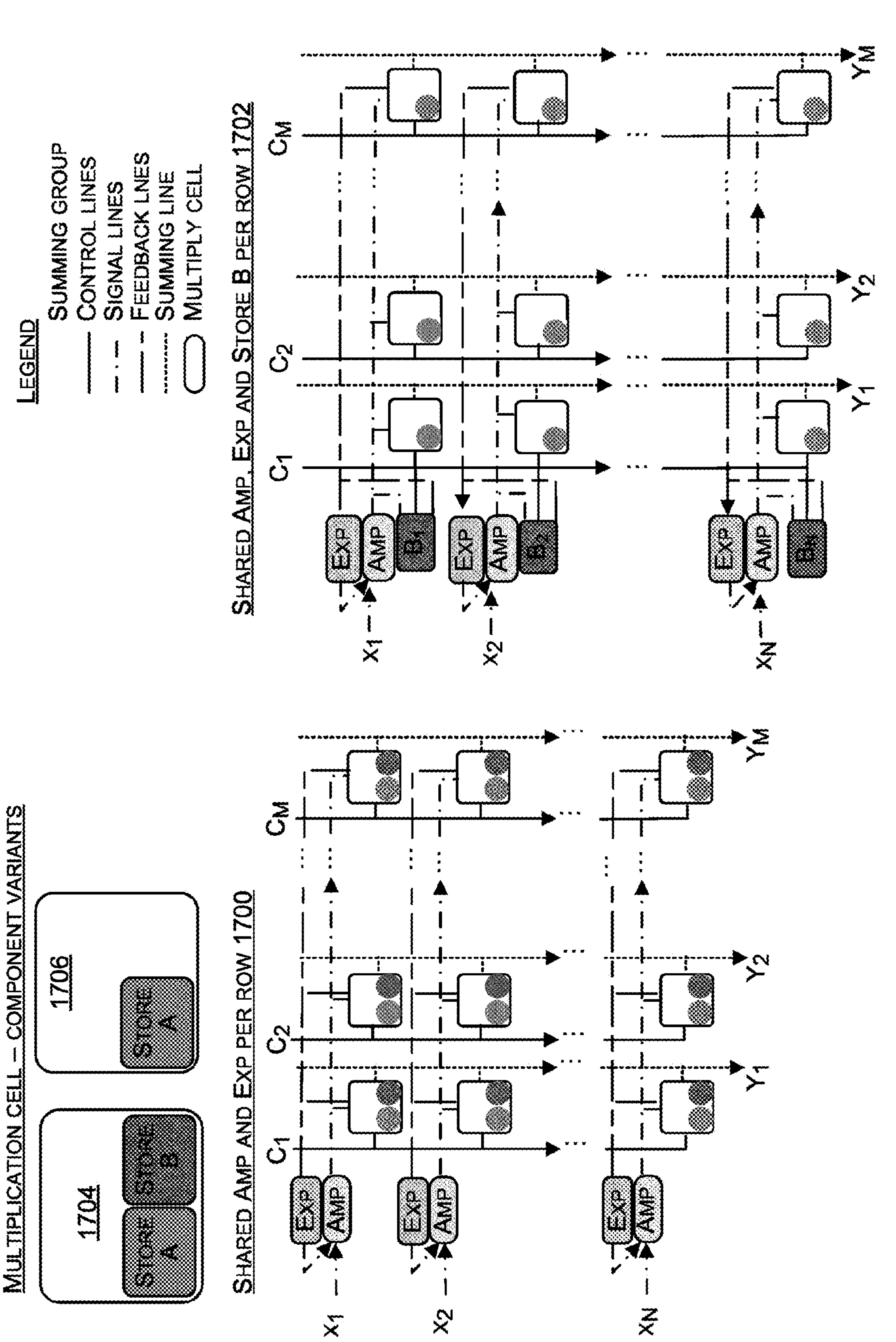
FIG. 17 shows two example array-level architectures, one where an amplifier and an exponentiating circuit are shared one per row; and one where an amplifier, exponentiating circuit and store B are shared per row.
Figure 17A:
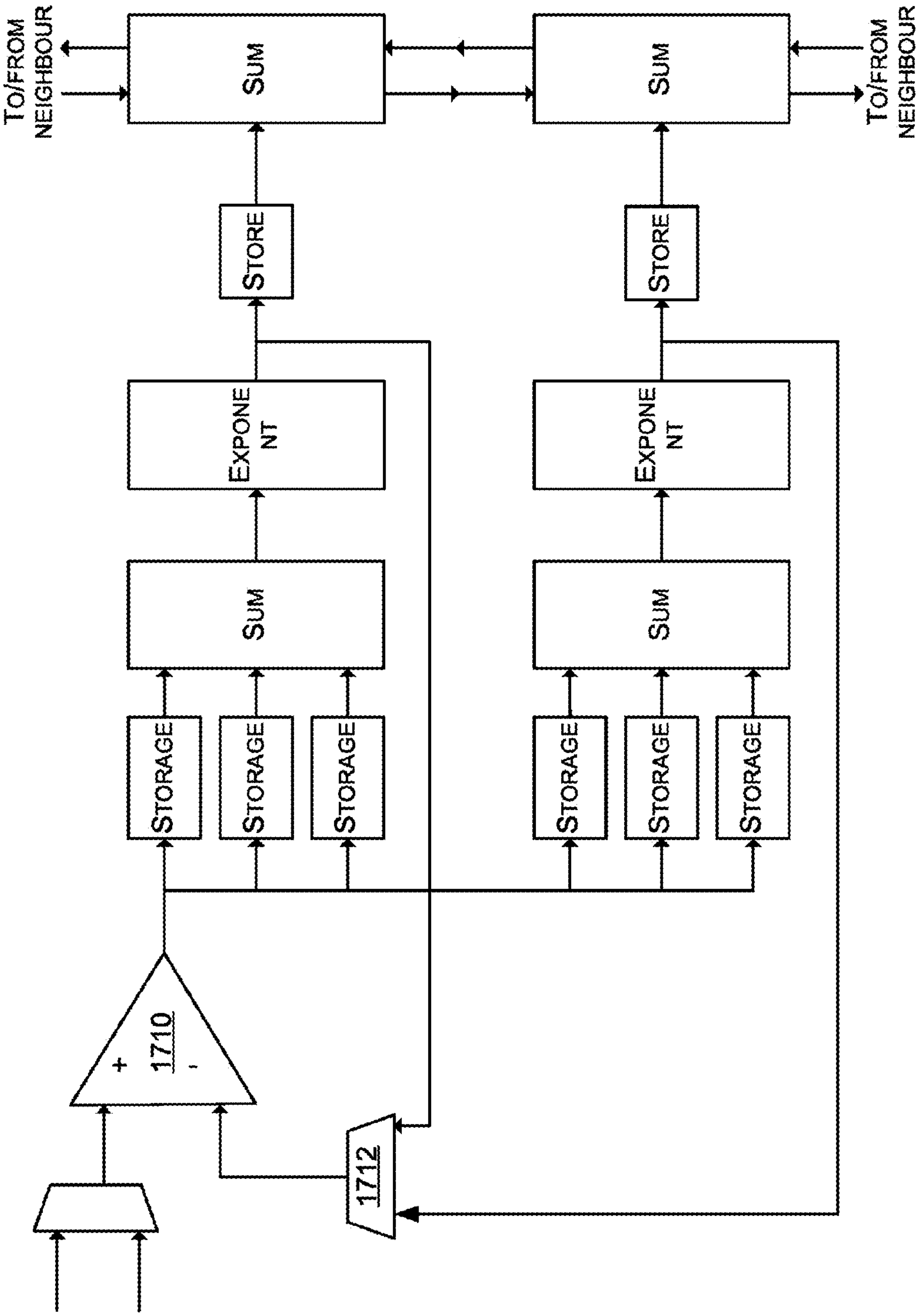
FIG. 17A shows two analog multiplication circuits "stacked" vertically.
Figure 17B:
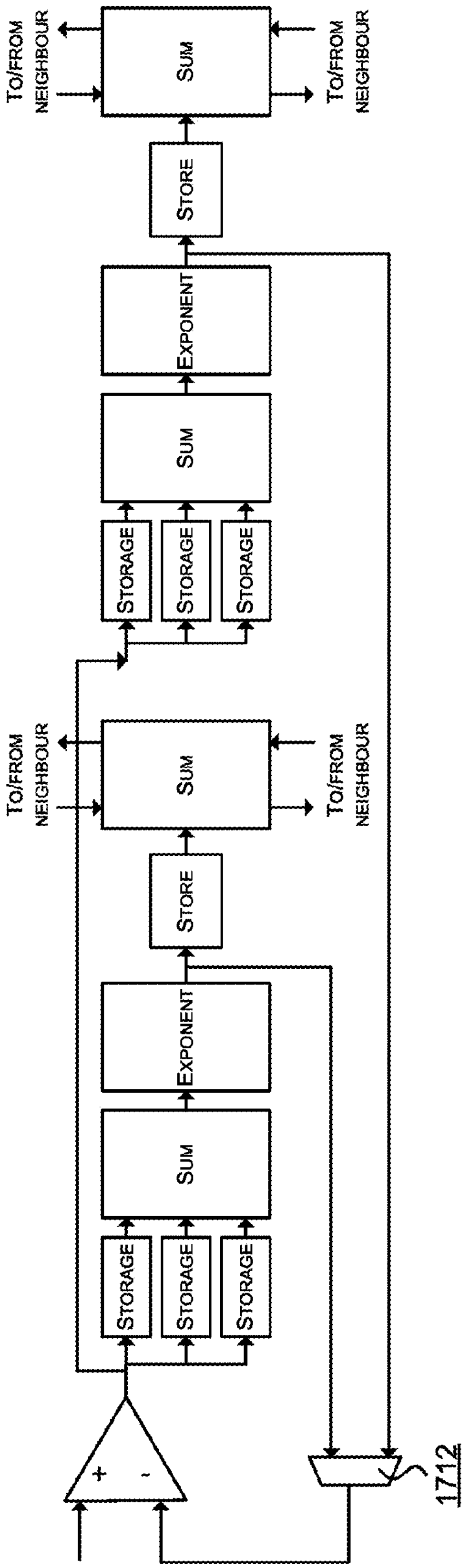
FIG. 17B shows two analog multiplication circuits "stacked" horizontally.

FIG. 17A shows two analog multiplication circuits "stacked" vertically and having a shared amplifier 1710 and connected by multiplexer 1712. FIG. 17B shows two analog multiplication circuits connected via multiplexer 1712. The arrangement is referred to as "horizontal sharing".

FIG. 17 shows two example array-level architectures, one where an amplifier and an exponentiating circuit are shared per row; and one where an amplifier, exponentiating circuit and store are shared per row.

In a similar way to sharing the differential amplifier per row as outlined with respect to FIG. 16, the exponentiating circuit in various examples is also be removed from cells of the array and instead shared one per row. This set up is illustrated in diagram 1700 and the components of a multiply cell illustrated 1704. This presents similar challenges as sharing the differential amplifier as described with respect to FIG. 16, to parallel writing, but also to reading too-only one column can be read and summed at any time due to the need to share the exp circuit along a row.

In various examples, an alternative to the full multiplier cell is to share storage cells for the vector $\underline{B}$ ('Store B') between rows (storage for a scaling factor, though not shown in the diagrams, in various examples are also shared in the same way), leaving only the storage for matrix elements in a multiplication cell ('Store A'). This allows, in various examples, the sharing of differential amplifier and exponentiation circuit without incurring an $O(N_{columns})$ cost to writing the $\underline{B}$ vector to each column. Reading, though, would still need to be column by column, due to the shared exponentiation circuit. This setup is illustrated in diagram 1702, and the components of a multiply cell illustrated 1706.

Figure 18:
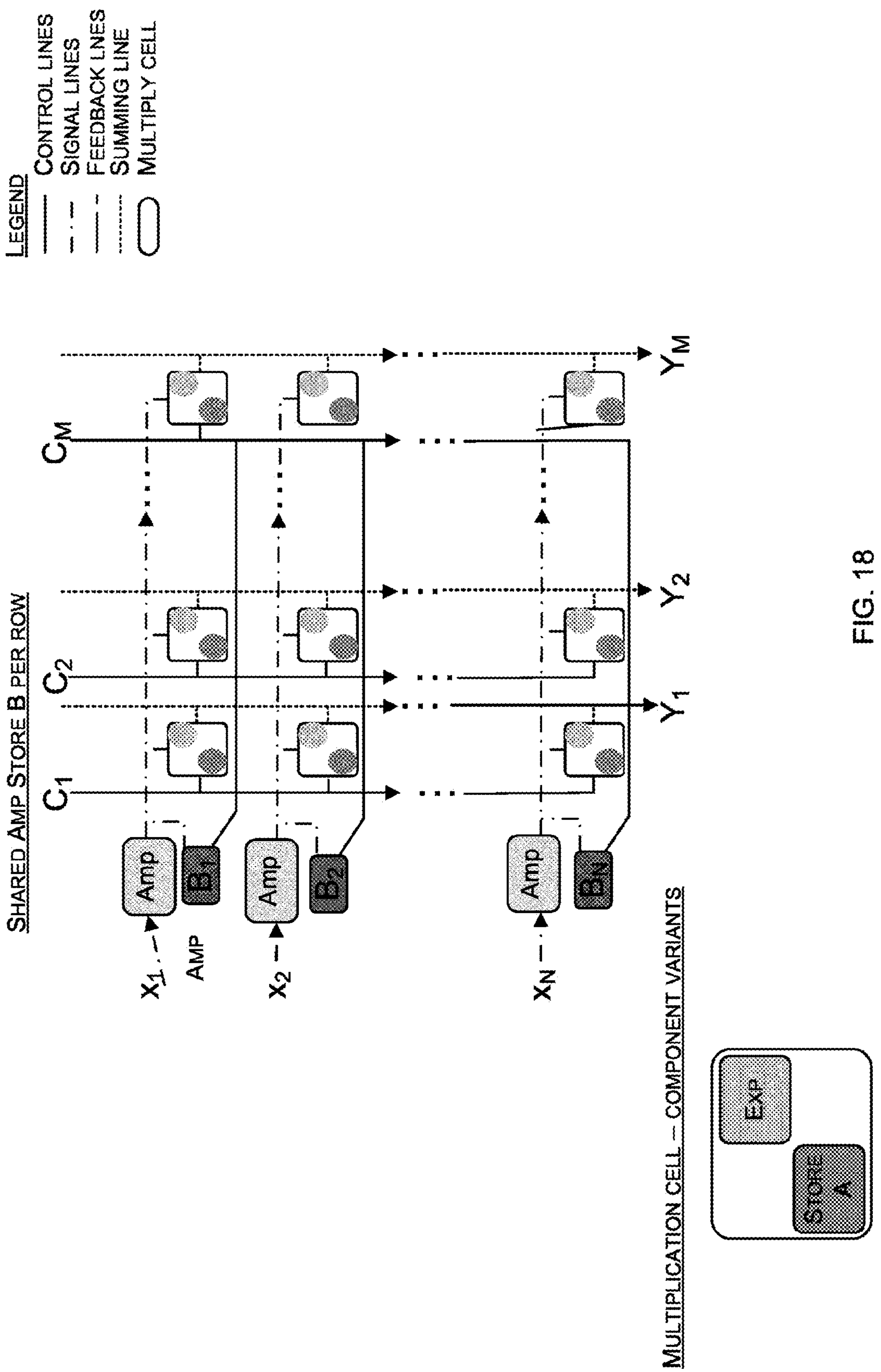
FIG. 18 shows an example of a multiplier circuit where an amplifier and store B are shared per row.

FIG. 18 shows an example of a multiplier circuit where an amplifier and store B are shared per row. In various examples, the differential amplifier of each cell is shared per-row, alongside 'Store B' as defined above, and the exponentiating circuit and 'Store A' are per cell as described previously. This allows for reading (partial sum) along all columns in parallel, as exponentiating circuits are not shared between columns, while retaining write speed for $\underline{B}$ by only requiring it is written once per row, which fits its use when storing a vector for matrix-vector multiplication. In previous examples, each individual element of matrix $\underline{A}$ was stored in a unique analog multiplier circuit, and the elements of $\underline{B}$ were broadcast along a row of an analog multiplier array, and stored in analog multiplier circuits of the row. In this example, however, a single stored value of $\underline{B}$ is stored, in various examples close to the shared exponentiating circuit and amplifier, which reduces the amount of storage required.

In various examples, the decision as to what array architecture to use is made based on the desired multiply cell 1600 area, where a smaller area is in various examples, advantageous for certain applications, or for deployment onto specific hardware. As the area of a multiplier array such as those described above is reduced by sharing components, but this is at the cost of reducing the number of multiplications that can be done in parallel (for example, the number of writes is limited by the number of amplifiers, and the number of multiplications is limited by the number of exponentiating circuits), reducing the area also reduces the peak speed of the array.

It should be noted that the above described examples are merely illustrative and have particular effects as described, but that it is possible to implement any combination of sharing of components.

Figure 19C:
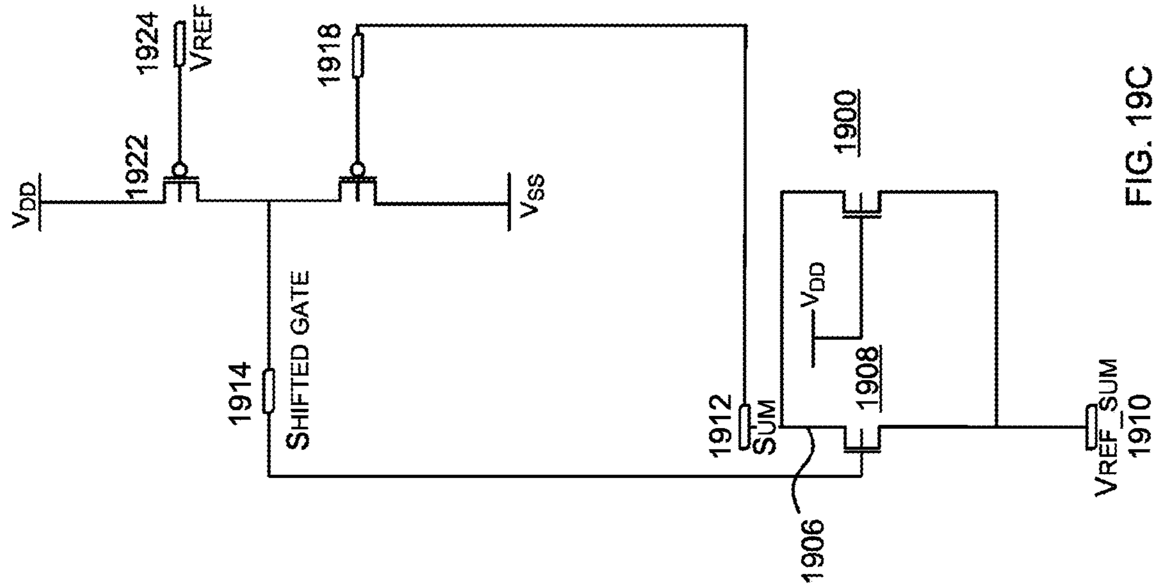
FIG. 19A, FIG. 19B and FIG. 19C show example resistance circuits.
Figure 19B:
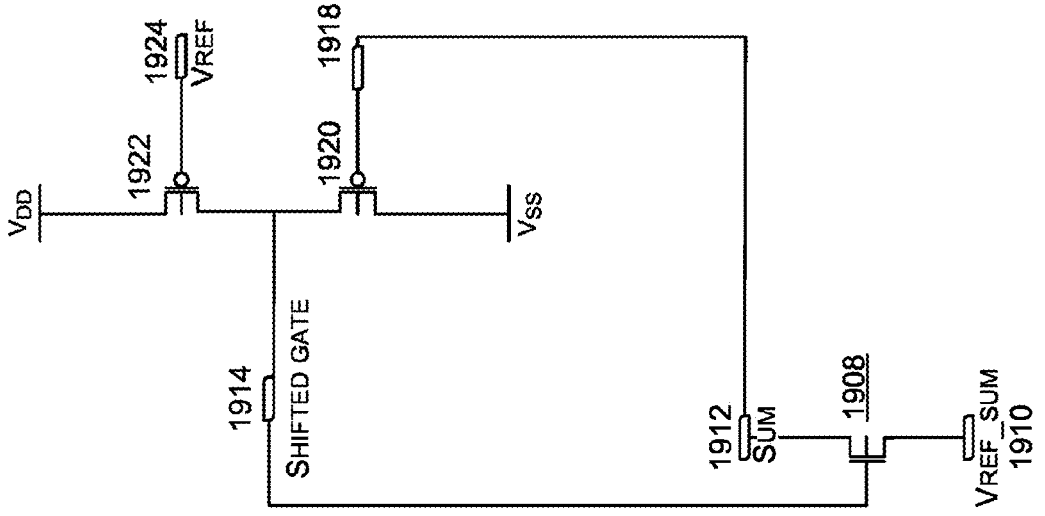
Figure 19A:
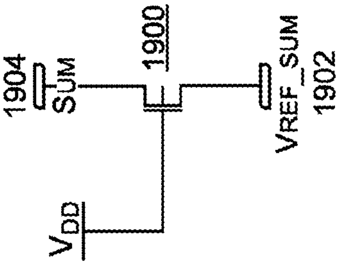

Examples of resistance circuits are given in FIG. 19A, FIG. 19B, and FIG. 19C. The storage circuits described thus far use transistors operating in the saturated region as their output stage, so that the drain-source currents that they produce are independent of the drain voltage. The currents from multiple storage circuits are then combined, in the analog multiplier circuits described thus far, to produce a total current that is the sum of the currents from the individual storage cells. This total current is then converted into a voltage by being passed through a resistive element. This conversion in various examples uses an ideal resistance-a circuit element with voltage proportional to current. However, many deep submicron processes do not provide such ideal resistors. In various examples, one or more transistors are therefore used to implement such a resistance.

If only a single transistor is used, then in various examples the transistor is used in either the linear region or the saturated region.

In the linear region, current ($I_{ds}$) is proportional to ($V_{gs}-V_T-\frac{1}{2}V_{ds}$) $V_{ds}$, or $I_{ds}/V_{ds}$ is proportional to ($V_{gs}-V_T-\frac{1}{2}V_{ds}$). $I_{ds}/V_{ds}$ is effectively $1/R_{ds}$ (i.e. the reciprocal of the resistance between drain and source), and this equation shows that $1/R_{ds}$ decreases as $V_{ds}$ increases, or alternatively that resistance increases as $V_{ds}$ increases. For the purpose of converting a current to a voltage, this means that as current increases the voltage will increase faster than required for an ideal resistance.

However, if using the saturated region, but with gate and drain terminals connected together then current $I_{ds}$ is proportional to $(V_{gs}-V_T)^2$, or $(V_{ds}-V_T)^2$, provided that $V_{ds}$ is greater than or equal to $V_T$. In this case $I_{ds}/V_{ds}$ increases as $V_{ds}$ increases, or resistance decreases as $V_{ds}$ increases, meaning that as current increases the voltage increases more slowly than required for an ideal resistance. Subscript ds denotes drain-to-source, subscript gs denotes gate-to-source, and subscript T denotes an internal property of the transistor, with respect to V and I as voltage and current respectively.

A combination of two transistors in parallel (one in the linear region and one in the saturated region) in various examples used as a resistance circuit, provides a better approximation to linear behaviour across a part of the operating range than when using a single transistor, by choosing transistor sizes so that the reduction in current through the linear region transistor is offset by the increase in current through the saturated region transistor. This approach is limited by the saturated region device only operating when $V_{gs}>V_T$.

In various examples, an alternative resistance circuit, which offers better linearity at low voltages, uses a transistor where the gate is connected to the output of a level shifter, and where the input to the level shifter is taken from the drain of the transistor. The level shifter raises the input voltage to the gate voltage, so that the requirement of $V_{gs}>V_T$ is always met, and the transistor is therefore always conductive. This makes it possible to extend the region of improved linearity of the resistance to voltages below $V_T$.

FIG. 19A to C illustrates these concepts.

FIG. 19A shows a transistor used as a resistance circuit in accordance with use in the summing and exponentiating circuits of an analog multiplier circuit described thus far. Transistor 1900 comprises a gate connection, a source connection, and a drain connection. Transistor 1900 corresponds to a type-one transistor as described herein, and therefore in various examples is flipped into a type-two transistor with the corresponding adjustments as described above. In the type-one form, transistor 1900 is arranged to receive via its source connection a first constant analog signal, in various examples a source analog signal 1902. In various examples, the negative supply as defined herein is a supply that is lower than a positive supply. The gate connection of the transistor 1900 is arranged to receive a second constant analog signal, in various examples a drain analog signal corresponding to a positive supply. The drain connection of the transistor 1900 is arranged to receive an input analog signal, such as an input analog signal from a summing circuit 1904. FIG. 19A corresponds to the resistance circuit used in the summing circuits and/or exponentiating circuits as described thus far, with a single transistor operating in its linear region providing a resistance.

In various examples, such a transistor is connected in parallel with a transistor operating in its saturated region, so as to provide an improved resistance circuit, as outlined above.

FIG. 19B shows a circuit used, in various examples, to facilitate an improvement to a resistance circuit comprising two parallel transistors operating in their linear and saturation regions respectively. Transistor 1908, sum input 1912, and source input 1910 correspond to those elements 1900, 1904 and 1910 respectively of FIG. 19A, but wherein transistor 1908 is operating in its saturation region.

In the resistance circuit of FIG. 19B, the sum input 1912 is further arranged to provide an input analog signal 1918 to a gate connection of a first p-channel transistor 1920 as defined herein, such that the gate connection of the p-channel transistor 1920 is arranged to receive an analog signal from the drain connection (i.e. drain connection) of the type-one transistor 1908. Transistor 1920 (and 1922) corresponds to a type-two transistor as described herein, and therefore in various examples is flipped into a type-one transistor with the corresponding adjustments as described above. For transistor 1920 the drain is connected to the low supply (Vss) and the source to the shifted gate node 1914. For transistor 1922, the source is to the high supply (Vdd) and the drain to the shifted gate node. The gate connection of the second p-channel transistor is arranged to receive a third constant analog signal 1924, and the drain connection of the second p-channel transistor is arranged to receive a second constant analog signal corresponding to a drain analog signal.

The voltage of shifted gate node 1914 is in various examples approximately $V_{Tp}$ (the threshold voltage of the transistor 1922) above the gate voltage of the transistor 1922, and therefore the gate voltage of the n-channel transistor 1908 is also above its own threshold voltage, provided that the threshold voltage of the n-channel transistor 1908 is smaller than the threshold voltage of the p-channel transistor 1922. The p-channel transistor 1920 has an increased threshold voltage due to the body effect as a result of its source terminal not being connected to Vdd (second constant analog signal).

The circuit of FIG. 19B illustrates the concept of using a level shifter to enable an improved resistance circuit FIG. 19C.

FIG. 19C shows an improved resistance circuit. A first resistance circuit, comprising transistor 1908 (operating in its saturation region), sum circuit input 1912 (corresponding to the sum circuit input to the transistor of the summing circuits described herein), transistor 1900 (operating in its linear region) and source signal input 1910 is in various examples used to replace one or more resistance circuits of the summing and/or exponentiating circuits described herein. Where an exponentiating circuit is replaced, the sum input 1912 is in various examples replaced with an input to a transistor that is replaced by a new resistance circuit. The connections of the n-channel transistor 1908 correspond to those outlined with respect to FIG. 19B. The connections of the n-channel transistor 1900 correspond to those outlined with respect to FIG. 19A.

In various examples, the gate connection of the transistor 1908 is instead arranged to receive a constant analog signal, and the circuit of FIG. 19B is not included, such that only two transistors 1908 and 1900, and the sum input 1912, drain and source connections 1906 and 1910 are included in the resistance circuit, respectively.

In various examples, as defined herein, reference to a source analog signal and a drain analog signal corresponds to referring to a low analog signal and a high analog signal respectively, wherein a low analog signal is lower than a high analog signal, which in various examples refers to the values represented by the analog signals.

In some examples, an analog multiplier circuit is arranged to carry out a multiply and divide operation using a small scaling factor method as follows.

i) a first input analog signal is provided to the differential amplifier, corresponding to the second analog signal;

the first control signal is provided to a first storage circuit of the at least two storage circuits, the first storage circuit storing a value derived from the output of the differential amplifier; and the second control signal is provided to the first storage circuit, forming a feedback loop comprising the differential amplifier, the summing circuit, the exponentiating circuit, and the first storage circuit such that the difference between the first input analog signal corresponding to the second analog signal and the first analog signal are substantially equal, and causing the first storage circuit to store a first value substantially proportional to a logarithm of the first input analog signal;

ii) subsequently:

a second input analog signal is provided to the differential amplifier, corresponding to the second analog signal;

the first control signal and the second control signal is provided to a second storage circuit of the at least two storage circuits, and the second control signal is provided to the first storage circuit, forming a feedback loop comprising the differential amplifier, the summing circuit, the exponentiating circuit, and the second storage circuit such that the difference between the second input analog signal corresponding to the second analog signal and the first analog signal are substantially equal, the second storage circuit storing a second value substantially proportional to a logarithm of the second input analog signal divided by the first input analog signal;

iii) subsequently:

a third input analog signal is provided to the differential amplifier, corresponding to the third analog signal;

the first control signal is provided to a third storage circuit of the at least two storage circuits, the third storage circuit storing a value derived from the output of the differential amplifier; and the second control signal is provided to the third storage circuit, forming a feedback loop comprising the differential amplifier and the third storage circuit such that the difference between the third input analog signal corresponding to the second analog signal and the first analog signal are substantially equal, and causing the first storage circuit to store a third value substantially proportional to a logarithm of the third input analog signal;

iv) subsequently, the second control signal is provided to both the second and third storage circuit, the exponentiating circuit outputting the fifth analog signal, wherein the fifth analog signal is substantially proportional to the second input analog signal multiplied by the third input signal and divided by the first input analog signal;

v) subsequently, the fifth analog signal is provided as an output of the analog multiplier circuit.

There are variants of the sequence described above which are also workable. Because the third input is not combined with the other two until the output step, it is possible to move it earlier in the sequence. In an example, the third input is before the first input. In another example the third input is between the first and second inputs.

Figure 20:
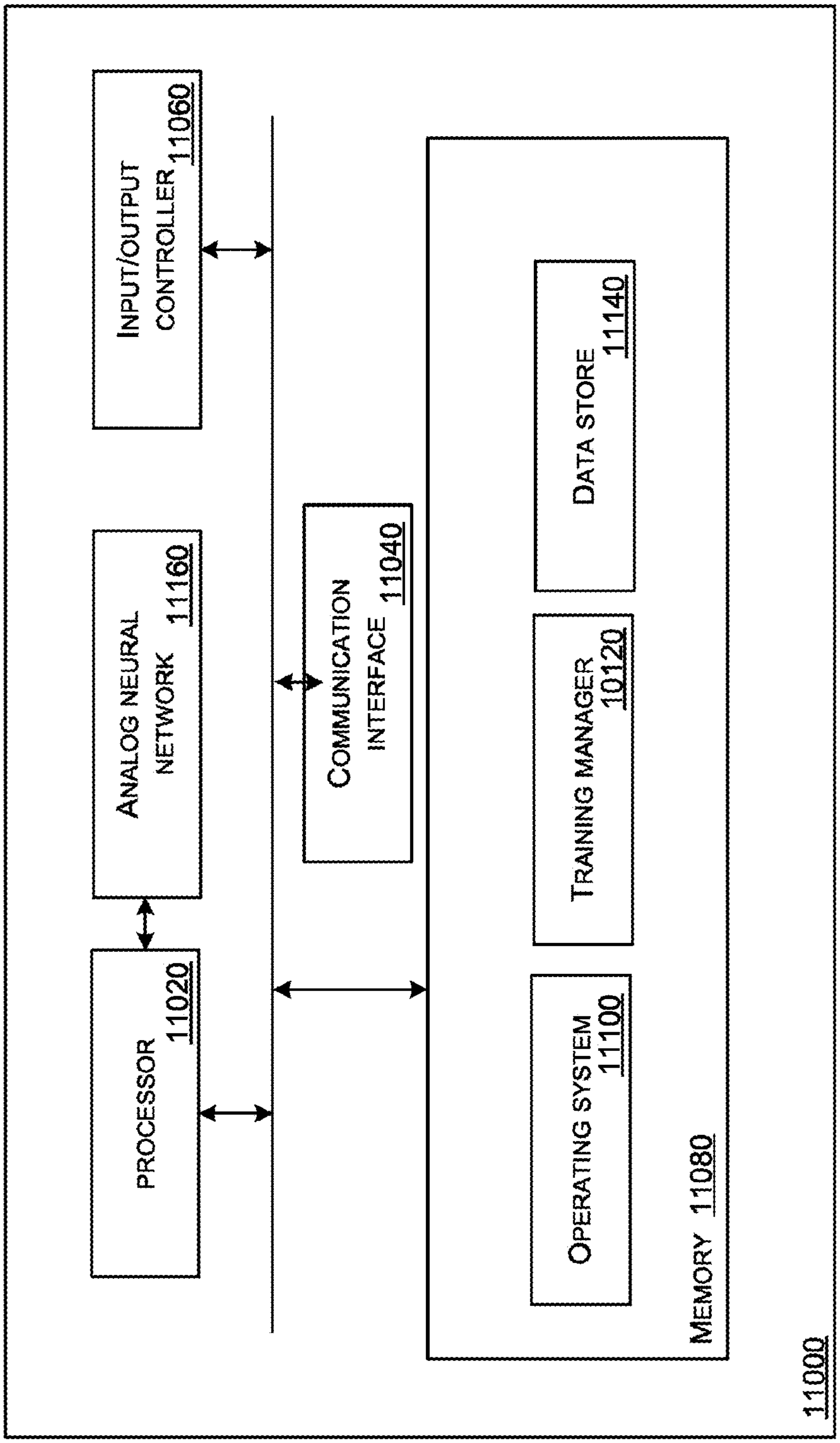
FIG. 20 is a schematic diagram of a host computing device hosting an analog neural network.

FIG. 20 is a schematic diagram of a host computing device 10000 hosting an analog neural network 10160 comprising a plurality of analog multiplier circuits as described herein.

Host computing device 10000 comprises one or more processors 10020 which are microprocessors, controllers or any other suitable type of processors for processing computer executable instructions to control the operation of the device in order to manage a neural network training programme and/or manage a service which uses analog neural network functionality. Platform software comprising an operating system 10100 or any other suitable platform software is provided at the host computing device 10000 to enable application software such as neural network training manager 10120 to be executed on the device.

The computer executable instructions are provided using any computer-readable media that is accessible by host computing device 10000. Computer-readable media includes, for example, computer storage media such as memory 10080 and communications media. Computer storage media, such as memory 10080, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), magneto-resistive random access memory (MRAM), resistive random access memory (RRAM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 10080) is shown within the host computing device 10000 it will be appreciated that the storage is, in some examples, distributed or located remotely and accessed via a network or other communication link (e.g. using communication interface 10040).

The host computing device 10000 also comprises an input/output controller 1006 arranged to output display information to a display device which may be separate from or integral to the host computing device 10000. The display information may provide a graphical user interface to show predictions generated using the analog neural network. The input/output controller 10060 is also arranged to receive and process input from one or more devices, such as a user input device (e.g. a mouse, keyboard, camera, microphone or other sensor).

The analog multiplier circuits as described herein are in various examples used to perform at least a portion of operations such as multiply computations associated with matrix multiplication when performing at least one of: feed-forward and back-propagation, for training a neural network to at least one of: recognise an object within an input image; classify an input image; classify input audio data; recognise a voice in input audio; recognise a gesture in input video, wherein the trained neural network is used to perform the task for which it is trained.

Neural networks are well-known, and commonly comprise an input layer, at least one hidden layer, and an output layer, wherein each layer is comprised of at least one node. They are trained on data for which the desired output is known, where training comprises the input of training data to the neural network and the 'learning' of weights which correspond to how heavily to utilise a node input to a subsequent layer. Commonly, 'learning' comprises determining the weights that minimise a function defined as the 'loss'. There are many possible, well-known loss functions, where the choice of loss function depends on the context of use of the neural network.

In various examples, training data comprises one or more of: a three-dimensional image, a two-dimensional image, an audio snippet, frames of a video.

In various examples, a neural network is trained to classify an image, classify audio data, recognise a voice, recognise a gesture, and/or recognise an object within an input image.

In various examples, during training of a neural network, feed-forward operations are performed, which refers to the propagation of inputs of a layer to outputs of a layer. These same operations are performed when the neural network receives new input data after being trained.

In various examples, during training, backpropagation operations are also performed, which refers to the calculation of partial derivatives used to derive updated weights of the neural network for each layer.

In various examples the multiplier circuit is used to perform at least a portion of multiply calculations associated with matrix multiplication when performing inference using a neural network, which may be an analog neural network as described with reference to FIG. 20. The neural network inference is computed to do one or more of: recognise an object within an input image; classify an input image; classify input audio data; recognise a voice in input audio; recognise a gesture in input video; perform speech recognition; convert speech to text; generate text; perform natural language processing. In an example where an analog neural network comprising a plurality of analog multiplier circuits is used for speech to text processing, the analog neural network is trained using training data comprising pairs of items, each pair comprising a speech signal and corresponding text. Any well-known training algorithm is used such as backpropagation. The trained neural network is used during inference to predict text corresponding to an input speech signal.

In various examples the analog multiplier circuit described herein is used to perform matrix multiplication when performing inference using a transformer neural network, such as for generating images, generating text and for other tasks. The analog multiplier circuit is particularly suited for computing the self-attention operation in transformer neural networks. This is achieved by a series of matrix-vector multiplications, in which both operands are 'dynamic' in the sense that they are dependent on the input data, in contrast to weight matrices which are generally 'static' once trained. Analog computing approaches are suited to accelerating the very large scale but approximate mathematics required by neural networks. The analog multiplier circuit gives an efficient solution for dynamic matrices whose values will change frequently at runtime. In contrast, using technology such as crossbars of a non-volatile memory to encode the static matrix weights, for instance as conductances in a crossbar array of RRAM devices is inefficient. These approaches have a high write cost in terms of energy and time taken, and are often limited by endurance i.e. the number of times the Non-volatile memory (NVM) can be re-written before it breaks. Thus, they are unsuitable for paradigms in which both the matrix and vector are dynamic quantities i.e. will continuously change during use, such as in fluid dynamics or transformer self-attention deployments. The present technology produces dynamic matrix-vector multiplications with high parallelism and low time complexity compared to a digital implementation of the same mathematics, and moreover enables integration with other analog computation methods, such as those with the NVM crossbars. Taken together, an example high-impact use case of the technology as an approach to the multiplication of a matrix available as analog electrical signals with a vector available in the same modality is in performing the self-attention operation as part of an analog circuit that implements inference of transformer neural networks, where other parts of the network such as the multiplication of static weight matrices with dynamic inputs are implemented by other efficient analog circuits such as a NVM crossbar array of RRAM devices. In contrast, analog Application-Specific Integrated Circuit (ASICs) for accelerating transformers require frequent conversion of signals to digital for the dynamic computations such as self-attention and are less efficient.

The analog multiplier circuit as described herein is in various examples manufactured by an integrated circuit manufacturing system, which processes a description of an integrated circuit in order to manufacture the integrated circuit. In various examples, the description of the integrated circuit is an integrated circuit definition dataset. The manufacturing process comprises a series of steps to add and remove layers of material in order to construct the structure of the analog multiplier circuit. A complementary metal-oxide-semiconductor CMOS procedure is used in some examples to manufacture the analog multiplier circuit. In some cases a planar process is used comprising photolithography, deposition and etching. Deposition is performed using chemical vapor deposition in some cases. In some cases other processes such as fin field-effect transistor (FinFET) or gate-all-round processes are used.

Any reference to 'an' item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

Whilst the examples presented herein reference n-channel and p-channel transistors, these examples are in no way limiting, and n-channel and p-channel transistors are in various examples swapped. Additionally, whilst reference to constant analog drain and source signals has been made, in various examples, the constant source signal is a ground supply, and the constant drain signal is a positive supply. As defined herein, a source signal corresponding to a source voltage is lower than a supply voltage.

Where the description has explicitly disclosed in isolation some individual features, any apparent combination of two or more such features is considered also to be disclosed, to the extent that such features or combinations are apparent and capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. An analog multiplier circuit for performing multiply and scaling operations comprising:

a differential amplifier arranged to receive as input a first analog signal and a second analog signal, the second analog signal is an input signal to the analog multiplier circuit, and arranged to output a third analog signal substantially proportional to a difference between the first and the second analog signal;

at least two storage circuits, each:

in response to receiving a first control signal, receiving as input the third analog signal output by the differential amplifier and storing a value derived from the third analog signal; and in response to receiving a second control signal, outputting a storage analog signal derived from the stored value;

a summing circuit arranged to receive as input the storage analog signals from the at least two storage circuits respectively, and arranged to output a fourth analog signal substantially proportional to a sum of the input storage analog signals; and an exponentiating circuit arranged to receive as input the fourth analog signal, and arranged to output a fifth analog signal, wherein the fifth analog signal is substantially proportional to an exponential of the fourth analog signal, and is arranged to be an output of the analog multiplier circuit, wherein the first analog signal is a feedback signal associated with the fifth analog signal, and wherein the exponentiating circuit is operable to cause a storage circuit of the at least two storage circuits to store a value substantially proportional to a logarithm of the second analog signal.

2. The analog multiplier circuit of claim 1, wherein the exponentiating circuit is arranged to output the fifth analog signal to the differential amplifier so as to provide the fifth analog signal as the first analog signal.

3. The analog multiplier circuit of claim 1, wherein performing a multiply operation comprises:

i) a first input analog signal is provided to the differential amplifier, corresponding to the second analog signal;

the first control signal is provided to a first storage circuit of the at least two storage circuits, the first storage circuit storing a value derived from the output of the differential amplifier; and the second control signal is provided to the first storage circuit, forming a feedback loop comprising the differential amplifier, the summing circuit, the exponentiating circuit, and the first storage circuit such that the difference between the first input analog signal corresponding to the second analog signal and the first analog signal are substantially equal, and causing the first storage circuit to store a first value substantially proportional to a logarithm of the first input analog signal;

ii) subsequently:

a second input analog signal is provided to the differential amplifier, corresponding to the second analog signal;

the first control signal is provided to a second storage circuit of the at least two storage circuits, the second storage circuit storing a value derived from the output of the differential amplifier; and the second control signal is provided to the second storage circuit, forming a feedback loop comprising the differential amplifier, the summing circuit, the exponentiating circuit, and the second storage circuit such that the difference between the second input analog signal corresponding to the second analog signal and the first analog signal are substantially equal, and causing the second storage circuit to store a second value substantially proportional to a logarithm of the second input analog signal;

iii) subsequently:

the second control signal is provided to both the first and the second storage circuit, the exponentiating circuit outputting the fifth analog signal, wherein the fifth analog signal is substantially proportional to a product of the first input analog signal and the second input analog signal;

iv) the fifth analog signal is provided as an output of the analog multiplier circuit.

4. The analog multiplier circuit of claim 1, wherein performing a scaling operation comprises:

i) a first input analog signal is provided to the differential amplifier, corresponding to the second analog signal;

the first control signal is provided to a first storage circuit of the at least two storage circuits, the first storage circuit storing a value derived from the output of the differential amplifier; and the second control signal is provided to the first storage circuit, forming a feedback loop comprising the differential amplifier, the summing circuit, the exponentiating circuit, and the first storage circuit such that the difference between the first input analog signal corresponding to the second analog signal and the first analog signal are substantially equal, and causing the first storage circuit to store a first value substantially proportional to a logarithm of the first input analog signal;

ii) subsequently:

a second input analog signal is provided to the differential amplifier, corresponding to the second analog signal;

the first control signal and the second control signal is provided to a second storage circuit of the at least two storage circuits, and the second control signal is provided to the first storage circuit, forming a feedback loop comprising the differential amplifier, the summing circuit, the exponentiating circuit, and the second storage circuit such that the difference between the second input analog signal corresponding to the second analog signal and the first analog signal are substantially equal, the second storage circuit storing a second value substantially proportional to a logarithm of the second input analog signal divided by the first input analog signal;

iii) subsequently, the second control signal is provided to the second storage circuit, the exponentiating circuit outputting the fifth analog signal, wherein the fifth analog signal is substantially proportional to the second input analog signal divided by the first input analog signal;

iv) the fifth analog signal is provided as an output of the analog multiplier circuit.

5. The analog multiplier circuit of claim 1, wherein performing a multiply and divide operation comprises:

i) a first input analog signal A is written to a first one of the at least two storage circuits;

ii) subsequently:

a second input analog signal Vmax is provided to the differential amplifier, corresponding to the second analog signal, and Vmax is written to a second one of the at least two storage circuits while reading A from the first one of the at least two storage circuits so as to write Vmax divided by A to the second one of the at least two storage circuits;

iii) subsequently:

a third input analog signal, B, is provided to the differential amplifier, corresponding to the second analog signal and B is written to the first one of the at least two storage circuits while reading Vmax divided by A from the second one of the at least two storage circuits so as to write A*B divided by Vmax to the second one of the at least two storage circuits;

iv) subsequently, the second one of the at least two storage circuits is read as an output of the analog multiplier circuit.

6. The analog multiplier circuit of claim 1, wherein an analog signal is any one of: a voltage; a current; a charge.

7. The analog multiplier circuit of claim 1, wherein the exponentiating circuit comprises:

a type-one transistor comprising a gate connection, a source connection, and a drain connection, the type-one transistor operating in a sub-threshold region such that an output analog signal via the drain connection is exponentially dependent upon a change between an input analog signal received at the gate connection of the type-one transistor and a first constant analog signal received via the source connection; and a type-two transistor comprising a gate connection, a source connection, and a drain connection, the type-two transistor operating in a linear region such that an analog signal change between analog signals received via the source and the drain connection of the type-two transistor is substantially proportional to an analog signal output via the drain connection of the type-two transistor, wherein the gate connection of the type-one transistor is arranged to receive the fourth analog signal and wherein the source connection of the type-one transistor is arranged to receive the first constant analog signal, wherein the source connection of the type-two transistor is arranged to receive a second constant analog signal and wherein the drain connection of the type-two transistor is arranged to receive an analog signal associated with the output analog signal by the type-one transistor which is exponentially dependent upon the change between the input analog signal received at the gate connection of the type-one transistor and the first constant analog signal received via the source connection of the type-one transistor, wherein the drain connection of the type-two transistor is further arranged to output the fifth analog signal which is exponentially dependent upon the change between the input analog signal received at the gate connection of the type-one transistor and the first constant analog signal received via the source connection of the type-one transistor, and wherein the gate connection of the type-two transistor is arranged to receive a third constant analog signal.

8. The analog multiplier circuit of claim 7, wherein the type-one transistor is a first type-one transistor, and wherein the exponentiating circuit further comprises:

an additional type-one transistor comprising a gate connection, a source connection, and a drain connection, the additional type-one transistor having its source connection arranged to receive the output analog signal by the first type-one transistor which is exponentially dependent upon the change between the input analog signal received at the gate connection of the type-one transistor and the first constant analog signal received via the source connection of the first type-one transistor, the additional type-one transistor having its drain connection arranged to output the analog signal associated with the output analog signal by the first type-one transistor, wherein the drain connection of the type-two transistor is arranged to receive, from the additional type-one transistor, the analog signal associated with the output analog signal by the first type-one transistor, and wherein the gate connection of the additional type-one transistor is arranged to receive a fourth constant analog signal.

9. The analog multiplier circuit of claim 1, wherein the summing circuit comprises:

a type-one transistor comprising a gate connection, a source connection, and a drain connection, the drain connection of the type-one transistor arranged to receive the storage analog signals from the at least two storage circuits respectively, the type-one transistor operating in a linear region such that an output analog signal via its drain connection is substantially proportional to a sum of the storage analog signals, the source connection of the type-one transistor arranged to receive a first constant analog signal and the gate connection of the type-one transistor arranged to receive a second constant analog signal the drain connection of the type-one transistor further arranged to output to the exponentiating circuit such that the summing circuit outputs the fourth analog signal substantially proportional to the sum of the storage analog signals.

10. The analog multiplier circuit of claim 1, wherein each of the at least two storage circuits comprise:

a write-enable pass gate comprising:

a first type-two transistor comprising a gate connection, a source connection, and a drain connection;

a first type-one transistor comprising a gate connection, a source connection, and a drain connection; and wherein the first type-two transistor and the first type-one transistor are connected in parallel, wherein the source connection of the first type-one transistor and the drain connection of the first type-two transistor are arranged with a common connection, and wherein the drain connection of the first type-one transistor and the source connection of the first type-two transistor are arranged with a common connection, and wherein gates of the first type-two transistor and the first type-one transistor have complementary signals;

wherein a first connection of the common connections of the first type-one transistor and the first type-two transistor is arranged to receive the third analog signal from the differential amplifier, a capacitor comprising two plates, a first connection on a first plate of the capacitor and a second connection on a second plate of the capacitor, the capacitor for storing a value derived from the third analog signal, the first connection of the capacitor arranged to receive an analog signal from a second connection of the common connections of the first type-one transistor and the first type-two transistor, and the second connection of the capacitor arranged to receive a first constant analog signal;

a second type-two transistor comprising a gate connection, a source connection and a drain connection, the second type-two transistor operating in saturation such that an output analog signal via its drain connection depends on an analog signal change between analog signals received via its gate connection and its source connection, the gate connection of the second type-two transistor arranged to receive an analog signal from the first connection of the capacitor, and the source connection of the second type-two transistor arranged to receive a second constant analog signal; and a third type-two transistor comprising a gate connection, a source connection, and a drain connection, the gate connection of the third type-two transistor arranged to receive the second control signal, the drain connection of the third type-two transistor arranged to receive an analog signal from the drain connection of the second type-two transistor, and the source connection of the third type-two transistor arranged to output an analog signal to the summing circuit such that the storage circuit outputs a storage analog signal derived from the stored value.

11. The analog multiplier circuit of claim 1, further comprising at least one additional analog multiplier circuit, wherein the fifth analog signal of each analog multiplier circuit is arranged to be provided to a first layer summing circuit arranged to receive as input the fifth analog signals and arranged to output a summed analog signal substantially proportional to a sum of the fifth analog signals.

12. The analog multiplier circuit of claim 11, wherein the analog multiplier circuits arranged to provide their fifth analog signal to the first layer summing circuit are a first group of multiplier circuits, the analog multiplier circuit further comprising:

at least one additional first layer summing circuit arranged to receive as input at least two analog signals and arranged to output a summed analog signal substantially proportional to a sum of the at least two analog signals received at the at least one additional first layer summing circuit;

at least one additional group of multiplier circuits, wherein each additional group of multiplier circuits comprises at least two analog multiplier circuits each arranged to provide a respective fifth analog signal of a respective analog multiplier circuit of the at least two analog multiplier circuits to a same first layer summing circuit of the at least one additional first layer summing circuit; and a second layer summing circuit arranged to receive as input the summed analog signals of at least two first layer summing circuits and arranged to output an analog signal substantially proportional to a sum of the summed analog signals of the at least two first layer summing circuits.

13. The analog multiplier circuit of claim 11, further comprising:

an array of analog multiplier circuits arranged such that each column of the array comprises at least two analog multiplier circuits arranged to provide their fifth analog signal to a same first layer summing circuit via a same summing connection, each of the at least two analog multiplier circuits further connected via a same control connection for receiving control signals;

the array of analog multiplier circuits further arranged such that each row of the array comprises at least two analog multiplier circuits connected via a same input connection for receiving input analog signals, wherein the array is arranged to compute at least a portion of a product of a matrix and a vector by:

receiving, along each row via the same input connection, an analog signal corresponding to a respective element of the vector, wherein the respective element of the vector is stored in a first storage circuit of every analog multiplier circuit of the row by providing as input the corresponding analog signal to each analog multiplier circuit;

receiving, along each row via the same input connection, analog signals corresponding to respective elements of a row of the matrix, wherein the respective elements of the row of the matrix are stored in a second storage circuit of different analog multiplier circuits of the row by providing as input the analog signal corresponding to the respective element of the row of the matrix to each analog multiplier circuit;

causing the at least two analog multiplier circuits of each column to perform a multiply operation on the stored elements of the matrix and the vector, and output the fifth analog signal of each analog multiplier circuit of each column to the same summing connection; and causing each first layer summing circuit to sum the fifth analog signals of the same summing connection to which the same first layer summing circuit is connected.

14. The analog multiplier circuit of claim 11, the first layer summing circuit comprising:

for each analog multiplier circuit providing its fifth analog signal to the first layer summing circuit:

a first pass gate comprising:

a first type-two transistor comprising a gate connection, a source connection, and a drain connection;

a first type-one transistor comprising a gate connection, a source connection, and a drain connection; and wherein the first type-two transistor and the first type-one transistor are connected in parallel, wherein the source connection of the type-one transistor and the drain connection of the type-two transistor are arranged to receive the fifth analog signal of each analog multiplier circuit, wherein gates of the first type-two transistor and the first type-one transistor have complementary signals;

wherein the gate connection of the first type-two transistor is arranged to receive the first enable control signal;

a capacitor comprising two plates, a first connection on a first plate of the capacitor and a second connection on a second plate of the capacitor, the capacitor for storing a value derived from the fifth analog signal, the first connection of the capacitor arranged to receive an analog signal from both the source connection of the first type-two transistor and the drain connection of the first type-one transistor, and the second connection of the capacitor arranged to receive a first constant analog signal; and a second pass gate comprising:

a first type-two transistor of the second pass gate comprising a gate connection, a source connection, and a drain connection;

a first type-one transistor of the second pass gate comprising a gate connection, a source connection, and a drain connection; and wherein the first type-two transistor of the second pass gate and the first type-one transistor of the second pass gate are connected in parallel, wherein the source connection of the first type-one transistor of the second pass gate and the drain connection of the first type-two transistor of the second pass gate are arranged to commonly receive an analog signal derived from the stored value of the capacitor and output by the first connection of the capacitor, wherein gates of the first type-two transistor of the second pass gate and the first type-one transistor of the second pass gate have complementary signals;

wherein the gate connection of the first type-two transistor of the second pass gate is arranged to receive the second enable control signal, wherein the source connection of the first type-two transistor of the second pass gate and the drain connection of the first type-one transistor of the second pass gate are arranged to output an analog signal to a summing connection, wherein, in response to receiving the first enable control signal, charging of the capacitor by the fifth analog signal of each analog multiplier circuit is enabled, and wherein, in response to receiving the second enable control signal, an analog signal associated with the charge of the capacitor is provided to the summing connection, and wherein the summing connection is arranged to receive analog signals from each analog multiplier circuit with a second pass gate in which a second enable control signal is received, such that an analog signal in the summing connection is an average of the analog signals voltage output by the capacitors across each analog multiplier circuit associated with an enabled second pass gate.

15. The analog multiplier circuit of claim 11, the first layer summing circuit comprising:

for each analog multiplier circuit providing its fifth analog signal to the first layer summing circuit:

a pass gate comprising:

a first type-two transistor comprising a gate connection, a source connection, and a drain connection;

a first type-one transistor comprising a gate connection, a source connection, and a drain connection; and an inverter comprising an input and an output connection, wherein the first type-two transistor and the first type-one transistor are connected in parallel, wherein the source connection of the type-one transistor and the drain connection of the type-two transistor are arranged to receive the fifth analog signal of each analog multiplier circuit, wherein the input connection of the inverter is arranged to receive a summing control signal, wherein the source connection of the first type-two transistor and the drain connection of the first type-one transistor are arranged to output an analog signal to a same summing connection as the first type-two and type-one transistors of the pass gate of each other analog multiplier circuit, and wherein the output connection of the inverter is arranged to output an analog signal which is received by the gate connection of the first type-two transistor, wherein the gate connection of the first type-one transistor is arranged to receive the summing control signal, wherein, in response to receiving the summing control signal, an analog signal associated with the output of each analog multiplier circuit is provided to the same summing connection, and wherein the same summing connection is arranged to receive analog signals from each analog multiplier circuit with a pass gate in which a summing control signal is received, such that the analog signal in the same summing connection is an average of the analog signals output across each analog multiplier circuit associated with an enabled pass gate.

16. The analog multiplier circuit of claim 13, wherein one or more of:

the differential amplifier, the exponentiating circuit, and a storage circuit; of each analog multiplier circuit is shared across at least two analog multiplier circuits of the array, and wherein a feedback connection is arranged to transfer output analog signals from components of the analog multiplier circuits associated with a shared component to the shared component.

17. An analog multiplier circuit comprising:

at least two storage circuits, each:

comprising a differential amplifier arranged to receive as input a same first analog signal and a same second analog signal, and arranged to output a differential output analog signal substantially proportional to a difference between the first and the second analog signal;

in response to receiving a first control signal, receiving as input the differential output analog signal output by the differential amplifier of a storage circuit, and storing a value derived from the received differential output analog signal; and in response to receiving a second control signal, outputting a storage analog signal derived from the stored value;

a summing circuit arranged to receive as input the storage analog signals from the at least two storage circuits respectively, and arranged to output a fourth analog signal substantially proportional to a sum of the storage analog signals; and an exponentiating circuit arranged to receive as input the fourth analog signal, and arranged to output a fifth analog signal, wherein the fifth analog signal is substantially proportional to an exponential of the fourth analog signal, and is arranged to be an output of the analog multiplier circuit, wherein the first analog signal is a feedback signal associated with the fifth analog signal, and wherein the exponentiating circuit is operable to cause a storage circuit of the at least two storage circuits to store a value substantially proportional to a logarithm of the second analog signal.

* * * * *